US008000188B2

(12) United States Patent  
Sato

(10) Patent No.: US 8,000,188 B2
(45) Date of Patent: Aug. 16, 2011

(54) OPTICAL PICKUP APPARATUS AND OPTICAL DISC APPARATUS INCLUDING THE SAME

(75) Inventor: Minoru Sato, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 49 days.

(21) Appl. No.: 12/639,871

(22) Filed: Dec. 16, 2009

(65) Prior Publication Data

US 2010/0135145 A1    Jun. 3, 2010

Related U.S. Application Data

(63) Continuation of application No. PCT/JP2008/064668, filed on Aug. 11, 2008.

(30) Foreign Application Priority Data

Aug. 10, 2007 (JP) ................................. 2007-210227

(51) Int. Cl.
G11B 7/00 (2006.01)

(52) U.S. Cl. ............... 369/44.37; 369/44.12; 369/44.41; 369/112.03; 369/112.05

(58) Field of Classification Search ......................... None
See application file for complete search history.

(56) References Cited

U.S. PATENT DOCUMENTS

| 6,144,623 | A  | * | 11/2000 | Inoue et al. | ................ | 369/44.23 |
| 7,835,250 | B2 | * | 11/2010 | Yanagisawa et al. | .... | 369/112.03 |
| 2003/0007436 | A1 | * | 1/2003 | Komma et al. | .............. | 369/53.2 |

FOREIGN PATENT DOCUMENTS

| JP | 2001-222825 | 8/2001 |
| JP | 2006-004499 | 1/2006 |
| JP | 2006-216106 | 8/2006 |
| JP | 2007-035109 | 2/2007 |
| JP | 2007-141425 | 6/2007 |
| JP | 2007-149249 | 6/2007 |
| JP | 2007-164962 | 6/2007 |

OTHER PUBLICATIONS

ISA/US, Int'l Search Report/Written Opinion in PCT/JP2008/064668 in the name of Sanyo Electric Co., Ltd., dated Aug. 26, 2008. F1080515W000, PCT/ISA/220, W02009/022747.

* cited by examiner

*Primary Examiner* — Muhammad N Edun
(74) *Attorney, Agent, or Firm* — SoCal IP Law Group LLP; Steven C. Sereboff; John E. Gunther

(57) ABSTRACT

An optical pickup apparatus comprising at least: a diffraction grating configured to split first wavelength light into at least a first main beam and first sub-beam, and to split second wavelength light into at least a second main beam and second sub-beam, the diffraction grating including a diffraction surface portion corresponding to the second wavelength light; and a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam, a distance between the first main light-receiving unit and first sub-light-receiving unit being changed relative to a standardized distance between the first main light-receiving unit and first sub-light-receiving unit.

25 Claims, 21 Drawing Sheets

OPTICAL PICKUP APPARATUS AND OPTICAL DISC APPARATUS INCLUDING THE SAME

CROSS-REFERENCE TO RELATED APPLICATIONS

This is a continuation application of International Patent Application No. PCT/JP2008/064668 filed Aug. 11, 2008, which claims the benefit of priority to Japanese Patent Application No. 2007-210227 filed Aug. 10, 2007. The full contents of the International Patent Application are incorporated herein by reference.

BACKGROUND OF THE INVENTION

1. Field of the Invention

The present invention relates to an optical pickup apparatus and an optical disc apparatus including the same.

2. Description of the Related Art

An optical disc is inserted into an optical disc apparatus (not shown) including an optical pickup apparatus. The optical disc inserted into the optical disc apparatus not shown is formed in a substantially circular plate shape.

Such discs includes: data read only optical discs such as a "CD-ROM", "DVD-ROM", "HD DVD-ROM", and "BD-ROM"; data recordable optical discs such as a "CD-R", "DVD-R", "DVD+R", "HD DVD-R", and "BD-R"; data writable/erasable or data rewritable type optical discs such as a "CD-RW", "DVD-RW", "DVD+RW" (registered trademark), "DVD-RAM", "HD DVD-RW", "HD DVD-RAM", and "BD-RE", etc., for example.

To describe the optical discs, "CD" is an abbreviation of "Compact Disc" (trademark). "DVD" (registered trademark) is an abbreviation of "Digital Versatile Disc". "HD DVD" (registered trademark) is an abbreviation of "High Definition DVD". "Blu-ray" of "Blu-ray Disc" (registered trademark) means blue-violet laser which is employed for achieving higher-density recording as compared with red laser which is used to read/write signals for DVD. The "HD DVD" is made compatible with existing DVD series and has a storage capacity greater than that of the existing DVD series. The infrared laser has been used for the CD. The red laser has been used for the DVD. Whereas, the blue-violet laser is used when reading data/information/signals recorded in the "Blu-ray Disc" or "HD DVD" optical disc or writing data/information/signals into the "Blu-ray Disc" or "HD DVD" optical disc.

"ROM" of the "CD-ROM", "DVD-ROM", and "HD DVD-ROM" is an abbreviation of "Read Only Memory". "BD-ROM" is an abbreviation of "Blu-ray Disc-ROM". The "CD-ROM", "DVD-ROM", "HD DVD-ROM", and "BD-ROM" are data/information read only discs. "R" of the "CD-R", "DVD-R", "DVD+R", and "HD DVD-R" is an abbreviation of "Recordable". "BD-R" is an abbreviation of "Blu-ray Disc-R". The "CD-R", "DVD-R", "DVD+R", "HD DVD-R", and "BD-R" are data/information recordable discs. "RW" of the "CD-RW", "DVD-RW", "DVD+RW", and "HD DVD-RW" is an abbreviation of "Re-Writable". "BD-RE" is an abbreviation of "Blu-ray Disc-RE". The "CD-RW", "DVD-RW", "DVD+RW", "HD DVD-RW", and "BD-RE" are data/information rewritable discs. "RAM" of the "DVD-RAM" and "HD DVD-RAM" is an abbreviation of "Random Access Memory". The "DVD-RAM" and "HD DVD-RAM" are data/information writable/erasable discs.

An optical disc capable of recording data/information/signals in an optical disc apparatus includes a signal layer, which is a signal recording surface of the optical disc, provided with grooves (not shown) for storing data/information/signals. The grooves mean elongated dent portions, for example. In plan view of a circular optical disc, the grooves are formed in a substantially spiral shape. When a laser beam is applied to an optical disc, if the optical disc is viewed from the side of the signal layer received with the laser beam, the grooves are in a whorl shape. Since the grooves are very minute, the grooves are visually unrecognizable.

The optical pickup apparatus includes an optical system for detecting error signals such as a focus error signal and a tracking error signal so as to appropriately apply an irradiation spot onto a predetermined record track within an optical disc by controlling a position of an objective lens.

The focus means a focal point or focal spot, for example. Focusing means bringing into focus or being brought into focus, for example. The tracking means to track and observe a signal layer of an optical disc or minute pits (holes, dents), grooves (grooves), wobble (meandering), etc., on the signal layer of the optical disc with the use of light, to determine a position on a spirally shaped track, for example. The pit means a hole or a dent portion, for example. The wobble means meandering of a track on which data signals such as information, for example, are recorded.

A focusing detection method for an irradiation spot on an optical disc in the optical pickup apparatus includes a detection method based on a differential astigmatic method, for example. The differential astigmatic method is, for example, a method of detecting displacement of an irradiation spot by detecting distortion of a point image formed by an optical system having astigmatism. A tracking detection method for an irradiation spot on an optical disc in the optical pickup apparatus includes a detection method based on a differential push-pull method, for example. The differential push-pull method is, for example, a method of detecting displacement of an irradiation spot by a main beam for reading/writing data and two sub-beams for detecting a positional deviation correction signal.

To describe tracking error signal detection methods, for example, when detection of a tracking error signal is performed by the optical pickup apparatus for an optical disc of the CD standard (CD-ROM, CD-R, CD-RW, etc.) having a track pitch of 1.6 μm (microns/micro meters), for example, a "three-beam method (referred to as a three-spot method as well)" using three beams is primarily employed as a tracking error signal detection method. When detection of a tracking error signal is performed by the optical pickup apparatus for an optical disc of the DVD standards (DVD-ROM, DVD-R, and DVD-RW, etc.) having a track pitch of 0.74 μm, for example, an "in-line method" using at least three beams is primarily employed as a tracking error signal detection method. The designation of the tracking error signal detection methods here is given for convenience.

The track pitch of the DVD-RAM, DVD-ROM, DVD-R, DVD-RW, etc., of Version 1 is defined as substantially 0.74 μm, whereas the track pitch of the DVD-RAM of Versions 2.0 and 2.1 is defined as substantially 0.615 μm. As above, the track pitches are different between the DVD-RAM, DVD-ROM, DVD-R, DVD-RW, etc., of Version 1 and DVD-RAM of Versions 2.0 and 2.1.

First, there will be described the "three-beam method" primarily employed for the error signal detection in the CD standards. As shown in FIG. 17, the optical pickup apparatus includes a CD diffraction grating 320 on a light path between a semiconductor laser element 210 and a polarizing beam splitter 230. The CD diffraction grating 320 has linear grating grooves carved at even intervals in a given period and has a function of diffracting and splitting the laser beam emitted from the semiconductor laser element 210 into a total of three beams, which are a main beam (0th order light) and two sub-beams (±1st order diffracted light beams).

As a result of the three beams having passed through the polarizing beam splitter 230, a collimating lens 240, and an objective lens 250, a main spot 100 corresponding to the main beam and sub-spots 101 and 102 corresponding to two respective sub-beams are formed on a signal layer Da of an optical disc D, as shown on the left side of FIG. 18. On the signal layer Da of the optical disc D, a track D100 is periodically provided for recording signals, and an interval δ in a disc radial direction among the main spot 100 and the sub-spots 101 and 102 is adjusted to be identical to substantially one half of a periodic distance Dtp of the track D100 by a means of rotating the CD diffraction grating 320 around a light axis to be adjusted, etc. The reflected lights of the main spot 100 and the sub-spots 101 and 102 arrive again at the objective lens 250, the collimating lens 240, and the polarizing beam splitter 230, and a portion of a light amount of the lights passes through the polarizing beam splitter 230, and thereafter, is made incident on a photodetector 270 through a detection lens 260.

As shown on the right side of FIG. 18, the photodetector 270 is disposed with light-receiving surfaces 200a, 200b, and 200c respectively corresponding to the reflected lights of the main spot 100 and the sub-spots 101 and 102. When the reflected lights of the main spot 100 and the sub-spots 101 and 102 are made incident on the light-receiving surfaces 200a, 200b, and 200c, respectively, a main detection light spot 200 corresponding to the main spot 100 and sub-detection light spots 201 and 202 corresponding to the sub-spots 101 and 102 are formed.

If the main spot 100 performs scanning accurately on the track D100, the sub-detection light spots 201 and 202 have the same light amount. However, if the scanning of the main spot 100 is deviated from the track D100, a difference is generated between the light amounts of the sub-detection light spots 201 and 202. Therefore, a tracking error signal indicative of scanning deviation of the tracking is generated by executing a subtracting process with a subtractor 400 with respect to the light amounts of the sub-detection light spots 201 and 202, for example.

The "in-line method" primarily employed for the error signal detection in the DVD standard will then be described. The optical system of the in-line method is able to detect a tracking error signal basically based on substantially the same optical system as that of the three-beam method. However, as compared to the optical system of the three-beam method, a difference is that a DVD diffraction grating 340 is used in which a periodic structure of grating grooves formed on one half plane surface 341 is displaced in phase by about 180 degrees relative to a periodic structure of grating grooves formed on the other half plane surface 342, as shown on the left side of FIG. 20.

Here, it is assumed that the DVD diffraction grating 340 is provided at substantially the same location as the CD diffraction grating 320 shown in FIG. 17 replacing the CD diffraction grating 320. To support the in-line method, it is assumed that positions at which the DVD diffraction grating 340, a light converging optical system, etc., are disposed are adjusted such that the main spot 100 and the sub-spots 101 and 102 applied to the signal layer Da of the optical disc D are applied onto the same track D100, as shown on the left side of FIG. 19.

When the DVD main beam forming the main detection light spot 200 is applied to the light-receiving surface 200a of the photodetector 270, a subtractor 500a connected to the light-receiving surface 200a performs an operation to obtain a difference between output signals from the light-receiving surface 200a, to be generated as a main push-pull signal Sa, for example.

When a first DVD sub-beam forming the sub-detection light spot 201 is applied to the light-receiving surface 200b of the photodetector 270, a subtractor 500b connected to the light-receiving surface 200b performs an operation to obtain a difference between output signals from the light-receiving surface 200b, to be generated as a preceding sub-push-pull signal Sb, for example.

When a second DVD sub-beam forming the sub-detection light spot 202 is applied to the light-receiving surface 200c of the photodetector 270, a subtractor 500c connected to the light-receiving surface 200c performs an operation to obtain a difference between output signals from the light-receiving surface 200c, to be generated as a delayed sub-push-pull signal Sc, for example.

As shown on the right side of FIG. 19, the push-pull signal Sa detected from the main detection light spot 200 is output with a phase opposite to phases of the push-pull signals Sb and Sc detected from the sub-detection light spots 201 and 202 respectively corresponding to the sub-spots 101 and 102, as is the case with the three-beam method. Subsequently, an adder 510 adds the push-pull signals Sb and Sc, and a subtractor 530 subtracts the above added signals from the push-pull signal Sa, to be able to generate a tracking error signal with offset components of the push-pull signals Sa, Sb, and Sc canceled.

Recently, proposals have been made for an optical pickup apparatus capable of recording/reproduction of both the CD-standard optical discs and the DVD-standard optical discs. To achieve the cost reduction through simplification of the optical system, the optical pickup apparatus uses a multi-laser unit including: a CD semiconductor laser element for emitting a first laser beam having a first wavelength of 765 nm to 805 nm (nanometers) in the infrared waveband suitable for the CD standard; and a DVD semiconductor laser element for emitting a second laser beam having a second wavelength of 645 nm to 675 nm in the red waveband suitable for the DVD standard.

To further simplify the optical system, the optical pickup apparatus uses a two-wavelength supported diffraction grating supporting both the three-beam method for the CD standard and the in-line method for the DVD standard (see e.g., Japanese Patent Application Laid-Open Publication No. 2007-164962 (page 1, FIGS. 1 to 8)). For example, a two-wavelength supported diffraction grating 300A is configured such that the CD diffraction grating 320 is fixed to one surface and the DVD diffraction grating 340 is fixed to the other surface, in the one surface and the other surface opposed in a thickness direction of an optical glass plate 360 as shown in FIG. 20.

Other than the structure of the two-wavelength supported diffraction grating 300A shown in FIG. 20, for example, a two-wavelength supported diffraction grating 300B has been proposed that has a structure shown in FIG. 21 (see e.g., Japanese Patent Application Laid-Open Publication No. 2007-149249 (page 1, FIGS. 1 to 7)). For example, the two-wavelength supported diffraction grating 300B is configured such that the DVD diffraction grating 340 and the CD diffraction grating 320 including a liquid crystal material, etc., are fixed in superposed relation and thereafter, the fixed gratings are sandwiched between two optical glass plates 361 and 362 to be fixed.

However, in a case where the two-wavelength supported diffraction grating 300A or 300B made up by combining the CD diffraction grating 320 and the DVD diffraction grating 340 as above is used, for example, when a first laser beam of the CD standard is made incident on the CD diffraction grating 320, the first laser beam is diffracted by the CD diffraction grating 320 and split into three beams, which are a main beam (0th order light) and two sub-beams (±1st order diffracted light beams). The three beams are further diffracted and branched by the DVD diffraction grating 340.

Since the first laser beam or the second laser beam emitted from the multi-laser unit passes through both the CD diffraction grating 320 and the DVD diffraction grating 340 of the two-wavelength supported diffraction grating 300A or 300B as above, diffraction and splitting occur in each of the CD and DVD diffraction gratings 320 and 340, resulting in unnecessary diffracted light being generated. As a result, a problem occurs that detection accuracy of the error-signal such as the tracking error signal, etc., deteriorates.

For example, due to the generation of the unnecessary diffracted light, the transmission rates of the diffraction gratings 320 and 340 for the 0th order light and the ±1st order diffracted light beam deteriorates and, as a result, a problem occurs that utilization efficiency deteriorates in the outgoing light emitted from the multi-laser unit.

To enable support for a plurality of types of optical discs D having different track pitches Dtp such as a DVD-ROM, DVD-R, DVD-RW, DVD-RAM (versions 1, 2.0, and 2.1) without trouble, a market requires an advanced optical pickup apparatus in which control such as tracking control can easily be performed and an optical disc apparatuses including the advanced optical pickup apparatus in which the control such as the tracking control can easily be performed.

For example, the market requires an optical pickup apparatus in which an offset of the error signal such as a tracking error signal does not remain and an optical pickup apparatus in which amplitudes of the error signals such as a tracking error signal does not deteriorate with displacement of the objective lens 250, when recording/reproducing data into/from a plurality of types of optical discs D having different track pitches Dtp.

An inexpensive optical pickup apparatus and an inexpensive optical disc apparatus are required along with solutions to the above problems.

SUMMARY OF THE INVENTION

An optical pickup apparatus according to an aspect of the present invention, comprises at least: a diffraction grating configured to split first wavelength light into at least a first main beam and first sub-beam, and to split second wavelength light into at least a second main beam and second sub-beam, the diffraction grating including a diffraction surface portion corresponding to the second wavelength light; and a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam, a distance between the first main light-receiving unit and first sub-light-receiving unit being changed relative to a standardized distance between the first main light-receiving unit and first sub-light-receiving unit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
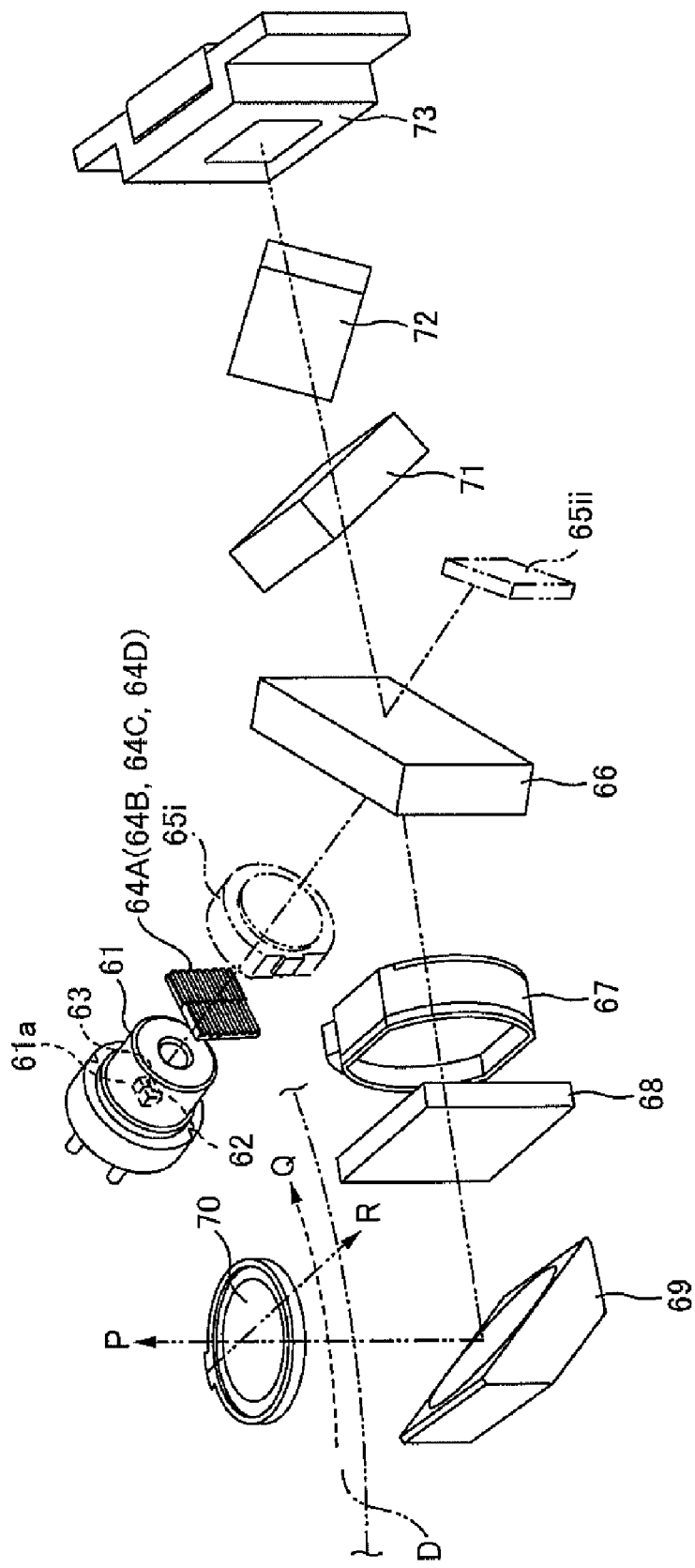
FIG. 1 is an optical arrangement diagram of an optical pickup apparatus according to an embodiment of the present invention.

At least the following details will become apparent from descriptions of this specification and of the accompanying drawings.

An optical pickup apparatus according to an embodiment of the present invention includes at least: a diffraction surface portion that splits first wavelength light into at least a first main beam and first sub-beam, and that splits second wavelength light into at least a second main beam and second sub-beam, which portion corresponding to the second wavelength light; and a photodetector including a first main light-receiving unit to be applied with the first main beam, a first sub-light-receiving unit to be applied with the first sub-beam, a second main light-receiving unit to be applied with the second main beam, and a second sub-light-receiving unit to be applied with the second sub-beam, and wherein a distance between the first main light-receiving unit and the first sub-light-receiving unit is changed relative to a standardized distance between the first main light receiving-unit and the first sub-light-receiving unit.

With a configuration as above, the optical pickup apparatus is configured in which generation of unnecessary light is suppressed. If the optical pickup apparatus is provided with the diffraction grating including the diffracting surface portion corresponding to the second wavelength light, and the first wavelength light is split into at least the first main beam and the first sub-beam when the first wavelength light passes through the diffracting surface portion of the diffraction grating corresponding to the second wavelength light, it is substantially avoided that the unnecessary light is generated when the first wavelength light passes through the diffraction grating. The second wavelength light is split into at least the second main beam and the second sub-beam substantially without the unnecessary light being generated, when the second wavelength light passes through the diffraction grating surface portion of the diffraction grating corresponding to the second wavelength light. In this photodetector, since the distance between the first main light receiving unit and the first sub-light-receiving unit is changed relative to the standardized distance between the first main light receiving unit and the first sub-light-receiving unit, such a problem is avoided that when the first wavelength light passes through the diffraction grating surface portion of the diffraction grating corresponding to the second wavelength light, the first sub-beam of the first wavelength light, which is obtained by splitting with the diffraction grating surface portion of the diffraction grating corresponding to the second wavelength light, is not applied to the first sub-light-receiving unit of the photodetector. Standardization according to an embodiment of the present invention is used, for convenience, to describe a general thing, etc., which have been widely available, for example. The first sub-beam of the first wavelength light, which is obtained by splitting substantially without the unnecessary light being generated when the first wavelength light passes through the diffraction grating surface portion of the diffraction grating corresponding to the second wavelength light, is applied to the first sub-light-receiving unit of the photodetector with the distance changed relative to the first main light receiving unit. The first main beam of the first wavelength light, which is obtained by splitting substantially without the unnecessary light being generated when the first wavelength light passes through the diffraction grating surface portion of the diffraction grating corresponding to the second wavelength light, is applied to the first main light receiving unit of the photodetector. The second sub-beam of the second wavelength light, which is obtained by splitting substantially without the unnecessary light being generated when the second wavelength light passes through the diffraction grating surface portion of the diffraction grating corresponding to the second wavelength light, is applied to the second sub-light-receiving unit of the photodetector. The second main beam of the second wavelength light, which is obtained by splitting substantially without the unnecessary light being generated when the second wavelength light passes through the diffraction grating surface portion of the diffraction grating corresponding to the second wavelength light, is applied to the second main light receiving unit of the photodetector.

In the optical pickup apparatus according to an embodiment of the present invention, the changed distance between the first main light receiving unit and the first sub-light-receiving unit is set longer than the standardized distance between the first main light receiving unit and the first sub-light-receiving unit.

With a configuration as above, the optical pickup apparatus is configured in which signal detection accuracy is improved. It becomes easier to avoid that the first main beam, which is generated by splitting the first wavelength light with the diffraction grating surface portion of the diffraction grating, adversely affects the first sub-light-receiving unit of the photodetector. It becomes easier to avoid that the first sub-beam, which is generated by splitting the first wavelength light with the diffraction grating surface portion of the diffraction grating, adversely affects the first main light receiving unit of the photodetector. For example, if the changed distance between the first main light receiving unit and the first sub-light-receiving unit is set shorter than the standardized distance between the first main light receiving unit and the first sub-light-receiving unit, it is concerned that the first main beam interferes with the first sub-light-receiving unit of the photodetector. For example, if the changed distance between the first main light receiving unit and the first sub-light-receiving unit is set shorter than the standardized distance between the first main light receiving unit and the first sub-light-receiving unit, it is concerned that the first sub-beam interferes with the first main light receiving unit of the photodetector. However, the changed distance between the first main light receiving unit and the first sub-light-receiving unit is set longer than the standardized distance between the first main light receiving unit and the first sub-light-receiving unit, and thus, it becomes easier to avoid that the first main beam interferes with the first sub-light-receiving unit when the first main beam is applied to the first main light receiving unit of the photodetector. Since the changed distance between the first main light receiving unit and the first sub-light-receiving unit is set longer than the standardized distance between the first main light receiving unit and the first sub-light-receiving unit, and thus, it becomes easier to avoid that the first sub-beam interferes with the first main light receiving unit when the first sub-beam is applied to the first sub-light-receiving unit of the photodetector.

In the optical pickup apparatus according to an embodiment of the present invention, when a value of the standardized distance between the first main light receiving unit and the first sub-light-receiving unit is defined as a value of 100%, a value of the changed distance between the first main light receiving unit and the first sub-light-receiving unit is set at a value of substantially 111% relative to a value of the standardized distance between the first main light receiving unit and the first sub-light-receiving unit.

With a configuration as above, the optical pickup apparatus is configured in which signal detection accuracy is improved. It is avoided that the first main beam, which is obtained by splitting the first wavelength light with the diffraction grating surface portion of the diffraction grating, adversely affects the first sub-light-receiving unit of the photodetector. It is avoided that the first sub-beam, which is obtained by splitting the first wavelength light with the diffraction grating surface portion of the diffraction grating, adversely affects the first main light receiving unit of the photodetector. For example, if the changed distance between the first main light receiving unit and the first sub-light-receiving unit is set shorter than the standardized distance between the first main light receiving unit and the first sub-light-receiving unit, it is concerned that the first main beam interferes with the first sub-light-receiving unit of the photodetector. For example, if the changed distance between the first main light receiving unit and the first sub-light-receiving unit is set shorter than the standardized distance between the first main light receiving unit and the first sub-light-receiving unit, it is concerned that the first sub-beam interferes with the first main light receiving unit of the photodetector. However, when a value of the standardized distance between the first main light receiving unit and the first sub-light-receiving unit is defined as a value of 100%, a value of the changed distance between the first main light receiving unit and the first sub-light-receiving unit is set at a value of substantially 111% relative to the standardized value of the distance between the first main light receiving unit and the first sub-light-receiving unit, and thus, it is avoided that the first main beam interferes with the first sub-light-receiving unit when the first main beam is applied to the first main light receiving unit of the photodetector. When a value of the standardized distance between the first main light receiving unit and the first sub-light-receiving unit is defined as a value of 100%, a value of the changed distance between the first main light receiving unit and the first sub-light-receiving unit is set at a value of substantially 111% relative to the value of the standardized distance between the first main light receiving unit and the first sub-light-receiving unit, and thus, it is avoided that the first sub-beam interferes with the first main light receiving unit when the first sub-beam is applied to the first sub-light-receiving unit of the photodetector.

In the optical pickup apparatus according to an embodiment of the present invention, when a value of a standardized distance between the second main light receiving unit and the second sub-light-receiving unit is defined as a value of 100%, a value of a distance between the second main light receiving unit and the second sub-light-receiving unit is set at a value of substantially 100% relative to a value of the standardized distance between the second main light receiving unit and the second sub-light-receiving unit.

With a configuration as above, the optical pickup apparatus is configured in which signal detection accuracy is improved. It is avoided that the second main beam, which is obtained by splitting the second wavelength light with the diffraction grating surface portion of the diffraction grating, adversely affects the second sub-light-receiving unit of the photodetector. It is avoided that the second sub-beam, which is obtained by splitting the second wavelength light with the diffraction grating surface portion of the diffraction grating, adversely affects the second main light receiving unit of the photodetector. For example, if the distance between the second main light receiving unit and the second sub-light-receiving unit is set shorter than the standardized distance between the second main light receiving unit and the second sub-light-receiving unit, it is concerned that the second main beam interferes with the second sub-light-receiving unit of the photodetector. For example, if the distance between the second main light receiving unit and the second sub-light-receiving unit is set shorter than the standardized distance between the second main light receiving unit and the second sub-light-receiving unit, it is concerned that the second sub-beam interferes with the second main light receiving unit of the photodetector. However, when a value of the standardized distance between the second main light receiving unit and the second sub-light-receiving unit is defined as a value of 100%, a value of the distance between the second main light receiving unit and the second sub-light-receiving unit is set at a value of substantially 100% relative to a value of the standardized distance between the second main light receiving unit and the second sub-light-receiving unit, and thus, it is avoided that the second main beam interferes with the second sub-light-receiving unit when the second main beam is applied to the second main light receiving unit of the photodetector. When a value of the standardized distance between the second main light receiving unit and the second sub-light-receiving unit is defined as a value of 100%, a value of the distance between the second main light receiving unit and the second sub-light-receiving unit is set at a value of substantially 100% relative to a value of the standardized distance between the second main light receiving unit and the second sub-light-receiving unit, and thus, it is avoided that the second sub-beam interferes with the second main light receiving unit when the second sub-beam is applied to the second sub-light-receiving unit of the photodetector.

The optical pickup apparatus according to an embodiment of the present invention includes at least: a diffraction surface portion that splits first wavelength light into at least a first main beam and first sub-beam, and that splits second wavelength light into at least a second main beam and second sub-beam, which portion corresponding to the second wavelength light; and a photodetector including a first main light-receiving unit to be applied with the first main beam, a first sub-light-receiving unit to be applied with the first sub-beam, a second main light-receiving unit to be applied with the second main beam, and a second sub-light-receiving unit to be applied with the second sub-beam, and wherein that a split light ratio among the first sub-light-receiving unit on a front side, the first main light-receiving unit at a center, and the first sub-light-receiving unit on a back side is changed relative to a standardized split light ratio among the first sub-light-receiving unit on the front side, the first main light-receiving unit at the center, and the first sub-light-receiving unit on the back side, when the repositioned first sub-light-receiving units are disposed in a pairwise manner across the first main light-receiving unit as a center, and the first sub-light-receiving unit on the front side, the first main light-receiving unit at the center, and the first sub-light-receiving unit on the back side are provided side by side.

With a configuration as above, the optical pickup apparatus is configured in which generation of the unnecessary light is suppressed. If the optical pickup apparatus is provided with the diffraction grating including the diffracting surface portion corresponding to the second wavelength light, and the first wavelength light is split into at least the first main beam and the first sub-beam when the first wavelength light passes through the diffracting surface portion of the diffraction grating corresponding to the second wavelength light, it is substantially avoided that the unnecessary light is generated when the first wavelength light passes through the diffraction grating. The second wavelength light is split into at least the second main beam and the second sub-beam substantially without the unnecessary light being generated, when the second wavelength light passes through the diffraction grating surface portion of the diffraction grating corresponding to the second wavelength light. It becomes easier to perform detection of the first main beam and detection of the first sub-beam with sufficient accuracy by the photodetector in which setting is changed. When the first wavelength light passes through the diffraction grating including the diffraction grating surface portion corresponding to the second wavelength light, and the first wavelength light is split into at least the first sub-beam on the front side, the first main beam at the center, and the first sub-beam on the back side; if the spirit light ratio among the first sub-light-receiving unit on the front side applied with the first sub-beam on the front side, the first main light-receiving unit at the center applied with the first main beam at the center, and the first sub-light-receiving unit on the back side applied with the first sub-beam on the back side, is changed relative to the standardized split light ratio among the first sub-light-receiving unit on the front side, the first main light-receiving unit at the center, and the first sub-light-receiving unit on the back side; it becomes easier to perform detection of first main beam and the detection of the first sub-beam with sufficient accuracy by the photodetector in which setting is changed.

In that, in the optical pickup apparatus according to an embodiment of the present invention, when the repositioned first sub-light-receiving units are disposed in a pairwise manner across the first main light-receiving unit as a center, and the first sub-light-receiving unit on the front side, the first main light-receiving unit at the center, and the first sub-light-receiving unit on the back side are provided side by side, a split light ratio among the first sub-light-receiving unit on the front side, the first main light-receiving unit at the center, and the first sub-light-receiving unit on the back side is set substantially at 1:(20 to 26):1.

With a configuration as above, detection of the first main beam and detection of the first sub-beam are performed with sufficient accuracy by the photodetector in which setting is changed. For example, when the first wavelength light passes through a existing diffraction grating including the first diffraction grating surface portion corresponding to the first wavelength light and the second diffraction grating surface portion corresponding to the second wavelength light, and the first wavelength light is split into at least the first sub-beam on the front side, the first main beam at the center, and the first sub-beam on the back side; the split light ratio among the first sub-light-receiving unit on the front side applied with the first sub-beam on the front side, the first main light receiving unit at the center applied with the first main beam at the center, and the first sub-light-receiving unit on the back side applied with the first sub-beam on the back side, is set substantially at 1:16:1, for example; and thus, detection of the first main beam and detection of the first sub-beam were performed with sufficient accuracy by the standardized photodetector. However, when the diffraction grating surface portion corresponding to the first wavelength light is omitted, and when the first wavelength light passes through the diffraction grating including the diffraction grating surface portion corresponding to the second wavelength light, and the first wavelength light is split into at least the first sub-beam on the front side, the first main beam at the center, and the first sub-beam on the back side; if the split light ratio among the first sub-light-receiving unit on the front side applied with the first sub-beam on the front side, the first main light receiving unit at the center applied with the first main beam at the center, and the first sub-light-receiving unit on the back side applied with the first sub-beam on the back side, is set substantially at 1:16:1, for example; it is concerned that detection of the first main beam and detection of the first sub-beam are not performed with sufficient accuracy in the standardized photodetector. On the other hand, when the first wavelength light passes through the diffraction grating including the diffraction grating surface portion corresponding to the second wavelength light, and the first wavelength light is split into at least the first sub-beam on the front side, the first main beam at the center, and the first sub-beam on the back side; if the split light ratio among the first sub-light-receiving unit on the front side applied with the first sub-beam on the front side, the first main light receiving unit at the center applied with the first main beam at the center, and the first sub-light-receiving unit on the back side applied with the first sub-beam on the back side, is set substantially at 1:(20-26):1; detection of the first main beam and detection of the first sub-beam are performed with sufficient accuracy by the photodetector in which setting is changed. When the split light ratio among the first sub-light-receiving unit on the front side applied with the first sub-beam on the front side, the first main light receiving unit at the center applied with the first main beam at the center, and the first sub-light-receiving unit on the back side applied with the first sub-beam on the back side, is set substantially at 1: (less than 20):1, for example, or when this split light ratio is substantially set at 1:(more than 26):1, for example, it is concerned that detection of the first main beam and detection of the first sub-beam are not performed with sufficient accuracy; however, if this split light ratio is set substantially at 1:(20-26):1, or preferably set substantially at 1:(21-25):1, detection of the first main beam and detection of the first sub-beam are performed with sufficient accuracy.

In the optical pickup apparatus according to an embodiment of the present invention, when the second sub-light-receiving units are disposed in a pairwise manner across the second main light receiving unit as a center, and the second sub-light-receiving unit on the front side, the second main light-receiving unit at the center, and the second sub-light-receiving unit on the back side are provided side by side, a split light ratio among the second sub-light-receiving unit on the front side, the second main light-receiving unit at the center, and the second sub-light-receiving unit on the back side is set substantially at 1:(12-18):1.

With a configuration as above, detection of the second main beam and detection of the second sub-beam are performed with sufficient accuracy by the photodetector. When the second wavelength light passes through the diffraction grating including the diffraction grating surface portion corresponding to the second wavelength light, and the second wavelength light is split into at least the second sub-beam on the front side, the second main beam at the center, and the second sub-beam on the back side; if the split light ratio among the second sub-light-receiving unit on the front side applied with the second sub-beam on the front side, the second main light-receiving unit at the center applied with the second main beam at the center, and the second sub-light-receiving unit on the back side applied with the second sub-beam on the back side, is set substantially at 1:(12-18):1; detection of the second main beam and detection of the second sub-beam are performed with sufficient accuracy by the photodetector. When the split light ratio among the second sub-light-receiving unit on the front side applied with the second sub-beam on the front side, the second main light-receiving unit at the center applied with the second main beam at the center, and the second sub-light-receiving unit on the back side applied with the second sub-beam on the back side, is set substantially at 1:(less than 12):1, for example, or when this split light ratio is set substantially at 1:(more than 18):1, for example, it is concerned that detection of the second main beam and detection of the second sub-beam are not performed with sufficient accuracy; however, if this split light ratio is set substantially at 1:(12-18):1 or preferably set substantially at 1:(14-18):1, detection of the second main beam and detection of the second sub-beam are performed with sufficient accuracy.

The optical pickup apparatus according to an embodiment of the present invention includes at least: a diffraction surface portion that splits first wavelength light into at least a first main beam and first sub-beam, and that splits second wavelength light into at least a second main beam and second sub-beam, which portion corresponding to the second wavelength light; and a photodetector including a first main light-receiving unit to be applied with the first main beam, a first sub-light-receiving unit to be applied with the first sub-beam, a second main light-receiving unit to be applied with the second main beam, and a second sub-light-receiving unit to be applied with the second sub-beam, and wherein a value of light-receiving sensitivity in the first main light receiving unit is changed relative to or is equal to a value of standardized light-receiving sensitivity in the first main light-receiving unit, and a value of light-receiving sensitivity in the first sub-light-receiving unit is changed relative to the value of the standardized light-receiving sensitivity in the first sub-light-receiving unit.

With a configuration as above, the optical pickup apparatus is configured in which generation of the unnecessary light is suppressed. If the optical pickup apparatus is provided with the diffraction grating including the diffracting surface portion corresponding to the second wavelength light, and the first wavelength light is split into at least the first main beam and the first sub-beam when the first wavelength light passes through the diffracting surface portion of the diffraction grating corresponding to the second wavelength light, it is substantially avoided that the unnecessary light is generated when the first wavelength light passes through the diffraction grating. The second wavelength light is split into at least the second main beam and the second sub-beam substantially without the unnecessary light being generated, when the second wavelength light passes through the diffraction grating surface portion of the diffraction grating corresponding to the second wavelength light. It becomes easier to perform detection of the first main beam and detection of the first sub-beam with sufficient accuracy by the photodetector in which setting is changed. Since a value of light-receiving sensitivity in a first main light receiving unit is changed relative to or equal to a value of standardized light-receiving sensitivity in the first main light receiving unit, and a value of light-receiving sensitivity in a first sub-light-receiving unit is changed relative to a value of standardized light-receiving sensitivity in the first sub-light-receiving unit, it becomes easier to perform detection of the first main beam and detection of the first sub-beam with sufficient accuracy by the photodetector in which setting is changed.

In the optical pickup apparatus according to an embodiment of the present invention, when a value of the standardized light-receiving sensitivity in the first main light-receiving unit is defined as a value of 100%, a changed or equal value of the light-receiving sensitivity in the first main light-receiving unit is set at a lower value of substantially 100% or less relative to the value of the standardized light-receiving sensitivity in the first main light-receiving unit, and when a value of the standardized light-receiving sensitivity in the first sub-light-receiving unit is defined as a value of 100%, a changed value of the light-receiving sensitivity in the first sub-light-receiving unit is set at a higher value of substantially 100% or greater relative to the value of the standardized light-receiving sensitivity in the first sub-light-receiving unit.

With a configuration as above, it becomes easier to perform detection of the first main beam and detection of the first sub-beam with sufficient accuracy by the photodetector in which setting is changed. A changed or equal value of light-receiving sensitivity in a first main light-receiving unit is set at a lower value of substantially 100% or less while a value of standardized light-receiving sensitivity in the first main light-receiving unit is set at a value of 100%, and a changed value of light-receiving sensitivity in a first sub-light-receiving unit is set at a higher value of substantially 100% or greater while a value of standardized light-receiving sensitivity in the first sub-light-receiving unit is set at a value of 100%, and thus, it becomes easier to perform detection of the first main beam and detection of the first sub-beam with sufficient accuracy by the photodetector in which setting is changed.

In the optical pickup apparatus according to an embodiment of the present invention, when a value of the standardized light-receiving sensitivity in the first main light-receiving unit is defined as a value of 100%, a changed or equal value of the light-receiving sensitivity in the first main light-receiving unit is set at a value of substantially 95 to 100% relative to the value of the standardized light-receiving sensitivity in the first main light-receiving unit, and when a value of the standardized light-receiving sensitivity in the first sub-light-receiving unit is defined as a value of 100%, a changed value of the light-receiving sensitivity in the first sub-light-receiving unit is set at a value of substantially 120 to 160% relative to the value of the standardized light-receiving sensitivity in the first sub-light-receiving unit.

With a configuration as above, it becomes easier to perform detection of the first main beam and detection of the first sub-beam with sufficient accuracy by the photodetector in which setting is changed. A changed or equal value of light-receiving sensitivity in a first main light-receiving unit is set at a value of substantially 95 to 100% while a value of standardized light-receiving sensitivity in the first main light-receiving unit is set at a value of 100%, and a changed value of light-receiving sensitivity in a first sub-light-receiving unit is set at a value of substantially 120 to 160% while a value of standardized light-receiving sensitivity in the first sub-light-receiving unit is set at a value of 100%, and thus, it becomes easier to perform detection of the first main beam and detection of the first sub-beam with sufficient accuracy by the photodetector in which setting is changed.

In the optical pickup apparatus according to an embodiment of the present invention, when a value of standardized light-receiving sensitivity in the second main light-receiving unit is defined as a value of 100%, a value of light-receiving sensitivity in the second main light-receiving unit is set at a value of substantially 100% relative to the value of the standardized light-receiving sensitivity in the second main light-receiving unit, and when a value of standardized light-receiving sensitivity in the second sub-light-receiving unit is defined as a value of 100%, a value of light-receiving sensitivity in the second sub-light-receiving unit is set at a value of substantially 100% relative to the value of the standardized light-receiving sensitivity in the second sub-light-receiving unit.

With a configuration as above, detection of the second main beam and detection of the second sub-beam are performed with sufficient accuracy by the photodetector. A value of light-receiving sensitivity in a second main light-receiving unit is set at a value of substantially 100% while a value of standardized light-receiving sensitivity in the second main light-receiving unit is set at a value of 100%, and a value of light-receiving sensitivity in a second sub-light-receiving unit is set at a value of substantially 100% while a value of standardized light-receiving sensitivity in the second sub-light-receiving unit is set at a value of 100%, and thus, it becomes easier to perform detection of the second main beam and detection of the second sub-beam with sufficient accuracy by the photodetector.

With a configuration as above, the optical pickup apparatus is configured in which generation of the unnecessary light is suppressed. It becomes easier to perform detection of the first main beam and detection of the first sub-beam with sufficient accuracy by the photodetector in which setting is changed.

In the optical pickup apparatus according to an embodiment of the present invention, the diffraction surface portion combines a diffraction surface portion that splits the first wavelength light into at least the first main beam and the first sub-beam and a diffraction surface portion that splits the second wavelength light into at least the second main beam and the second sub-beam.

With a configuration as above, the optical pickup apparatus is configured in which generation of unnecessary diffracted light is suppressed in the diffraction grating, reduction in light efficiency is prevented, and a price may be further reduced. If a diffraction surface portion of a diffraction grating combines a diffraction surface portion that splits the first wavelength light into at least the first main beam and the first sub-beam and a diffraction surface portion that splits the second wavelength light into at least the second main beam and the second sub-beam, it is avoided that the first wavelength light is unnecessarily diffracted to reduce efficiency of the first wavelength light, and that the second wavelength light is unnecessarily diffracted to reduce efficiency of the second wavelength light. The diffraction grating surface portion of the diffraction grating combines the diffraction surface portion that splits the first wavelength light into at least the first main beam and the first sub-beam and the diffraction surface portion that splits the second wavelength light into at least the second main beam and the second sub-beam, and thus, the diffraction grating is configured, in which portions to be processed, man-hours, etc., are reduced. Since portions to be processed, man-hours, etc., are reduced in the diffraction grating, a price of the diffraction grating is reduced. Accordingly, it becomes possible to make up the optical pickup apparatus in which the price thereof may is reduced.

In the optical pickup apparatus according to an embodiment of the present invention, the diffraction grating is divided into a plurality of area portions.

With a configuration as above, it becomes easier to perform error signal detection for media in a preferable manner in the optical pickup apparatus. For example, it becomes easier to perform tracking for media in a preferable manner in the optical pickup apparatus. A medium means an item for recording information to be mediated or recording information to be conveyed. Tracking in an optical pickup apparatus means that an operation of following runout in a radial direction of a medium and keeping a position of a spot on a target track. Since the diffraction grating is made up including a plurality of area portions which are divided, at least three separate spots are applied to a medium. Since at least three separate spots are applied to a medium independently, it becomes easier to prevent detection accuracy of error signals such as tracking error signals from deteriorating when recording/reproduction is performed for two or more types of media.

In the optical pickup apparatus according to an embodiment of the present invention, the diffraction grating is divided into an even number of area portions.

With a configuration as above, spots formed on media are formed as accurate spots. For example, since the diffraction grating is divided into an even number of one area portion and the other area portion, it becomes easier to apply light that is applied to the diffraction grating substantially equally to the one area portion of the diffraction grating and the other area portion of the diffraction grating when the diffraction grating is mounted on the optical pickup apparatus. Since it becomes easier to apply the light substantially equally to the one area portion of the diffraction grating and the other area portion of the diffraction grating, the diffraction grating is mounted on the optical pickup apparatus with sufficient accuracy. Therefore, it becomes easier to form spots on media with sufficient accuracy. Accordingly, there is improved detection accuracy of the error signals when recording/reproduction is performed for two or more types of media.

In the optical pickup apparatus according to an embodiment of the present invention, the diffraction grating is divided into at least four parts of a first area portion, a second area portion, a third area portion, and a fourth area portion.

With a configuration as above, it becomes easier to perform error signal detection for media in a preferable manner in the optical pickup apparatus. For example, tracking is performed for media in a preferable manner in the optical pickup apparatus. Since the diffraction grating is made up including four area portions that are divided, at least three separate spots are applied to a medium. Since at least three separate spots are applied to a medium independently, it is avoided that detection accuracy of error signals such as tracking error signals deteriorates when recording/reproduction is performed for two or more types of media.

The optical pickup apparatus according to an embodiment of the present invention further includes a light-emitting element capable of emitting light having a plurality of wavelengths.

With a configuration as above, the optical pickup apparatus is reduced in price with reduction in the number of parts thereof. The light-emitting element is configured as such a light-emitting element as to emit a plurality of types of wavelength light, which is capable of emitting two or more types of wavelength light, i.e., the first wavelength light and the second wavelength light having a wavelength different from that of the first wavelength light, and thus, the optical pickup apparatus may support various types of media. Accordingly, since a light emitting element capable of emitting the first wavelength light and a light-emitting element capable of emitting the second wavelength light are integrated into one light-emitting element, the optical pickup apparatus may be reduced in the number of parts. The optical pickup apparatus is reduced in price with reduction in the number of parts thereof. Therefore, the optical pickup apparatus that is reduced in price is provided.

In the optical pickup apparatus according to an embodiment of the present invention, the first wavelength light has a wavelength of substantially 765 to 830 nm, and the second wavelength light has a wavelength of substantially 630 to 685 nm.

With a configuration as above, it is substantially avoided that the unnecessary light is generated when the first wavelength light having a wavelength of substantially 765 to 830 nm passes through the diffraction grating. It is also substantially avoided that the unnecessary light is generated when the second wavelength light having a wavelength of substantially 630 to 685 nm passes through the diffraction grating. The first sub-beam of the first wavelength light of predetermined wavelength light, which is obtained by splitting substantially without the unnecessary light being generated when the first wavelength light of the predetermined wavelength light passes through the diffraction grating surface portion of the diffraction grating corresponding to the second wavelength light, is applied to the first sub-light-receiving unit of the photodetector, in which the distance between the first main light receiving unit and the sub-light-receiving unit is changed. The first main beam of the first wavelength light of the predetermined wavelength light, which is obtained by splitting substantially without the unnecessary light being generated when the first wavelength light of the predetermined wavelength light passes through the diffraction grating surface portion of the diffraction grating corresponding to the second wavelength light, is applied to the first main light receiving unit of the photodetector. The second wavelength light of predetermined wavelength light is split into at least the second main beam and the second sub-beam, substantially without the unnecessary light being generated when the second wavelength light of the predetermined wavelength light passes through the diffraction grating surface portion of the diffraction grating corresponding to the second wavelength light. The second sub-beam of the second wavelength light of the predetermined wavelength light is applied to the second sub-light-receiving unit of the photodetector, and the second main beam of the second wavelength light of the predetermined wavelength light is applied to the second main light receiving unit of the photodetector.

In the optical pickup apparatus according to an embodiment of the present invention, the first wavelength light has a wavelength of substantially 630 to 685 nm, and the second wavelength light has a wavelength of substantially 340 to 450 nm.

With a configuration as above, it is substantially avoided that the unnecessary light is generated when the first wavelength light having a wavelength of substantially 630 to 685 nm passes through the diffraction grating. It is substantially avoided that the unnecessary light is generated when the second wavelength light having a wavelength of substantially 340 to 450 nm passes through the diffraction grating. The first sub-beam of the first wavelength light of the predetermined wavelength light, which is obtained by splitting substantially without the unnecessary light being generated when the first wavelength light of the predetermined wavelength light passes through the diffraction grating surface portion of the diffraction grating corresponding to the second wavelength light, is applied to the first sub-light-receiving unit of the photodetector, in which the distance between the first main light receiving unit and the sub-light-receiving unit is changed. The first main beam of the first wavelength light of the predetermined wavelength light, which is obtained by splitting substantially without the unnecessary light being generated when the first wavelength light of the predetermined wavelength light passes through the diffraction grating surface portion of the diffraction grating corresponding to the second wavelength light, is applied to the first main light receiving unit of the photodetector. The second wavelength light of the predetermined wavelength light is split into at least the second main beam and the second sub-beam, substantially without the unnecessary light being generated when the second wavelength light of the predetermined wavelength light passes through the diffraction grating surface portion of the diffraction grating corresponding to the second wavelength light. The second sub-beam of the second wavelength light of the predetermined wavelength light is applied to the second sub-light-receiving unit of the photodetector, and the second main beam of the second wavelength light of the predetermined wavelength light is applied to the second main light receiving unit of the photodetector.

The optical pickup apparatus according to an embodiment of the present invention is capable of supporting a medium having a plurality of signal surface portions.

With a configuration as above, there are preferably performed an operation of reading signals and information by the optical pickup apparatus from a medium having a plurality of signal surface portions, and/or an operation of writing signals and information by the optical pickup apparatus to the medium having a plurality of the signal surface portions. Since the optical pickup apparatus is configured in which generation of the unnecessary light is suppressed, it is avoided that a problem occurs, for example, when an operation is performed of reading signals, information, etc., from the medium having a plurality of the signal surface portions or writing signals, information, etc., to the medium having a plurality of the signal surface portions, by the optical pickup apparatus.

The optical pickup apparatus according to an embodiment of the present invention includes: a laser unit including a first light source and a second light source disposed on the same surface, the first light source that emits a first laser beam, the second light source configured that emits a second laser beam having a wavelength shorter than a wavelength of the first laser beam; a diffraction grating including a grating spacing corresponding to the wavelength of the second laser beam, the diffraction grating configured to diffract the first laser beam or second laser beam to generate a main beam and two sub-beams; a light converging optical system configured to converge the main beam and two sub-beams to apply a main spot corresponding to the main beam and two sub-spots corresponding to the two sub-beams in such a manner that the main spot and two sub-spots are arranged substantially in a line on a track of an optical disc; and a photodetector including a first main light-receiving unit and two first sub-light-receiving units, the first main light-receiving unit being applied with a reflected spot corresponding to the main spot reflected from the optical disc, and the two first sub-light-receiving units being applied with reflected spots corresponding respectively to the two sub-spots reflected from the optical disc, after the main spot and two sub-spots corresponding to the first laser beam are applied to the optical disc, and a second main light-receiving unit and second sub-light-receiving units, the second main light-receiving unit being applied with a reflected spot corresponding to the main spot reflected from the optical disc, and the second sub-light-receiving units being applied with two reflected spots corresponding respectively to the two sub-spots reflected from the optical disc, after the main spot and two sub-spots corresponding to the second laser beam are applied to the optical disc; and wherein a distance between the first main light-receiving unit and the first sub-light-receiving unit and a distance between the second main light-receiving unit and the second sub-light-receiving unit is set, based on a distance between a first irradiation point of the main spot corresponding to a first light-emitting point, which irradiation point is indicative of a position of the first or second light source on a surface of the laser unit facing a surface of the diffraction grating, and a second irradiation point of the sub-spot corresponding to a second light-emitting point, which irradiation point is indicative of an apparent position of the first or second light source on the surface of the laser unit, the position being set based on a normal line distance between the first light-emitting point and the surface of the diffraction grating and on a diffraction angle of the diffraction grating.

With a configuration as above, there is provided the optical pickup apparatus conforming to two laser beams having wavelengths different from each other, in which detection accuracy of error signals is improved and generation of the unnecessary diffracted light being suppressed.

The optical disc apparatus according to an embodiment of the present invention includes at least the optical pickup apparatus.

With a configuration as above, the optical disc apparatus including at least the optical pickup apparatus in which generation of the unnecessary light is suppressed. According to the present invention, it is possible to make up the optical pickup apparatus in which generation of the unnecessary light is suppressed. According to the present invention, it is possible to perform detection of the first main beam and detection of the first sub-beam with sufficient accuracy by the photodetector in which setting is changed. According to the present invention, it is possible to provide the optical pickup apparatus conforming to two laser beams having wavelengths different from each other, in which detection accuracy of error signals is improved and generation of the unnecessary diffracted light being suppressed. According to the present invention, it is possible to make up the optical disc apparatus including at least the optical pickup apparatus in which generating of the unnecessary light is suppressed.

First Embodiment

Optical System of Optical Pickup Apparatus

Figure 2:
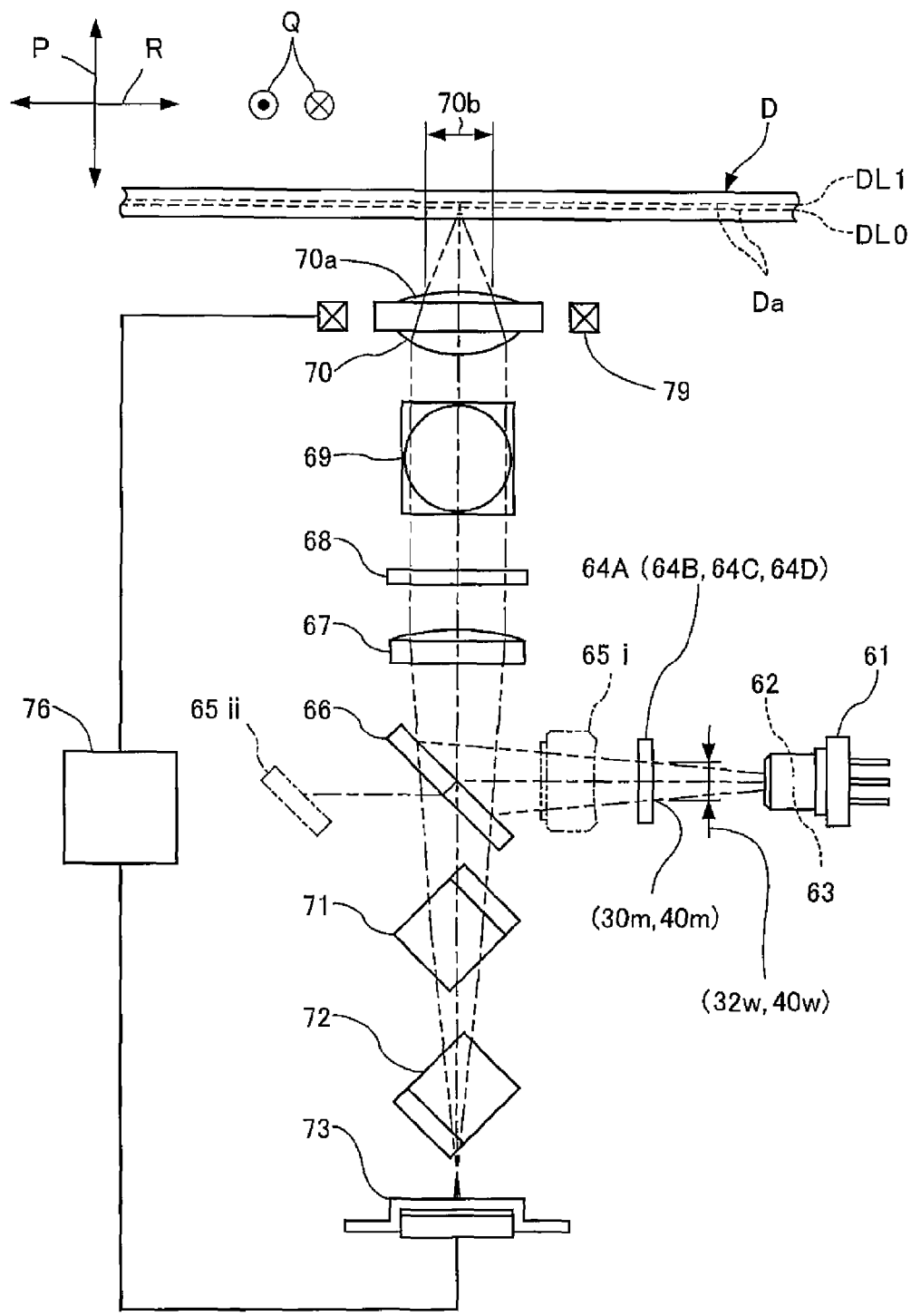
FIG. 2 is an explanatory diagram of the optical pickup apparatus according to an embodiment of the present invention.

FIG. 1 is an optical arrangement diagram of an optical pickup apparatus according to an embodiment of the present invention, and FIG. 2 is an explanatory diagram of an optical pickup apparatus according to an embodiment of the present invention.

An optical pickup apparatus according to an embodiment of the present invention supports a medium D such as an optical disc D of CD standard (CD-ROM, CD-R, CD-RW, etc.) or DVD standard (DVD-ROM, DVD-RAM (versions 1, 2.0, and 2.1), DVD-R, DVD+R, DVD-RW, DVD+RW, etc.) A medium means an item for recording information to be mediated or recording information to be conveyed. For example, here, the medium means a disc, etc., for storing data, information, signals, etc.

Discs include the above various optical discs. The discs include an optical disc D provided with signal surfaces on both sides of the disc and capable of writing/erasing data and rewriting data, for example. The discs include an optical disc D provided with signal surfaces of two layers and capable of writing/erasing data and rewriting data, for example. The discs include an "HD DVD" optical disc (not shown) provided with signal surfaces of three layers and capable of writing/erasing data and rewriting data, for example. The discs include a "Blu-ray Disc" optical disc (not shown) provided with signal surfaces of four layers and capable of writing/erasing data and rewriting data, for example. The discs include an optical disc D enabling various types of writing onto a label, etc., by applying a laser beam to the label surface of the disc, for example. A signal layer Da of the optical disc D is made up of a metal layer such as a metallic thin film, for example. Information, data, etc., are recorded onto the signal layer Da made up of a metallic thin film, etc.

An optical disc apparatus including the optical pickup apparatus can support the above various discs, for example. The optical disc apparatus including the optical pickup apparatus is used to reproduce data such as information recorded in the various optical discs. The optical disc apparatus including the optical pickup apparatus is used to record data such as information into the various optical discs.

A focusing detection method for an irradiation spot on the optical disc D in the present optical pickup apparatus is a detection method based on a differential astigmatic method, for example. As described above, the differential astigmatic method is, for example, a method of detecting displacement of an irradiation spot by detecting distortion of a point image formed by an optical system with astigmatism. The present optical pickup apparatus is an optical pickup apparatus including an optical system by the differential astigmatism method.

A tracking detection method for an irradiation spot on the optical disc D in the present optical pickup apparatus is a detection method based on a differential push-pull method or a phase difference method, for example. As described above, the differential push-pull method is, for example, a method of detecting displacement of an irradiation spot by a main beam for reading/writing data and two sub-beams for detecting a positional displacement correction signal. The phase difference method is, for example, a detection method based on a phase difference signal detected by a four-divided photodetector 73, for example.

A laser unit 61 is a multi-laser unit including, on the same light-emitting surface 61a, a first light source 62 that emits a first laser beam having a first wavelength (e.g., 782 nm) of substantially 765 nm to 830 nm in an infrared wavelength band suitable for the CD standard, and a second light source 63 that emits a second laser beam having a second wavelength (e.g., 655 nm) of substantially 630 nm to 685 nm in a red wavelength band suitable for the DVD standard. The laser unit 61 is configured as, for example, a two-wavelength light-emitting element 61 capable of emitting laser beams having two respective wavelengths, which are the first laser beam and the second laser beam having a wavelength different from that of the first laser beam and shorter than the first laser beam. As above, the laser unit 61 is the light-emitting element 61 capable of emitting laser beams having a plurality of respective wavelengths. The first light source 62 and the second light source 63 each is made up of a semiconductor laser element.

The first light source 62 and/or the second light source 63 making up the laser unit 61 emits a laser beam having an output value of 0.2 to 500 mW (milliwatt), specifically, 2 to 400 mW, for example. For example, in a case of a laser beam having an output value less than 0.2 mW, a light amount of the laser beam that reaches the photodetector 73 after being reflected by the optical disc D becomes insufficient. When reproducing data, etc., in the optical disc D, a laser beam having an output value of a few to several tens of milliwatts, for example, about 2 to 20 mW is supposed to be sufficient. When writing data, etc., into the optical disc D, a laser beam having an output value of several tens to several hundreds of milliwatts is supposed to be required. For example, when writing data, etc., into the optical disc D at high speed, a pulsed laser beam having a higher output value such as 400 mW or 500 MW may be required.

The laser unit 61 is configured as a CAN package type laser diode in a substantially cylindrical shape or substantially columnar shape, which has superior heat radiation characteristics, for example. For example, a substantially plate-like lead frame package type laser diode (not shown) capable of accommodating lower-profile and miniaturization may be used instead of the laser diode 61 of the CAN package type depending on design/specification, etc., of the optical pickup apparatus.

The first laser beam and the second laser beam emitted respectively from the first light source 62 and the second light source 63 are diffracted by a diffraction grating 64A to generate at least a total of three beams, which are a main beam (0th order light) and two sub-beams (±1st order diffracted light beams); adjusted in angle of divergence by a coupling lens 65i, for example; and reflected by a polarizing filter surface of a plate-type polarizing beam splitter 66.

The laser beam reflected by the polarizing beam splitter 66 is formed into parallel light by a collimating lens 67 that is an optical lens, converted into circularly-polarized light through a quarter-wave plate 68, made incident on an objective lens 70 that is an optical lens by bending a light axis with a reflection mirror 69, converged by the objective lens 70, and applied to the optical disc D.

The objective lens 70 is provided in the optical pickup apparatus in such a manner as to be movable substantially in a light axis direction of the objective lens 70 (P-axis direction), to be able to support the optical disc D including a plurality of layers DL0 and DL1 that are a first layer DL0 (FIG. 2) and a second layer DL1. There is configured the optical pickup apparatus that can support the optical disc D having a plurality of the signal layers Da, by providing the objective lens 70 in the optical pickup apparatus in such a manner as to be movable substantially in the light axis direction of the objective lens 70 (P-axis direction). The objective lens 70 is provided in the optical pickup apparatus in such a manner as to be movable substantially in the disc radial direction (R-axis direction) to accurately follow tracks, etc., on the signal layers Da.

The collimating lens 67 is provided in the optical pickup apparatus in such a manner as to be movable substantially in the light axis direction of the collimating lens 67, to be able support the optical disc D having a plurality of the layers DL0 and DL1 that are the first layer DL0 (FIG. 2) and the second layer DL1, depending on the design/specification, etc., of the optical pickup apparatus. There is configured the optical pickup apparatus that can certainly support the optical disc D having a plurality of the signal layers Da, by providing the collimating lens 67 in the optical pickup apparatus in such a manner as to be movable substantially in the light axis direction of the collimating lens 67.

As above, the coupling lens 65i, the polarizing beam splitter 66, the collimating lens 67, the quarter-wave plate 68, the reflection mirror 69, and the objective lens 70 make up an example of a light converging optical system. The main beam and the two sub-beams obtained by splitting with the diffraction grating 64A converge with the diffraction grating 64A, to be applied to the track of the optical disc D as a main spot corresponding to the main beam and two sub-spots corresponding to the two sub-beams in such a manner that the main spot and sub-spots are arranged substantially in a line substantially parallel or slanted relative to the long, narrow track.

For example, the coupling lens 65i may not be provided and may be omitted depending on the design/specification, etc., of the optical pickup apparatus. Although FIG. 1 depicts an exemplary optical arrangement of the optical pickup apparatus where the quarter-wave plate 68 is located between the collimating lens 67 and the reflection mirror 69, the optical pickup apparatus may be used, in which the quarter-wave plate 68 is located, for example, between the polarizing beam splitter 66 and the collimating lens 67 instead of the quarter-wave plate 68 being located between the collimating lens 67 and the reflection mirror 69, depending on the design/specification, etc., of the optical pickup apparatus.

The optical pickup apparatus capable of recording signals into the optical disc D includes a light-receiving element 65ii, for example, in the vicinity of the polarizing beam splitter 66 which light-receiving element monitors the laser beam emitted from the laser unit 61 to be fed back so as to control the laser unit 61.

The objective lens 70 is, for example, so designed as to formed with a diffraction grating (not shown) on an incident surface thereof, which is in an annular shape centered about the light axis, diffracts laser beams having wavelengths compatible with the various optical discs D according to the respective optical characteristics, and to have a function of condensing the three beams obtained by diffracting and splitting with the diffraction grating onto the optical discs D with the spherical aberration corrected. The objective lens 70 is driven in a focus direction (P-axis direction shown in FIG. 1) and a tracking direction (R-axis direction that is a direction orthogonal to the Q-axis direction indicative of a track forming direction and orthogonal to the P-axis direction shown in FIG. 1), to apply the laser beam to the optical disc D from the objective lens 70 such that the laser beam is focused on the signal layer Da of the optical disc D and follows a predetermined track of the optical disc D.

The laser beam modulated and reflected by the signal layer Da of the optical disc D returns to the objective lens 70, and reaches the polarizing beam splitter 66 through a return path that is substantially the same light path as an outward path partway. For example, when a right-hand circular laser beam is applied to the signal layer Da of the optical disc D, reflected laser beam is circularly-polarized light in a state reversed into a left-hand circular laser beam, for example. An S-polarized laser beam on the outward path to the optical disc is emitted from the quarter-wave plate 68 as a P-polarized laser beam on the return path, and the P-polarized laser beam is made incident on the polarizing beam splitter 66.

The P-polarized laser beam on the return path substantially passes through the polarizing beam splitter 66. The laser beam returned to the polarizing beam splitter 66 passes through a first parallel plate 71 obliquely disposed to correct astigmatism at the time when passing through the polarizing beam splitter 66, for example. Since the laser beam having passed through the first parallel plate 71 passes through an obliquely disposed second parallel plate 72, for example, the astigmatism is added that is a focus error component of the laser beam applied to the optical disc D and the coma aberration that is caused by the polarizing beam splitter 66 and the first parallel plate 71 is corrected, and thereafter, the laser beam is guided to the photodetector 73.

As a result, the photodetector 73 generates a tracking error signal, a focus error signal, etc., based on the laser beam guided from the second parallel plate 72.

The photodetector 73 serves a purpose of receiving the laser beam reflected from the optical disc D and converting a signal thereof into the tracking error signal and the focus error signal, to operate a servomechanism (not shown) of a lens holder (not shown), etc., for holding the objective lens 70 included in the optical pickup apparatus. The servo means a mechanism, etc., that measure a state of an object to be controlled to be compared with a predetermined reference value, and perform automatic corrective control, for example. The photodetector 73 serves a purpose of receiving the laser beam reflected from the optical disc D and converting the signal thereof into electric signals, to detect information recorded in the optical disc D.

<Diffraction Grating 64A and Photodetector 73>

The diffraction grating 64A and the photodetector 73 will hereinafter be described with reference to FIGS. 3 and 4.

Figure 3:
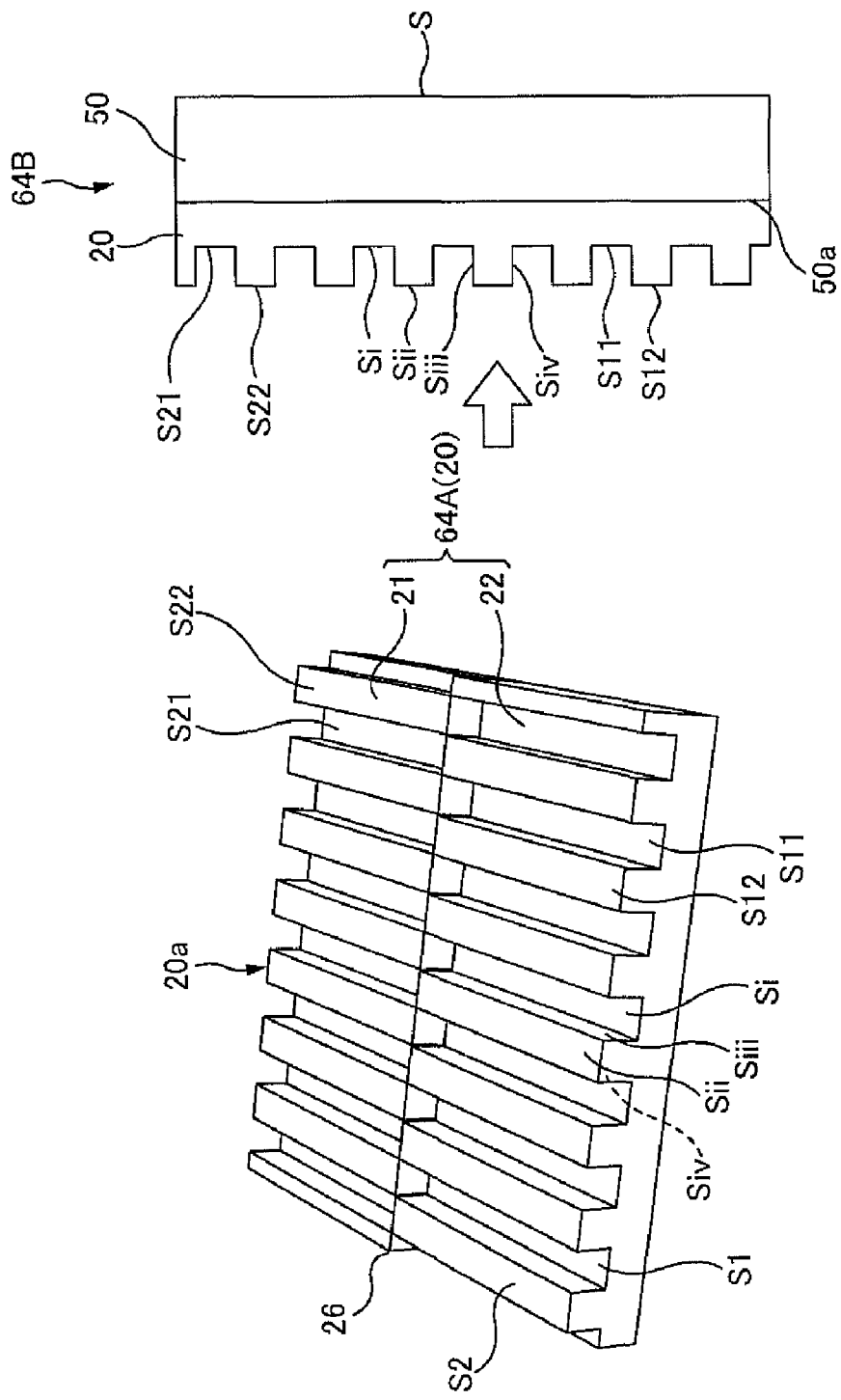
FIG. 3 is a diagram for explaining a diffraction grating according to an embodiment of the present invention.
Figure 4:
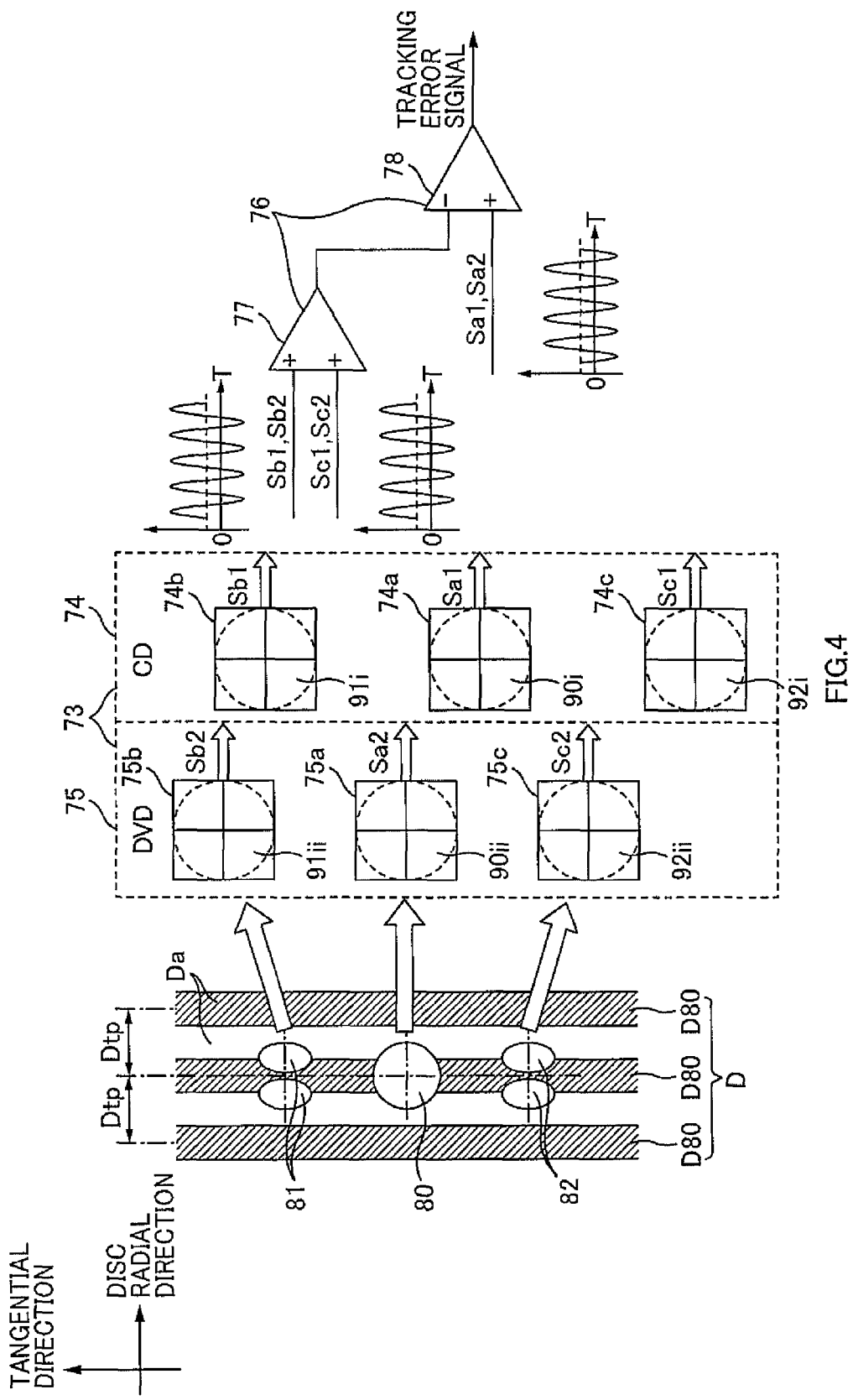
FIG. 4 is a diagram for explaining an arrangement of irradiation spots on an optical disc and an outline of a tracking error signal detection system by an in-line method according to an embodiment of the present invention.

FIG. 3 is a diagram for explaining a diffraction grating according to an embodiment of the present invention, and FIG. 4 is a diagram for explaining an arrangement of irradiation spots on an optical disc and an outline of a tracking error signal detection system by an in-line method according to an embodiment of the present invention.

The optical pickup apparatus according to an embodiment of the present invention supports the optical discs of both the CD standard and the DVD standard. The diffraction grating 64A (FIG. 3) is the inexpensive diffraction grating 64A supporting the in-line method having substantially the same configuration as that of a DVD diffraction grating 20. The diffraction grating 64A is made up only of the DVD diffraction grating 20 supporting the in-line method, without using a CD diffraction grating supporting the three-beam method. A diffraction grating according to an embodiment of the present invention means a member formed with a diffraction surface portion that diffracts light, for example, and is referred to as an in-line grating, etc., for example. The diffraction grating, etc., shown in an embodiment of the present invention are depicted for convenience such that details thereof can be easily understood.

Figure 20:
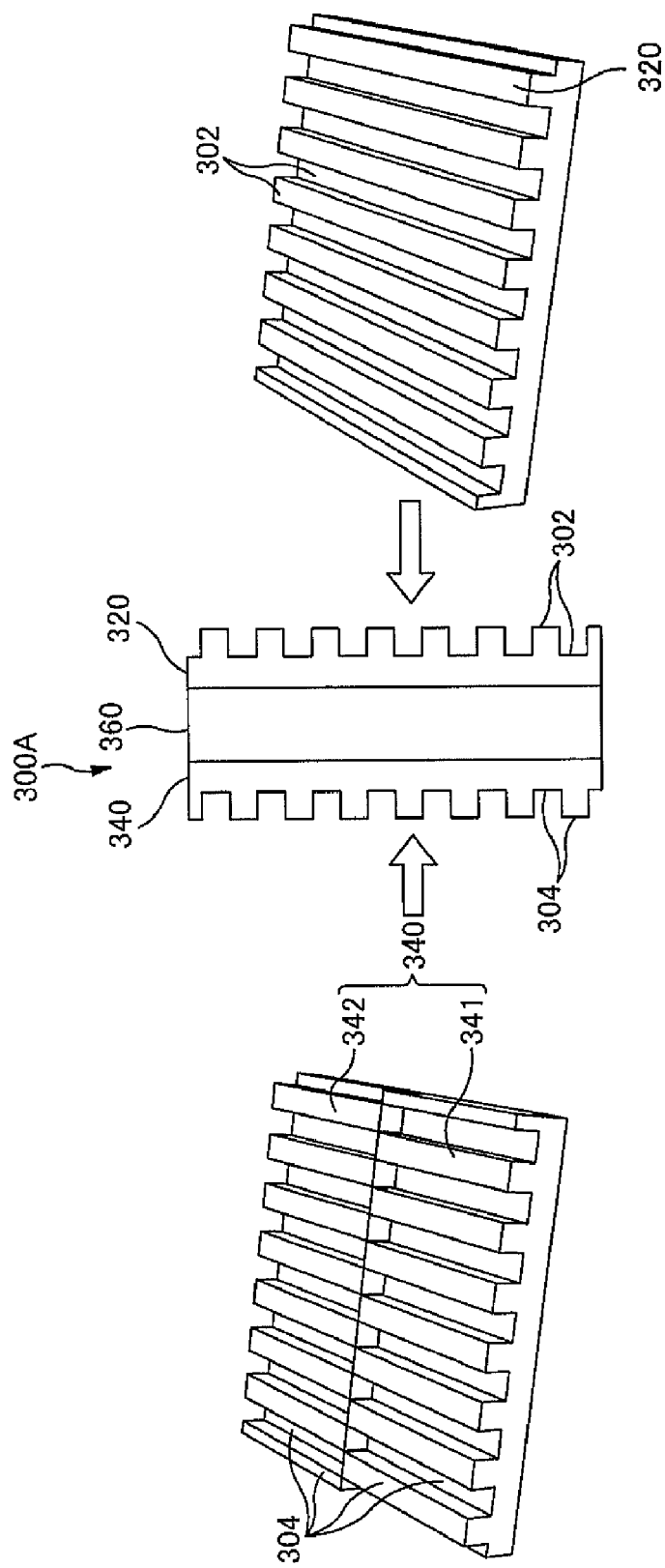
FIG. 20 is a diagram for explaining a two-wavelength supported diffraction grating.
Figure 21:
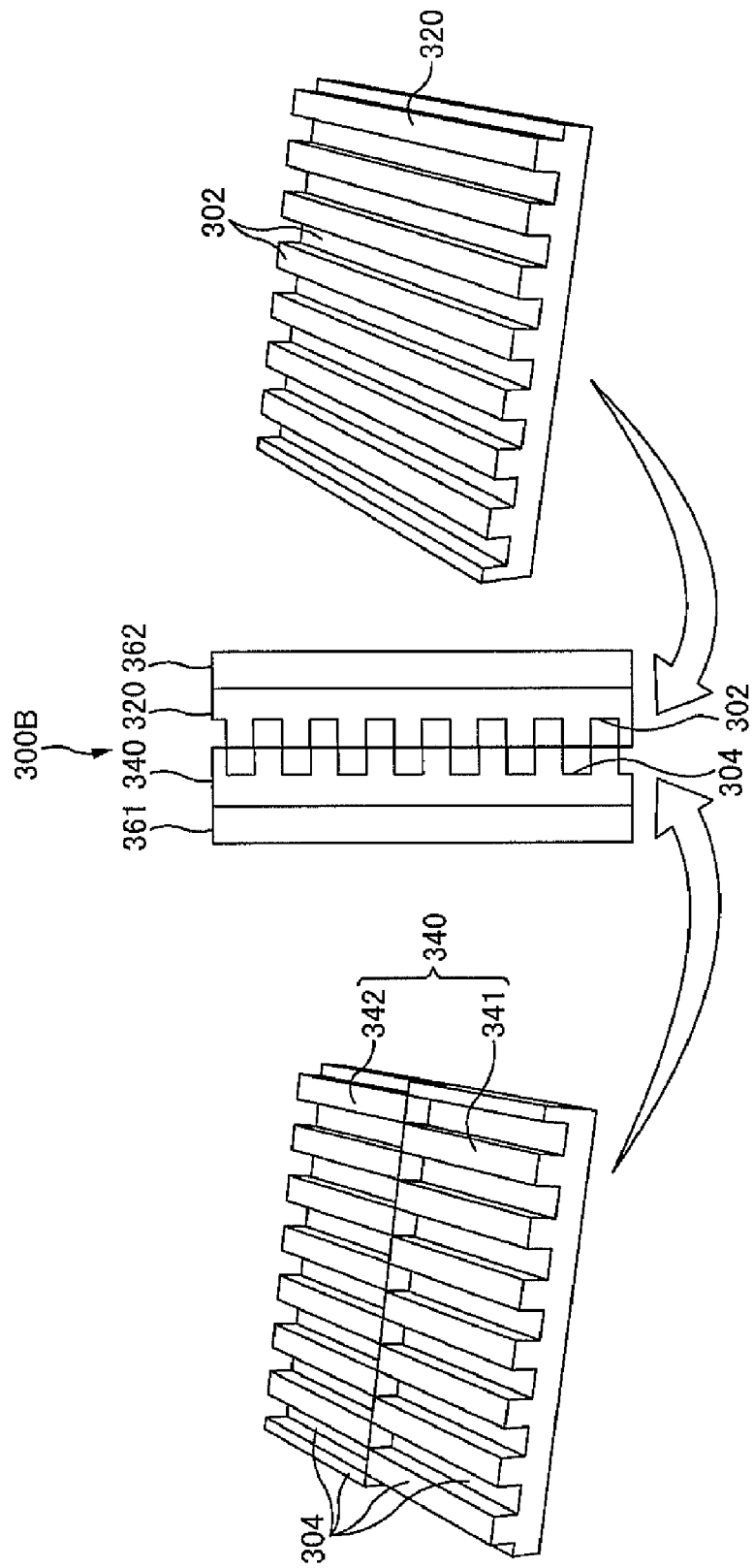
FIG. 21 is a diagram for explaining another two-wavelength supported diffraction grating.

The two-wavelength supported diffraction grating 300A or 300B including both a CD diffraction grating 320 (FIGS. 20 and 21) and a DVD diffraction grating 340 has a problem that the first laser beam compatible with the CD standard or the second laser beam compatible with the DVD standard passes through both the CD diffraction grating 320 and the DVD diffraction grating 340, resulting in unnecessary diffracted light being generated. To stop generating the unnecessary diffracted light, the diffraction grating 64A (FIG. 3) is made up only of the DVD diffraction grating 20.

Specifically, the diffraction grating 64A is the DVD diffraction grating 20 having a periodic structure of grating grooves formed on one half plane surface 21 displaced in phase by about 180 degrees with respect to a periodic structure of grating grooves formed on the other half plane surface 22, as shown on the left side of FIG. 3. The optical arrangement of the diffraction grating 64A is adjusted, conforming to the in-line method, such that a main spot 80 based on the main beam of the first or second laser beam applied to the optical disc D and sub-spots 81 and 82 based on the two sub-beams of the first or second laser beam are applied to the same track D80 in such a manner that the main spot and two sub-spots are arranged substantially in a line substantially parallel or slanted, as shown in FIG. 4.

Since the configuration and the optical arrangement of the diffraction grating 64A made up only of the DVD diffraction grating 20 as above are employed, the unnecessary diffracted light may be suppressed and the detection of the tracking error based on the in-line method may appropriately be performed, as described above. Specifically, as shown in FIG. 4, in the case of the second laser beam compatible with the DVD standard, the tracking error signal is detected as follows.

When a DVD main beam forming the main detection light spot 80 corresponding to the DVD standard is reflected by the signal layer Da of the optical disc D and applied as a main detection light spot 90$ii$ to a main light-receiving unit 75$a$ in a DVD light-receiving area 75 of the photodetector 73, a subtractor not shown connected to the main light-receiving unit 75$a$ carries out an operation to obtain a difference of output signals from the main light-receiving unit 75$a$ to generate a main push-pull signal Sa2, for example.

When a first DVD sub-beam forming a first sub-detection light spot 81 compatible with the DVD standard is reflected by the signal layer Da of the optical disc D and applied as a first sub-detection light spot 91$ii$ to a first sub-light-receiving unit 75$b$ in the DVD light-receiving area 75 of the photodetector 73, a subtractor not shown connected to the first sub-light-receiving unit 75$b$ carries out an operation to obtain a difference of output signals from the first sub-light-receiving unit 75$b$ to generate a preceding sub-push-pull signal Sb2, for example.

When a second DVD sub-beam forming a second sub-detection light spot 82 corresponding to the DVD standard is reflected by the signal layer Da of the optical disc D and applied as a second sub-detection light spot 92$ii$ to a second sub-light-receiving unit 75$c$ in the DVD light-receiving area 75 of the photodetector 73, a subtractor not shown connected to the second sub-light-receiving unit 75$c$ carries out an operation to obtain a difference of output signals from the second sub-light-receiving unit 75$c$ to generate a delayed sub-push-pull signal Sc2, for example.

The push-pull signal Sa2 detected from the main detection light spot 90$ii$ corresponding to the main spot 80 and the push-pull signals Sb2 and Sc2 detected from the sub-detection light spots 91$ii$ and 92$ii$ corresponding to the respective sub-spots 81 and 82 are output in a manner such that phases thereof are opposite to each other. Subsequently, an adder 77 adds the push-pull signals Sb2 and Sc2 and a subtractor 78 performs a subtracting process of the above added signals for the push-pull signal Sa2, to be able to generate an high-precision tracking error signal with offset components of the push-pull signals Sa2, Sb2, and Sc2 canceled.

On the other hand, in the case of the first laser beam compatible with the CD standard, the tracking error signal is detected as follows.

When a CD main beam forming the main detection light spot 80 corresponding to the CD standard is reflected by the signal layer Da of the optical disc D and applied as a main detection light spot 90$i$ to a main light-receiving unit 74$a$ in a CD light-receiving area 74 of the photodetector 73, a subtractor not shown connected to the main light-receiving unit 74$a$ carries out an operation to obtain a difference of output signals from the main light-receiving unit 74$a$ to generate a main push-pull signal Sa1, for example.

When a first CD sub-beam forming the first sub-detection light spot 81 corresponding to the CD standard is reflected by the signal layer Da of the optical disc D and applied as a first sub-detection light spot 91$i$ to a first sub-light-receiving unit 74$b$ in the CD light-receiving area 74 of the photodetector 73, a subtractor not shown connected to the first sub-light-receiving unit 74$b$ carries out an operation to obtain a difference of output signals from the first sub-light-receiving unit 74$b$ to generate a preceding sub-push-pull signal Sb1, for example.

When a second CD sub-beam forming the second sub-detection light spot 82 corresponding to the CD standard is reflected by the signal layer Da of the optical disc D and applied as a second sub-detection light spot 92$i$ to a second sub-light-receiving unit 74$c$ in the CD light-receiving area 74 of the photodetector 73, a subtractor not shown connected to the second sub-light-receiving unit 74$c$ carries out an operation to obtain a difference of the output signal from the second sub-light-receiving unit 74$c$ to generate a delayed sub-push-pull signal Sc1, for example.

The push-pull signal Sa1 detected from the main detection light spot 90$i$ corresponding to the main spot 80 and the push-pull signals Sb1 and Sc1 detected from the sub-detection light spots 91$i$ and 92$i$ corresponding to the respective sub-spots 81 and 82 are output in a manner such that phases thereof are opposite to each other. Subsequently, the subtractor 78 may generate a tracking error signal with offset components of the push-pull signals Sa1, Sb1, and Sc1 canceled.

The signals generated by the photodetector 73 are sent to an operation unit 76 for operations and the signals generated by the operation unit 76 are sent to an objective lens driving unit 79. Electric signals are applied to the objective lens driving unit 79 to move the objective lens 70. A tracking error signal generated by the operation unit 76 is sent to the objective lens driving unit 79 to automatically perform the tracking adjustment of the objective lens 70 relative to the track D80 of the optical disc D.

However, the diffraction grating 64A is made up only of, for example, the DVD diffraction grating member 20 conforming to the second wavelength of the second laser beam compatible with the DVD standard, and does not conform to the first wavelength of the first laser beam compatible with the CD standard. As a result, an interval (hereinafter, referred to as a main-sub pitch) between the main detection light spot 90$i$ and the sub-detection light spots 91$i$, 92$i$ which spots are obtained by diffracting and splitting the first laser beam compatible with the CD standard with the diffraction grating 64A, is a length inversely proportional to a wavelength to which the diffraction grating 64A conforms, and therefore the interval is expanded as compared to a main-sub pitch in the case of being obtained by diffracting and splitting with the CD diffraction grating that should actually be used. As a result of the main-sub pitch being expanded, a split light ratio is changed between the main detection light spot 90i and the sub-detection light spots 91i, 92i.

Therefore, in the photodetector 73, a light-receiving interval Ys(dvd) between the second main light-receiving unit 75a applied with the main detection light spot 90ii and the second sub-light-receiving unit 75b on one side applied with the one sub-detection light spot 91ii as well as the second sub-light-receiving unit 75c on the other side applied with the other sub-detection light spot 92ii; and a light-receiving interval Ys(cd) between the first main light-receiving unit 74a applied with the main detection light spot 90i and the second sub-light-receiving unit 74b on one side receiving the one sub-detection light spot 91i as well as the first sub-light-receiving unit 74c on the other side applied with the other sub-detection light spot 92i, need to be set appropriately in accordance with the main-sub pitches corresponding to the respective laser beams.

<Light-Receiving Areas 74 and 75 of Photodetector 73>

The light-receiving areas 74 and 75 of the photodetector 73 will hereinafter be described with reference to FIGS. 5 and 6.

Figure 5:
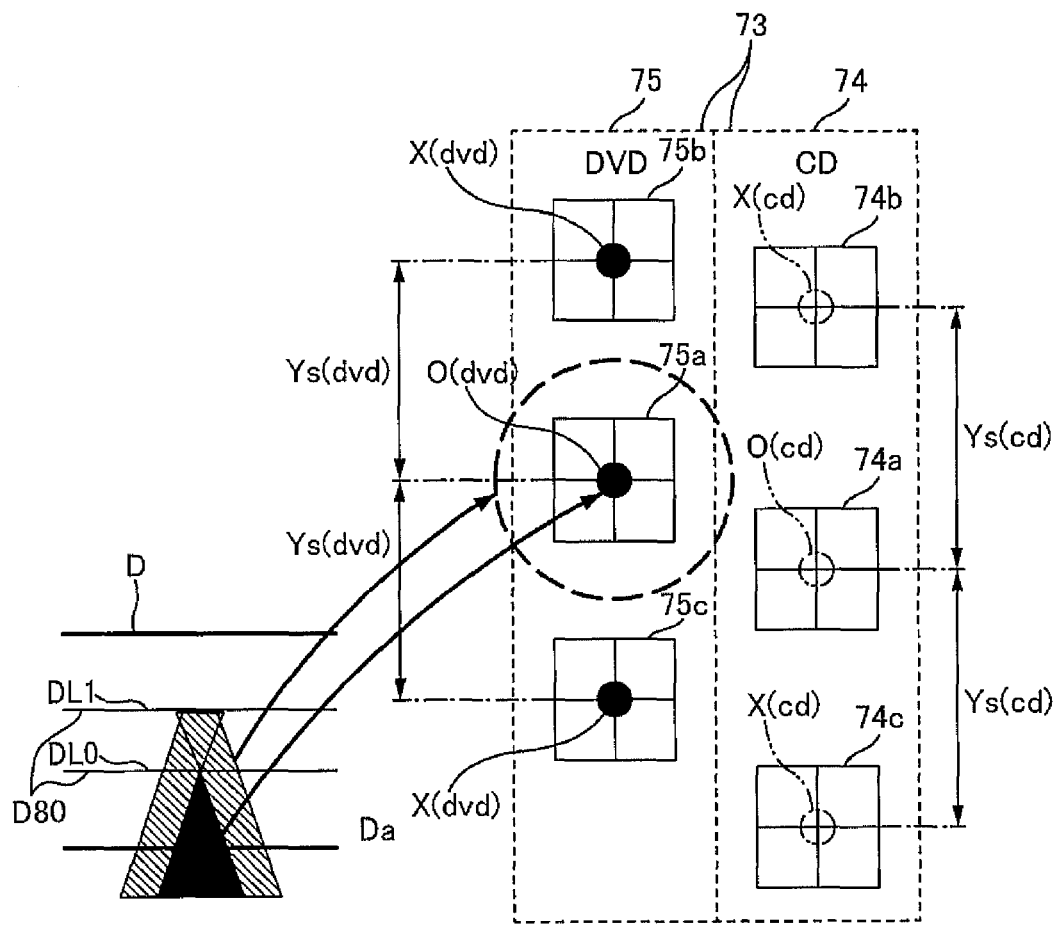
FIG. 5 is a diagram for explaining light-receiving areas of a photodetector according to an embodiment of the present invention.
Figure 6:
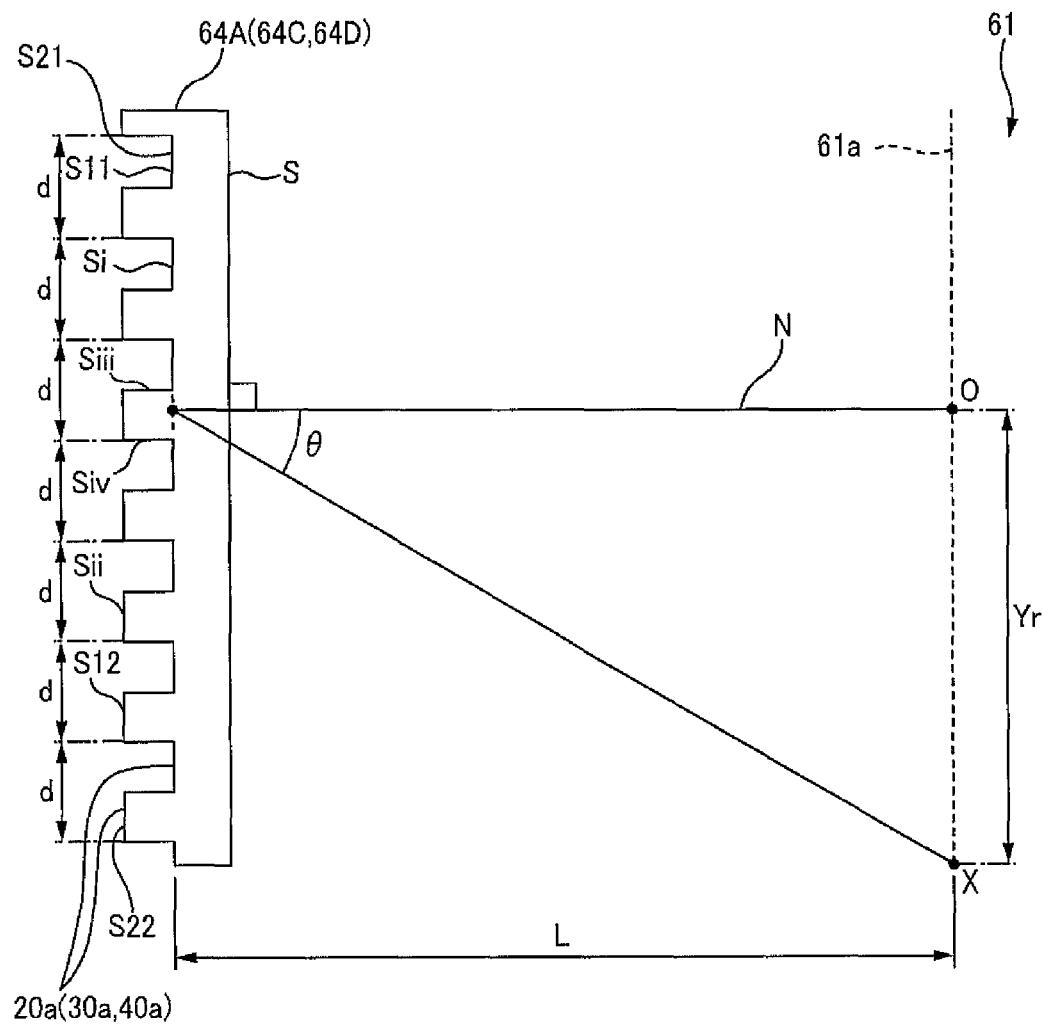
FIG. 6 is a diagram for explaining a method of deriving an interval between light-receiving units in a light-receiving area of the photodetector according to an embodiment of the present invention.

FIG. 5 is a diagram for explaining light-receiving areas of a photodetector according to an embodiment of the present invention, and FIG. 6 is a diagram for explaining a method of deriving an interval between light-receiving units in light-receiving areas of the photodetector according to an embodiment of the present invention.

The DVD light-receiving area 75 used for recording/reproduction of the optical disc D of the DVD standard and the CD light-receiving area 74 used for recording/reproduction of the optical disc D of the CD standard are formed side by side on the same light-receiving surface of the photodetector 73.

The DVD light-receiving area 75 includes the second main light-receiving unit 75a and the second sub-light-receiving units 75b and 75C formed corresponding to three beams that are obtained by diffracting and splitting the second laser beam compatible with the DVD standard with the diffraction grating 64A, specifically, the main beam (0th order light) and two sub-beams (±1st order diffracted light beams) located at the front and the back of the main beam. The definitions of the "front" and the "back" in an embodiment of the present invention are definitions for convenience. Each of the second main light-receiving unit 75a and the second sub-light-receiving units 75b and 75C is divided into four, so as to be made up of four segments. Since a predetermined operation is carried out for each light-receiving output obtained from each of the segments that make up the second main light-receiving unit 75a, the second sub-light-receiving unit 75b, and the second sub-light-receiving unit 75C, a main information signal, the focus error signal, and the tracking error signal may be obtained when recording/reproduction is performed for the optical disc D of the DVD standard. The second main light-receiving unit 75a and the second sub-light-receiving units 75b and 75C are not limited to four-divided units, and may be two-divided units, for example.

The CD light-receiving area 74 includes the first main light-receiving unit 74a and the two first sub-light-receiving units 74b and 74c formed corresponding to three beams that are obtained by diffracting and splitting the first laser beam compatible with the CD standard with the diffraction grating 64A, specifically, the main beam (0th order light) and two sub-beams (±1st order diffracted light beams) located at the front and the back of the main beam. Each of the first main light-receiving unit 74a and the first sub-light-receiving units 74b and 74c is divided into four, so as to be made up of four segments. Since a predetermined operation is carried out for each light-receiving output obtained from each of the segments that make up the first main light-receiving unit 74a, the first sub-light-receiving unit 74b, and the first sub-light-receiving unit 74c, a main information signal, the focus error signal, and the tracking error signal may be obtained when recording/reproduction is performed for the optical disc D of the CD standard. The first main light-receiving unit 74a and the first sub-light-receiving units 74b and 74c are not limited to four-divided units, and may be two-divided units, for example.

There are derived, the light-receiving interval Ys(dvd) between the second main light-receiving unit 75a and the second sub-light-receiving units 75b and 75c in the DVD light-receiving area 75; and the light-receiving interval Ys(cd) between the first main light-receiving unit 74a and the first sub-light-receiving units 74b and 74c in the DVD light-receiving area 75, as follows.

First, a diffraction angle θ is obtained from an approximate expression on the basis of the Bragg condition, which is expressed by a following equation (1), based on a wavelength λ of the first or second laser beam emitted from the first or second light source 62, 63 of the laser unit 61 and a grating spacing d of one period continuous from a concave portion S11 to a convex portion S12 or from the convex portion S12 to the concave portion S11 in the diffraction grating 64A (see FIG. 6). The grating spacing d is on the order of several to several hundreds of micrometers, for example.

$$\theta = \mathrm{Sin}^{-1}(\lambda/d) \quad (1)$$

The concave portion S11 includes a bottom surface Si and two side surfaces Siii, Siv substantially orthogonal to the bottom surface Si. A concave surface S21 making up the concave portion S11 also includes the bottom surface Si and the two side surfaces Siii, Siv substantially orthogonal to the bottom surface Si. The convex portion S12 includes an external surface Sii substantially parallel to the bottom surface Si and two side surfaces Siii, Siv substantially orthogonal to the bottom surface Si and the external surface Sii. The convex surface S21 making up the convex portion S12 also includes the external surface Sii substantially parallel to the bottom surface Si and the two side surfaces Siii, Siv substantially orthogonal to the bottom surface Si and the external surface Sii. The diffraction angle θ means an angle formed between the diffracted light and a normal line N to the bottom surface Si of the concave surface S21 or the external surface Sii of the convex surface S22 making up a diffraction surface portion 20a on a backside of a substantially smooth surface S of the diffraction grating 64A. The explanatory diagram shown in FIG. 6 is a diagram made for convenience to facilitate description and, in actuality, virtual light-emitting points X are set as a pair or so, which are substantially symmetric with respect to the normal line N as a center axis.

A second light-emitting point X indicative of the apparent position of the first light source 62 or second light source 63 with respect to the sub-beams on the light-emitting surface 61a of the laser unit 61 may be set based on: a normal line distance L from a first light-emitting point O indicative of the actual position of the first light source 62 or second light source 63 included in the light-emitting surface 61a of the laser unit 61 to the bottom surface Si making up the concave surface S21 or the external surface Sii making up the convex surface S22 on the backside of the substantially smooth surface S of the diffraction grating 64A; and the diffraction angle θ obtained by the above equation (1). The light-emitting surface 61a of the laser unit 61 is perpendicular to the normal line N of the substantially smooth surface S of the diffraction grating 64A, and is a plane surface located away, by substantially the normal line distance L, from the bottom surface Si making up the concave surface S21 or the external surface Sii making up the convex surface S22 on the backside of the surface S. A distance Yr from the first light-emitting point O to the second light-emitting point X on the light-emitting surface 61a of the laser unit 61 may be obtained from the following equation (2) (see FIG. 6).

$$Yr = L \times \tan(\theta) \tag{2}$$

Description will briefly be made of a first irradiation point O' (not shown) of the main spot on the signal layer Da of the optical disc D and a second irradiation point X' (not shown) of the sub-spot on the signal layer Da of the optical disc D corresponding to the first or second laser beam virtually emitted from the second light emitting point X.

For example, there are obtained the first irradiation point O' (not shown) of the main spot on the signal layer Da of the optical disc D corresponding to the first or second laser beam virtually emitted from the first light emitting point O and the second irradiation point X' (not shown) of the sub-spot on the signal layer Da of the optical disc D corresponding to the first or second laser beam virtually emitted from the second light emitting point X, based on a focal distance f2 (not shown) of the collimating lens 67 and a focal distance f1 (not shown) of the objective lens 70. Then, there are obtained the distance Ys' (not shown) between the first irradiation point O' and the second irradiation point X' on the signal layer Da of the optical disc D, based on the distance Yr from the light-emitting point O to the light-emitting point X, the focal distance f2 of the collimating lens 67, and the focal distance f1 of the objective lens 70, by the following equation (3), for example.

$$Ys' = Yr \times f1/f2 \tag{3}$$

From the above description, the distance Ys' between the first irradiation point O' and the second irradiation point X' on the signal layer Da of the optical disc D may be obtained based on the following equation (4), where $\lambda$ is the wavelength of the first or second laser beam, for example, d is the grating spacing of the diffraction grating 64A, L is the normal line distance from the light-emitting surface 61a of the laser unit 61 to the bottom surface Si making up the concave surface S21 or the external surface Sii making up the convex surface S22 on the backside of the surface S of the diffraction grating 64A, f1 is the focal distance of the objective lens 70, and f2 is the focal distance of the collimating lens 67. The distance Ys' represents the main-sub pitch on the signal layer Da of the optical disc D in the case of the first or second laser beam is diffracted and split by the diffraction grating 64A.

$$Ys' = L \times \tan\{\sin^{-1}(\lambda/d)\} \times f1/f2 \tag{4}$$

The main beam and the two sub-beams of the first or second laser beam applied to the signal layer Da of the optical disc D is reflected by the signal layer Da of the optical disc D, and applied to the photodetector 73, finally.

Description will be followed of a method of setting the light-receiving interval Ys(cd) between the first main light-receiving unit 74a and the first sub-light-receiving units 74b and 75c and the light-receiving interval Ys(dvd) between the second main light-receiving unit 75a and the second sub-light-receiving units 75b and 75c in the photodetector 73.

The following equation (5) is obtained based on the equations (1) and (2).

$$Yr = L \times \tan\{\sin^{-1}(\lambda/d)\} \tag{5}$$

Here, it is assumed that a virtual light source interval Yr(dvd) corresponding to the DVD emitted light is substantially equivalent to the actual light-receiving interval Ys(dvd) corresponding to the DVD reflected light, so as to arrange the DVD light-emitting points O, X in the light-emitting surface 61a of the laser unit 61 and the DVD irradiation points O(dvd), x(dvd) in the light-receiving surface of the photodetector 73 corresponding to the DVD reflected light, for example, at optically equivalent positions.

For example, the following equation (6) is assumed.

$$Ys(dvd) \approx Yr(dvd) \tag{6}$$

For example, the following equation (7) is set based on the equations (5) and (6).

$$Ys(dvd) = L \times \tan\{\sin^{-1}(\lambda(dvd)/d)\} \tag{7}$$

For example, when assuming that the wavelength (second wavelength) $\lambda$(dvd) of the DVD standard is substantially 660 nm, the following equation (8) is obtained by substituting 660 for $\lambda$(dvd) of the equation (7).

$$Ys(dvd) = L \times \tan\{\sin^{-1}(660/d)\} \tag{8}$$

The light-receiving interval Ys(dvd) in the DVD light-receiving area 75 of the photodetector 73 is obtained by substituting a numerical value of the predetermined normal line distance L and a numerical value of the predetermined grating spacing d in the equation (8).

It is then assumed that a virtual light source interval Yr(cd) corresponding to the CD emitted light is substantially equivalent to the actual light-receiving interval Ys(cd) corresponding to the CD reflected light, so as to arrange the CD light-emitting points O, X in the light-emitting surface 61a of the laser unit 61 and the CD irradiation points O(cd), x(cd) in the light-receiving surface of the photodetector 73 corresponding to the CD reflected light, for example, at optically equivalent positions.

For example, the following equation (9) is assumed.

$$Ys(cd) \approx Yr(cd) \tag{9}$$

For example, the following equation (10) is set based on the equations (5) and (9).

$$Ys(cd) = L \times \tan\{\sin^{-1}(\lambda(cd)/d)\} \tag{10}$$

For example, when assuming that the wavelength (first wavelength) $\lambda$(cd) of the CD standard is substantially 785 nm, the following equation (11) is obtained by substituting 785 for $\lambda$(cd) of the equation (11).

$$Ys(cd) = L \times \tan\{\sin^{-1}(785/d)\} \tag{11}$$

The light-receiving interval Ys(cd) in the CD light-receiving area 74 of the photodetector 73 is obtained by substituting a numerical value of the predetermined normal line distance L and a numerical value of the predetermined grating spacing d in the equation (11).

In this way, there are set the light-receiving interval Ys(dvd) in the DVD light-receiving area 75 of the photodetector 73 and the light-receiving interval Ys(cd) in the CD light-receiving area 74 of the photodetector 73.

Since both the numeric value of the predetermined normal line distance L and the numeric value of the predetermined grating spacing d are constant values, the light-receiving interval Ys(cd) is obviously longer than the light-receiving interval Ys(dvd) when comparing the actual light-receiving interval Ys(dvd) corresponding to the DVD reflected light derived based on the equation (8) with the actual light-receiving interval Ys(cd) corresponding to the CD reflected light derived based on the equation (11).

The light-receiving interval Ys(cd) between the first main light-receiving unit 74a and the first sub-light-receiving units 74b and 74c in the photodetector 73 is set based on the distance Ys(cd) obtained from the equation (11), as above. The light-receiving interval Ys(cd) between the second main light-receiving unit 75a and the second sub-light-receiving units 75b and 75c in the photodetector 73 is set based on the distance Ys(cd) obtained from the equation (8).

Specifically, the distance Ys(cd) between the center of four segments in the first main light-receiving unit 74a and the center of four segments in the first sub-light-receiving units 74b and 74c is set to the distance Ys(cd) obtained from the equation (11). The distance Ys(dvd) between the center of four segments in the second main light-receiving unit 75a and the center of four segments in the second sub-light-receiving units 75b and 75c is set to the distance Ys(dvd) obtained from the equation (8). As a result, the photodetector 73 may appropriately support the main-sub pitches when the first or second laser beam is diffracted and split by the diffraction grating 64A.

<Split Light Ratios among Spots 90i, 91i, and 92i/90ii, 91ii, and 92ii Applied to Photodetector 73 and Light-Receiving Sensitivity of Photodetector 73>

Description will hereinafter be made of split light ratios, etc., that are light intensity ratios among the spots 90i, 91i, 92i/90ii, 91ii, 92ii, for example, with reference to FIG. 4.

First, there will be described the light intensity, the split light ratio, etc., of the light applied to the DVD light-receiving area 75 of the photodetector 73.

For example, a split light ratio is substantially 1:15:1, among the sub-detection light spot 91ii corresponding to the preceding sub-spot 81 on the track D80 of the optical disc D based on the DVD standard; the main detection light spot 90ii corresponding to the main spot 80 on the track D80 of the optical disc D based on the DVD standard; and the sub-detection light spot 92ii corresponding to the succeeding sub-spot 82 on the track D80 of the optical disc D based on the DVD standard.

The light intensity of the sub-detection light spot 91ii or 92ii in this case is substantially 1/17 of the light intensity of the whole light applied to the DVD light-receiving area 75 of the photodetector 73. The light intensity of the main detection light spot 90ii in this case is substantially 15/17 of the light intensity of the whole light applied to the DVD light-receiving area 75 of the photodetector 73.

Figure 19:
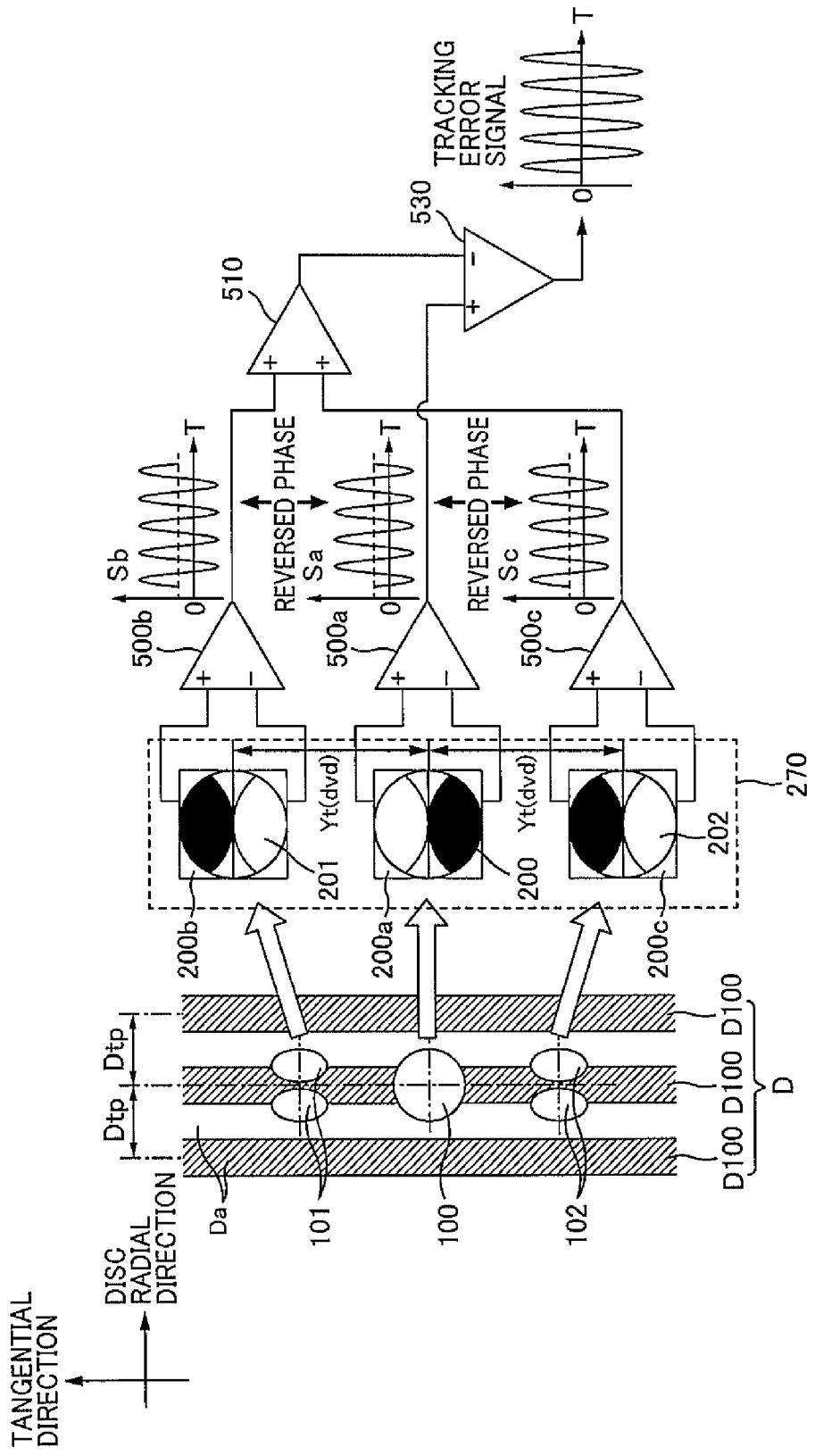
FIG. 19 is a diagram for explaining an in-line method.

The split light ratio of the laser beam applied to the DVD light-receiving area 75 of the in-line method photodetector 73 shown in FIG. 4 is substantially the same as the split light ratio of the laser beam applied to the in-line method DVD photodetector 270 shown in FIG. 19.

For example, a split light ratio is substantially 1:15:1, among the sub-detection light spot 201 corresponding to the preceding sub-spot 101 on the track D100 of the optical disc D based on the DVD standard; the main detection light spot 200 corresponding to the main spot 100 on the track D100 of the optical disc D based on the DVD standard, and the sub-detection light spot 202 corresponding to the succeeding sub-spot 102 on the track D100 of the optical disc D based on the DVD standard.

The light intensity of the sub-detection light spot 201 or 202 in this case is substantially 1/17 of the light intensity of the whole light applied to the photodetector 270. The light intensity of the main detection light spot 200 in this case is substantially 15/17 of the light intensity of the whole light applied to the photodetector 270.

There will be described the light intensity, the split light ratio, etc., of the light applied to the CD light-receiving area 74 of the photodetector 73 of FIG. 4 will then be described.

For example, a split light ratio is substantially 1:23:1 among the sub-detection light spot 91i corresponding to the preceding sub-spot 81 on the track D80 of the optical disc D based on the CD standard, the main detection light spot 90i corresponding to the main spot 80 on the track D80 of the optical disc D based on the CD standard, and the sub-detection light spot 92i corresponding to the succeeding sub-spot 82 on the track D80 of the optical disc D based on the CD standard.

The light intensity of the sub-detection light spot 91i or 92i in this case is substantially 1/25 of the light intensity of the whole light applied to the CD light-receiving area 74 of the photodetector 73. The light intensity of the main detection light spot 90i in this case is substantially 23/25 of the light intensity of the whole light applied to the CD light-receiving area 74 of the photodetector 73.

Figure 18:
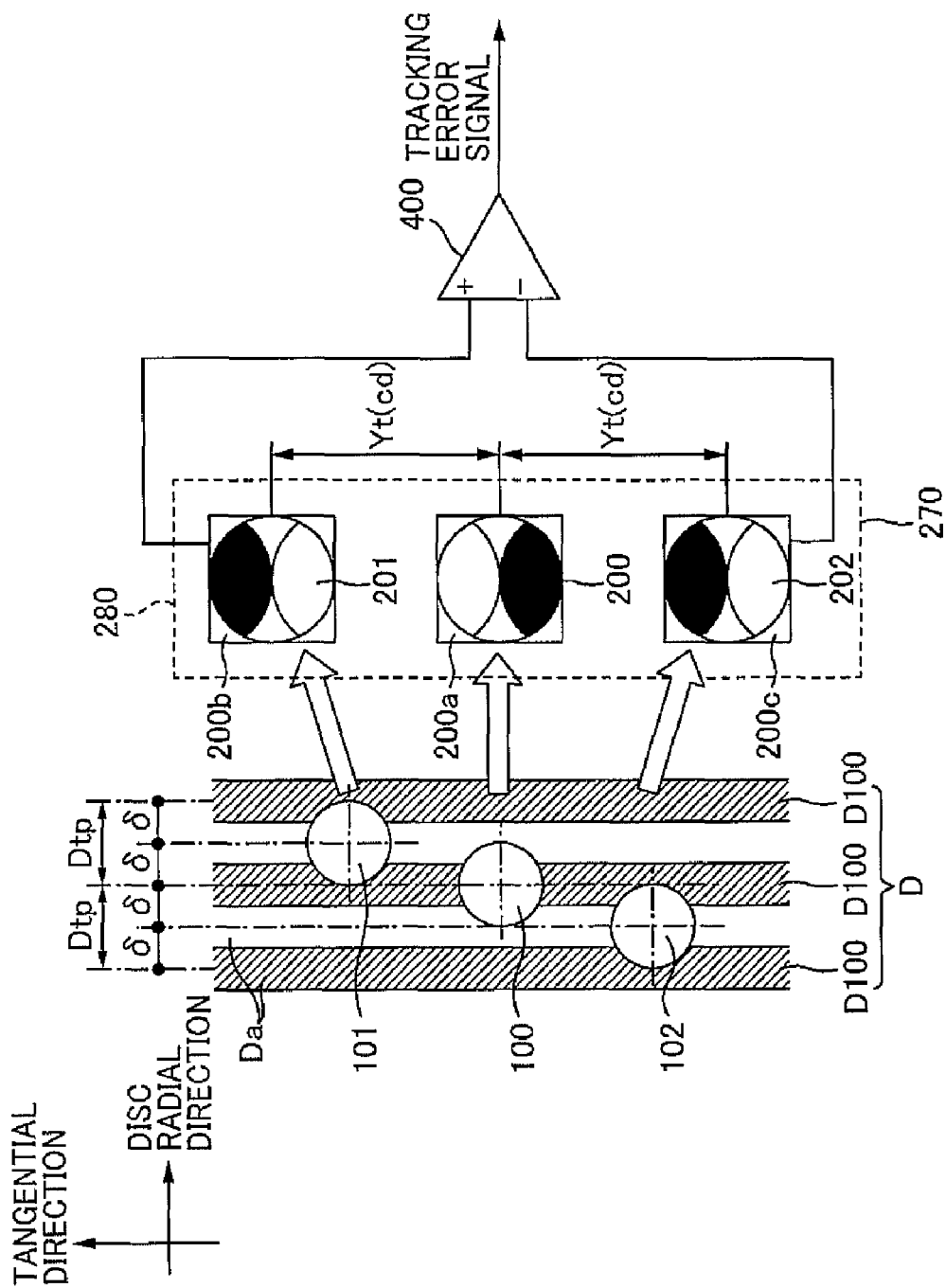
FIG. 18 is a diagram for explaining a three-beam method.

The split light ratio of the laser beam applied to the CD light-receiving area 74 of the in-line method photodetector 73 shown in FIG. 4 is different from the split light ratio of the laser beam applied to the three-beam method CD photodetector 270 shown in FIG. 18.

For example, a split light ratio is substantially 1:16:1 among the sub-detection light spot 201 corresponding to the preceding sub-spot 101 on the track D100 of the optical disc D based on the CD standard, the main detection light spot 200 corresponding to the main spot 100 on the track D100 of the optical disc D based on the CD standard, and the sub-detection light spot 202 corresponding to the succeeding sub-spot 102 on the track D100 of the optical disc D based on the CD standard.

The light intensity of the sub-detection light spot 201 or 202 in this case is substantially 1/18 of the intensity of the whole light applied to the photodetector 270. The light intensity of the main detection light spot 200 in this case is substantially 16/18 of the light intensity of the whole light applied to the photodetector 270.

In a case where an optical pickup apparatus is configured that includes the diffraction grating 64A without a diffraction grating portion corresponding to the CD laser beam, when the CD laser beams having passed through the diffraction grating 64A are applied to the CD light-receiving area 74 of the photodetector 73, the split light ratio of the laser beams applied to the CD light-receiving area 74 is changed in comparison with that in a case where an optical pickup apparatus includes a diffraction grating with the diffraction grating portion corresponding to the CD laser beam.

As the split light ratio of the laser beams applied to the CD light-receiving area 74 is changed in comparison with that in the case where the optical pickup apparatus includes the diffraction grating with the diffraction grating portion corresponding to the CD laser beam, the main light-receiving unit 74a and the sub-light receiving units 74b and 74c in the CD light-receiving area 74 of the photodetector 73 are changed in light-receiving sensitivity.

For example, there may be obtained a rate of change in the light-receiving sensitivity of the sub-light-receiving units 74b and 74c applied with the sub-detection light spots 91i, 92i, by a following equation (12).

$$\{(1/18)/(1/25)\} \times 100 = 138.88889 \quad (12)$$

As above, assuming that the light-receiving sensitivity of the sub-light-receiving unit in the case where the optical pickup apparatus includes the diffraction grating with the diffraction grating portion corresponding to the CD laser beam is 100%, for example, the light-receiving sensitivity (mV/μW) (millivolt per microwatt) of the sub-light receiving unit 74b or 74c in the CD light-receiving area 74 of the photodetector 73 is set at a value of substantially 139%.

For example, there may be obtained a rate of change in the light-receiving sensitivity of the main light-receiving unit 74a applied with the main detection light spot 90i, by a following equation (13).

$$\{(16/18)/(23/25)\} \times 100 = 96.61836 \tag{13}$$

As above, assuming that the light-receiving sensitivity of the sub-light-receiving unit in the case where the optical pickup apparatus includes the diffraction grating with the diffraction grating portion corresponding to the CD laser beam is 100% for example, the light-receiving sensitivity (mV/μW) of the main light receiving unit 74a in the CD light-receiving area 74 of the photodetector 73 is set at a value of substantially 97%.

Depending on the design/specification, etc., of the optical pickup apparatus, for example, the split light ratio may be set at substantially 1:16:1, among the sub-detection light spot 201 corresponding to the preceding sub-spot 101 on the track D100 of the optical disc D based on the DVD standard; the main detection light spot 200 corresponding to the main spot 100 on the track D100 of the optical disc D based on the DVD standard; and the sub-detection light spot 202 corresponding to the succeeding sub-spot 102 on the track D100 of the optical disc D based on the DVD standard.

The light intensity of the sub-detection light spot 201 or 202 in this case is substantially 1/18 of the intensity of the whole light applied to the photodetector 270. The light intensity of the main detection light spot 200 in this case is substantially 16/18 of the intensity of the whole light applied to the photodetector 270.

Depending on the design/specification, etc., of the optical pickup apparatus, for example, the split light ratio may be set at substantially 1:23.5:1, among the sub-detection light spot 91i corresponding to the preceding sub-spot 81 on the track D80 of the optical disc D based on the CD standard; the main detection light spot 90i corresponding to the main spot 80 on the track D80 of the optical disc D based on the CD standard; and the sub-detection light spot 92i corresponding to the succeeding sub-spot 82 on the track D80 of the optical disc D based on the CD standard.

The light intensity of the sub-detection light spot 91i or 92i in this case is substantially 1/25.5 of the intensity of the whole light applied to the CD light-receiving area 74 of the photodetector 73. The light intensity of the main detection light spot 90i in this case is substantially 23.5/25.5 of the intensity of the whole light applied to the CD light-receiving area 74 of the photodetector 73.

In this case, for example, there may be obtained a rate of change in the light-receiving sensitivity of the sub-light-receiving units 74b and 74c applied with the sub-detection light spots 91i, 92i, by a following equation (14).

$$\{(1/18)/(1/25.5)\} \times 100 = 141.66667 \tag{14}$$

As above, assuming that the light-receiving sensitivity of the sub-light-receiving unit in the case where the optical pickup apparatus includes the diffraction grating with the diffraction grating portion corresponding to the CD laser beam is 100%, for example, the light-receiving sensitivity (mV/μW) of the sub-light receiving unit 74b or 74c in the CD light-receiving area 74 of the photodetector 73 is set at a value of substantially 142%.

In this case, for example, there may be obtained the rate of change in the light-receiving sensitivity of the main light-receiving unit 74a applied with the main detection light spot 90i, by a following equation (15).

$$\{(16/18)/(23.5/25.5)\} \times 100 = 96.45390 \tag{15}$$

As above, assuming that the light-receiving sensitivity of the sub-light-receiving unit in the case where the optical pickup apparatus includes the diffraction grating with the diffraction grating portion corresponding to the CD laser beam is 100%, for example, the light-receiving sensitivity (mV/μW) of the main light receiving unit 74a in the CD light-receiving area 74 of the photodetector 73 is set at a value of substantially 96%.

Depending on the design/specification, etc., of the optical pickup apparatus, for example, the split light ratio may be set at substantially 1:20:1, among the sub-detection light spot 91i corresponding to the preceding sub-spot 81 on the track D80 of the optical disc D based on the CD standard; the main detection light spot 90i corresponding to the main spot 80 on the track D80 of the optical disc D based on the CD standard; and the sub-detection light spot 92i corresponding to the succeeding sub-spot 82 on the track D80 of the optical disc D based on the CD standard.

The light intensity of the sub-detection light spot 91i or 92i in this case is substantially 1/22 of the intensity of the whole light applied to the CD light-receiving area 74 of the photodetector 73. The light intensity of the main detection light spot 90i in this case is substantially 20/22 of the intensity of the whole light applied to the CD light-receiving area 74 of the photodetector 73.

In this case, for example, there may be obtained a rate of change in the light-receiving sensitivity of the sub-light-receiving units 74b and 74c applied with the sub-detection light spots 91i, 92i, by a following equation (16).

$$\{(1/18)/(1/22)\} \times 100 = 122.22222 \tag{16}$$

As above, assuming that the light-receiving sensitivity of the sub-light-receiving unit in the case where the optical pickup apparatus includes the diffraction grating with the diffraction grating portion corresponding to the CD laser beam is 100%, for example, the light-receiving sensitivity (mV/μW) of the sub-light receiving unit 74b or 74c in the CD light-receiving area 74 of the photodetector 73 is set at a value of substantially 122%.

In this case, for example, there may be obtained a rate of change in the light-receiving sensitivity of the main light-receiving unit 74a applied with the main detection light spot 90i, by a following equation (17).

$$\{(16/18)/(20/22)\} \times 100 = 97.77778 \tag{17}$$

As above, for example, assuming that the light-receiving sensitivity of the sub-light-receiving unit in the case where the optical pickup apparatus includes the diffraction grating with the diffraction grating portion corresponding to the CD laser beam is 100%, the light-receiving sensitivity (mV/μW) of the main light receiving unit 74a in the CD light-receiving area 74 of the photodetector 73 is set at a value of substantially 98%.

Depending on the design/specification, etc., of the optical pickup apparatus, for example, the split light ratio may be set at substantially 1:26:1, among the sub-detection light spot 91i corresponding to the preceding sub-spot 81 on the track D80 of the optical disc D based on the CD standard; the main detection light spot 90i corresponding to the main spot 80 on the track D80 of the optical disc D based on the CD standard; and the sub-detection light spot 92i corresponding to the succeeding sub-spot 82 on the track D80 of the optical disc D based on the CD standard.

The light intensity of the sub-detection light spot 91i or 92i in this case is substantially 1/28 of the intensity of the whole light applied to the CD light-receiving area 74 of the photodetector 73. The light intensity of the main detection light spot 90i in this case is substantially 26/28 of the intensity of the whole light applied to the CD light-receiving area 74 of the photodetector 73.

In this case, for example, there may be obtained a rate of change in the light-receiving sensitivity of the sub-light-receiving units 74b and 74c applied with the sub-detection light spots 91i, 92i, by a following equation (18).

$$\{(1/18)/(1/28)\} \times 100 = 155.55556 \quad (18)$$

As above, assuming that the light-receiving sensitivity of the sub-light-receiving unit in the case where the optical pickup apparatus includes the diffraction grating with the diffraction grating portion corresponding to the CD laser beam is 100%, for example, the light-receiving sensitivity (mV/μW) of the sub-light receiving unit 74b or 74c in the CD light-receiving area 74 of the photodetector 73 is set at a value of substantially 156%.

In this case, for example, there may be obtained a rate of change in the light-receiving sensitivity of the main light-receiving unit 74a applied with the main detection light spot 90i, by a following equation (19).

$$\{(16/18)/(26/28)\} \times 100 = 95.72650 \quad (19)$$

As above, for example, assuming that the light-receiving sensitivity of the sub-light-receiving unit in the case where the optical pickup apparatus includes the diffraction grating with the diffraction grating portion corresponding to the CD laser beam is 100%, the light-receiving sensitivity (mV/μW) of the main light receiving unit 74a in the CD light-receiving area 74 of the photodetector 73 is set at a value of substantially 96%.

The optical pickup apparatus including the above diffraction grating 64A and photodetector 73 is configured, so that the photodetector 73 can support: not only the main-sub pitches corresponding to three beams that is obtained by diffracting and splitting the second laser beam compatible with the DVD standard with the diffraction grating 64A; but also the main-sub pitches corresponding to and the split light ratio among three beams that is obtained by diffracting and splitting the first laser beam compatible with the CD standard with the diffraction grating 64A, and thus, detection accuracy, etc., of the error signal such as the tracking error signal may be improved.

The light-receiving interval Ys(dvd) in the DVD light-receiving area 75 of the photodetector 73 is based on the DVD diffraction grating member 20 or the grating spacing d of the DVD diffraction grating 64A, and thus, for example, in a case of the signal layer Da of the optical disc D of the DVD standard with a two-layer configuration including the first layer DL0 and the second layer DL1, it may be avoided that the reflected light from the second layer DL1 is received not only by the second main light-receiving unit 75a but also by the one second sub-light-receiving unit 75b and the other second sub-light-receiving unit 75c when reproducing the first layer DL0.

<General Description of Optical Pickup Apparatus>

The optical pickup apparatus will hereinafter be described with reference to FIGS. 1 to 8.

Figure 7:
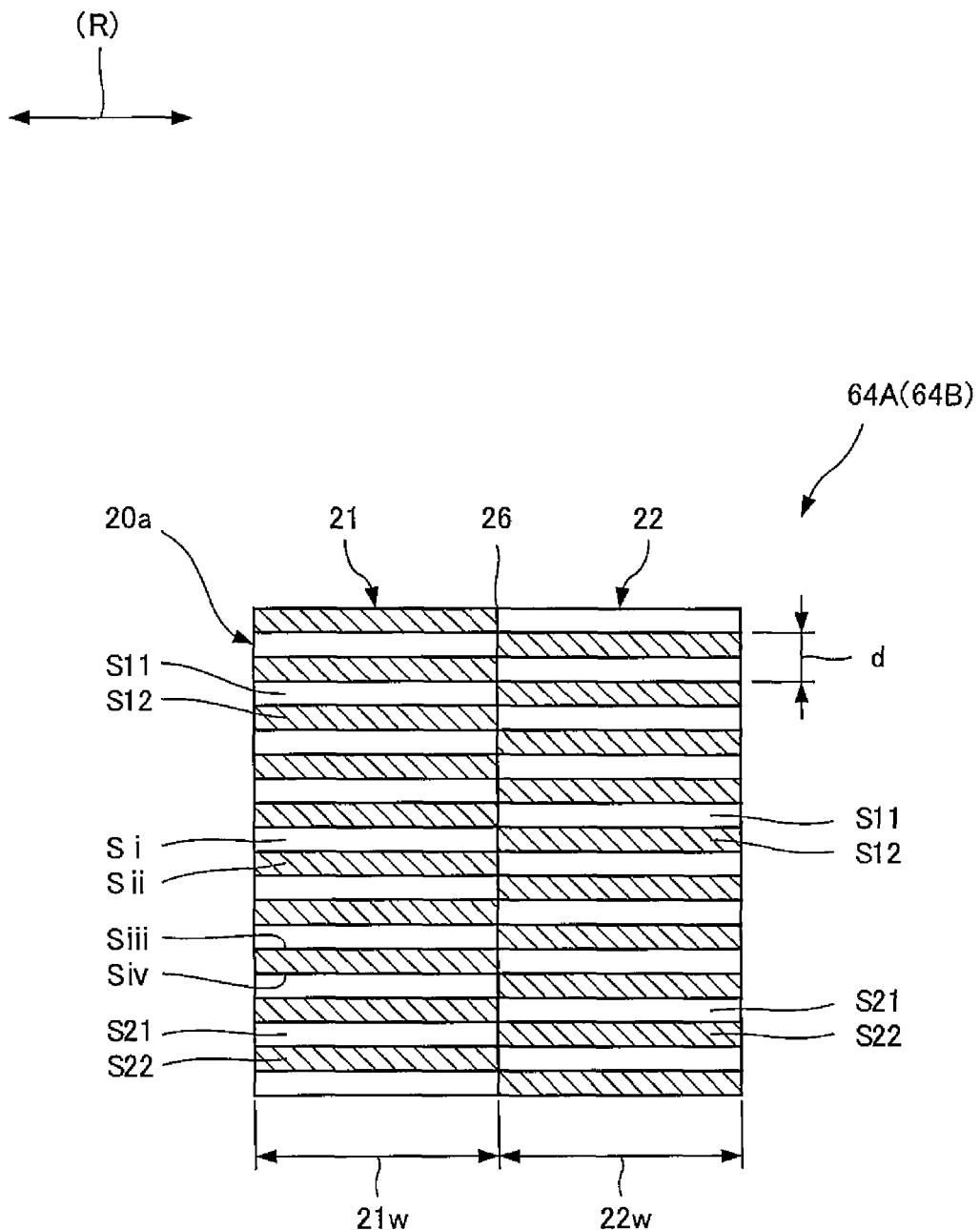
FIG. 7 is a schematic plan view of a first embodiment of a diffraction grating included in an optical pickup apparatus.
Figure 8:
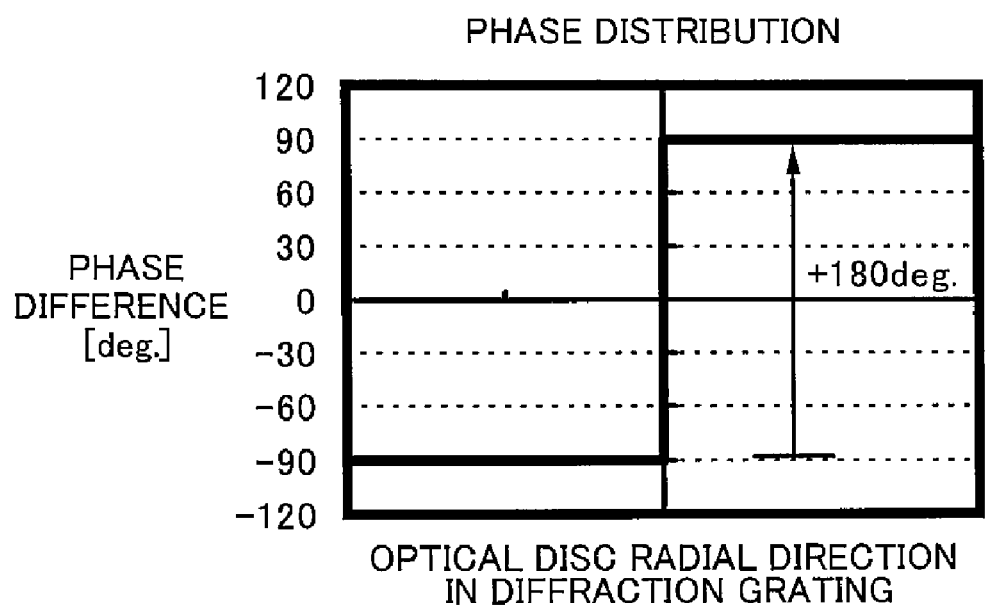
FIG. 8 is a diagram of a relationship between an optical disc radial direction and a phase difference in a diffraction grating of FIG. 7.

FIG. 7 is a schematic plan view of a first embodiment of a diffraction grating included in an optical pickup apparatus, and FIG. 8 is a diagram of a relationship between an optical disc radial direction and a phase difference in a diffraction grating of FIG. 7.

As shown in FIGS. 1 and 2, the optical pickup apparatus includes the light-emitting element 61 including the first light source 62 and the second light source 63, the diffraction grating 64A, the polarizing beam splitter 66, the collimating lens 67, the quarter-wave plate 68, the reflection mirror 69, the objective lens 70, the first parallel plate 71, the second parallel plate 72, the photodetector 73, the operation unit 76 (FIG. 2), and the objective lens driving unit 79. The optical pickup apparatus (FIGS. 1 and 2) further includes the coupling lens 65i and the light-receiving element 65ii as needed.

To be more specific, this optical pickup apparatus includes: the diffraction grating 64A that conforms to at least a first laser wavelength light and a second laser wavelength light which is a laser beam having a wavelength different from that of the first laser wavelength light and a laser beam having a wavelength shorter than the first laser wavelength light, that splits the first laser wavelength light into at least one first main beam and two first sub-beams, that splits the second laser wavelength light into at least one second main beam and two second sub-beams, and that includes a diffraction surface portion 20a (FIGS. 3, 6, and 7) corresponding to the second laser wavelength light and based on the second laser wavelength light; and the photodetector 73 including the first light-receiving area 74 that includes the one first main light-receiving unit 74a (FIGS. 4 and 5) applied with the one first main beam and the two first sub-light-receiving units 74b and 74c applied with the two first sub-beams, and the second light-receiving area 75 that includes the one second main light-receiving unit 75a applied with the one second main beam and the two second sub-light-receiving units 75b and 75c applied with the two second sub-beams.

If the optical pickup apparatus shown in FIGS. 1, 2, etc., is configured, the optical pickup apparatus is configured in which generation of unnecessary diffracted light is suppressed in the diffraction grating 64A.

An optical pickup apparatus generally includes the diffraction grating 300A or 300B having two diffraction surface portions 302 and 304, i.e., the first diffraction surface portion 302 (FIGS. 20 and 21) corresponding to the first laser wavelength light and the second diffraction surface portion 304 corresponding to the second laser wavelength light. Therefore, in the optical pickup apparatus, the first laser wavelength light is split into at least one first main beam and two first sub-beams when the first laser wavelength light passes through the first diffraction surface portion 302 of the diffraction grating 300A or 300B corresponding to the first laser wavelength light, however, unnecessary diffracted light is generated when the first laser wavelength light passes through the second diffraction surface portion 304 of the diffraction grating 300A or 300B corresponding to the second laser wavelength light.

Moreover, in the optical pickup apparatus, when the second laser wavelength light passes through the first diffraction surface portion 302 of the diffraction grating 300A or 300B (FIGS. 20 and 21) corresponding to the first laser wavelength light, unnecessary diffracted light is generated. When the second laser wavelength light passes through the second diffraction surface portion 304 of the diffraction grating 300A or 300B corresponding to the second laser wavelength light, the second laser wavelength light is split into at least one second main beam and two second sub-beams.

On the other hand, if the optical pickup apparatus includes the diffraction grating 64A including the diffraction surface portion 20a (FIGS. 3, 6, and 7) corresponding to the second laser wavelength light and based on the second laser wavelength light, and the first laser wavelength light is split into at least one first main beam and two first sub-beams when the first laser wavelength light passes through the diffraction surface portion 20a of the diffraction grating 64A corresponding to the second laser wavelength light and based on the second laser wavelength light, the unnecessary diffracted light is substantially prevented from being generated when the first laser wavelength light passes through the diffraction grating 64A.

When the second laser wavelength light passes through the diffraction surface portion 20a of the diffraction grating 64A (FIGS. 3, 6, and 7) corresponding to the second laser wavelength light and based on the second laser wavelength light, the second laser wavelength light is split into at least one second main beam and two second sub-beams substantially without the unnecessary diffracted light being generated.

A distance Yt(cd) between the center points of the first main light-receiving unit 200a and the first sub-light-receiving units 200b and 200c in the CD light-receiving area 280 of the photodetector 270 (FIG. 18) is a ordinary distance Yt(cd) standardized corresponding to the first laser wavelength light. A term "standardized" in an embodiment of the present invention is used for convenience when describing things, etc., which achieves widespread use, for example. For example, standardized things are things, etc., equivalent to substantially standardized things by being mass produced, etc. For example, the standardized photodetector 270 is a general-purpose photodetector 270, etc., which have been mass-produced and achieve widespread use in the market, etc. The one first main beam of the first laser wavelength light is applied to the one first main light-receiving unit 200a of existing specification and the two first sub-beams of the first laser wavelength light are applied to the two first sub-light-receiving units 200b and 200c of the existing specification.

However, for example, the distance Ys(cd) between the center points of the first main light-receiving unit 74a and the first sub-light-receiving units 74b and 74c of the photodetector 73 (FIG. 5) is changed relative to the ordinary distance Yt(cd) between the center points of the first main light-receiving unit 200a and the first sub-light-receiving units 200b and 200c of the photodetector 270 (FIG. 18) standardized corresponding to the first laser wavelength light.

For example, the distance Ys(cd) between the center points of the first main light-receiving unit 74a and the first sub-light-receiving units 74b and 74c is changed in this photodetector 73 (FIG. 5) relative to the ordinary distance Yt(cd) between the center points of the first main light-receiving unit 200a and the first sub-light-receiving units 200b and 200c of the photodetector 270 (FIG. 18) standardized corresponding to the first laser wavelength light, and thus, a problem is avoided that the two first sub-beams of the first laser wavelength light, which are obtained by splitting with the diffraction surface portion 20a of the diffraction grating 64A corresponding to the second laser wavelength light and based on the second laser wavelength light, are not appropriately applied to the two first sub-light-receiving units 74b and 74c of the first light-receiving area 74 included in the photodetector 73 (FIGS. 4 and 5) when the first laser wavelength light passes through the diffraction surface portion 20a of the diffraction grating 64A (FIGS. 3, 6, and 7) corresponding to the second laser wavelength light and based on the second laser wavelength light.

The two first sub-beams of the first laser wavelength light, which are obtained by splitting, substantially without the unnecessary diffracted light being generated, through the first laser wavelength light passing through the diffraction surface portion 20a of the diffraction grating 64A (FIGS. 3, 6, and 7) corresponding to the second laser wavelength light and based on the second laser wavelength light, are reliably applied to the two first sub-light-receiving units 74b and 74c with the distance Ys(cd) changed relative to the one first main light-receiving unit 74a of the first light-receiving area 74 included in the photodetector 73 (FIG. 5).

The one first main beam of the first laser wavelength light, which are obtained by splitting, substantially without the unnecessary diffracted light being generated, through the first laser wavelength light passing through the diffraction surface portion 20a of the diffraction grating 64A (FIGS. 3, 6, and 7) corresponding to the second laser wavelength light and based on the second laser wavelength light is reliably applied to the one first main light-receiving unit 74a of the first light-receiving area 74 included in the photodetector 73 (FIGS. 4 and 5).

The distance Ys(dvd) between the center points of the second main light-receiving unit 75a and the second sub-light-receiving units 75b and 75c in the second light-receiving area 75 of the photodetector 73 (FIG. 5) is the same as the ordinary distance Yt(dvd) of the photodetector 270 (FIG. 19) standardized corresponding to the second laser wavelength light.

The two second sub-beams of the second laser wavelength light, which are obtained by splitting, substantially without the unnecessary diffracted light being generated, through the second laser wavelength light passing through the diffraction surface portion 20a of the diffraction grating 64A (FIGS. 3, 6, and 7) corresponding to the second laser wavelength light and based on the second laser wavelength light, are reliably applied to the two second sub-light-receiving units 75b and 75c of the second light-receiving area 75 which is the same as that with the existing specification included in the photodetector 73 (FIGS. 4 and 5).

The one second main beam of the second laser wavelength light, which are obtained by splitting, substantially without the unnecessary diffracted light being generated, through the second laser wavelength light passing through the diffraction surface portion 20a of the diffraction grating 64A (FIGS. 3, 6, and 7) corresponding to the second laser wavelength light and based on the second laser wavelength light, is reliably applied to the second main light-receiving units 75a of the second light-receiving area 75 which is the same as that with the existing specification included in the photodetector 73.

The changed distance Ys(cd) between the center points of the first main light-receiving unit 74a and the first sub-light-receiving units 74b and 74c in the photodetector 73 (FIG. 5) is set longer than the ordinary distance Yt(cd) between the center points of the first main light-receiving unit 200a and the first sub-light-receiving units 200b and 200c in the standardized photodetector 270 (FIG. 18), for example.

To be more specific, when a value of the ordinary distance Yt(cd) between the center points of the first main light-receiving unit 200a and the first sub-light-receiving units 200b and 200c of the standardized photodetector 270 (FIG. 18) is defined as a value of 100%, a value of the changed distance Ys(cd) between the center points of the first main light-receiving unit 74a and the first sub-light-receiving units 74b and 74c in the photodetector 73 (FIG. 5) is set at a value of substantially 111% relative to the value of the ordinary distance Yt(cd) between the center points of the first main light-receiving unit 200a and the first sub-light-receiving units 200b and 200c of the standardized photodetector 270 (FIG. 18), for example.

If the photodetector 73 shown in FIGS. 4 and 5 is configured, the optical pickup apparatus is configured with improved detection accuracy of signals such as error signals. It is avoided that the one first main beam, which is generated by splitting the first laser wavelength light with the diffraction surface portion 20a of the diffraction grating 64A (FIGS. 3, 6, and 7), adversely affects the two first sub-light-receiving units 74*b* and 74*c* of the photodetector 73 (FIGS. 4 and 5).

If the photodetector 73 shown in FIGS. 4 and 5 is configured, the optical pickup apparatus is configured with improved detection accuracy of signals such as error signals. It is avoided that one or both of the two first sub-beams, which are generated by splitting the first laser wavelength light with the diffraction surface portion 20*a* of the diffraction grating 64A (FIGS. 3, 6, and 7), adversely affect the one first main light-receiving unit 74*a* of the photodetector 73 (FIGS. 4 and 5).

For example, if the changed distance Ys(cd) between the center points of the first main light-receiving unit 74*a* and the first sub-light-receiving units 74*b* and 74*c* in the photodetector 73 (FIG. 5) is set shorter than the ordinary distance Yt(cd) between the center points of the first main light-receiving unit 200*a* and the first sub-light-receiving units 200*b* and 200*c* in the standardized photodetector 270 (FIG. 18), it is concerned that the one first main beam interferes with the two first sub-light-receiving units 74*b* and 74*c* of the photodetector 270 (FIG. 18).

For example, if the changed distance Ys(cd) between the center points of the first main light-receiving unit 74*a* and the first sub-light-receiving units 74*b* and 74*c* in the photodetector 73 (FIG. 5) is set shorter than the ordinary distance Yt(cd) between the center points of the first main light-receiving unit 200*a* and the first sub-light-receiving units 200*b* and 200*c* in the standardized photodetector 270 (FIG. 18), it is concerned that one or both of the two first sub-beams interfere with the one first main light-receiving unit 74*a* of the photodetector 73 (FIGS. 4 and 5).

However, the changed distance Ys(cd) between the center points of the first main light-receiving unit 74*a* and the first sub-light-receiving units 74*b* and 74*c* in the photodetector 73 (FIG. 5) is set longer than the ordinary distance Yt(cd) between the center points of the first main light-receiving unit 200*a* and the first sub-light-receiving units 200*b* and 200*c* in the standardized photodetector 270 (FIG. 18), and thus, when the one first main beam is applied to the one first main light-receiving unit 74*a* of the photodetector 73, it becomes easier to prevent the one first main beam from interfering with one or both of the two first sub-light-receiving units 74*b* and 74*c*.

When a value of the ordinary distance Yt(cd) between the center points of the first main light-receiving unit 200*a* and the first sub-light-receiving units 200*b* and 200*c* of the standardized photodetector 270 (FIG. 18) is defined as a value of 100%, a value of the changed distance Ys(cd) between the center points of the first main light-receiving unit 74*a* and the first sub-light-receiving units 74*b* and 74*c* in the photodetector 73 (FIG. 5) is set at a value of substantially 111% relative to the value of the ordinary distance Yt(cd) between the center points of the first main light-receiving unit 200*a* and the first sub-light-receiving units 200*b* and 200*c* of the standardized photodetector 270 (FIG. 18), and therefore, when the one first main beam is applied to the one first main light-receiving unit 74*a* of the photodetector 73 (FIG. 5), it is avoided that the one first main beam interferes with one or both of the two first sub-light-receiving units 74*b* and 74*c*.

The changed distance Ys(cd) between the center points of the first main light-receiving unit 74*a* and the first sub-light-receiving units 74*b* and 74*c* in the photodetector 73 (FIG. 5) is set longer than the ordinary distance Yt(cd) between the center points of the first main light-receiving unit 200*a* and the first sub-light-receiving units 200*b* and 200*c* in the standardized photodetector 270 (FIG. 18), and thus, when the two front and back first sub-beams are applied to the two front and back first sub-light-receiving units 74*b* and 74*c* of the photodetector 73, it becomes easier to prevent one or both of the two first sub-beams from interfering with the one first main light-receiving unit 74*a*.

When a value of the ordinary distance Yt(cd) between the center points of the first main light-receiving unit 200*a* and the first sub-light-receiving units 200*b* and 200*c* of the standardized photodetector 270 (FIG. 18) is defined as a value of 100%, a value of the changed distance Ys(cd) between the center points of the first main light-receiving unit 74*a* and the first sub-light-receiving units 74*b* and 74*c* in the photodetector 73 (FIG. 5) is set at a value of substantially 111% relative to the value of the ordinary distance Yt(cd) between the center points of the first main light-receiving unit 200*a* and the first sub-light-receiving units 200*b* and 200*c* of the standardized photodetector 270 (FIG. 18), and therefore, when the two front and back first sub-beams are applied to the two front and back first sub-light-receiving units 74*b* and 74*c* of the photodetector 73 (FIG. 5), it is avoided that one or both of the two first sub-beams interferes with the one first main light-receiving unit 74*a*.

The distance Ys(dvd) between the center points of the second main light-receiving unit 75*a* and the second sub-light-receiving units 75*b* and 75*c* of the photodetector 73 is the same as the ordinary distance Yt(dvd) between the center points of the second main light-receiving unit 200*a* and the second sub-light-receiving units 200*b* and 200*c* of the standardized photodetector 270 (FIG. 19).

When a value of the ordinary distance Yt(dvd) between the center points of the second main light-receiving unit 200*a* and the second sub-light-receiving units 200*b* and 200*c* of the standardized photodetector 270 (FIG. 19) is defined as a value of 100%, a value of the distance Ys(dvd) between the center points of the second main light-receiving unit 75*a* and the second sub-light-receiving units 75*b* and 75*c* in the photodetector 73 (FIG. 5) is set at a value of substantially 100% relative to the value of the ordinary distance Yt(dvd) between the center points of the second main light-receiving unit 200*a* and the second sub-light-receiving units 200*b* and 200*c* of the standardized photodetector 270 (FIG. 19), for example.

If the photodetector 73 shown in FIGS. 4 and 5 is configured, the optical pickup apparatus is configured with improved detection accuracy of signals such as error signals. It is avoided that the one second main beam, which is generated by splitting the second laser wavelength light with the diffraction surface portion 20*a* of the diffraction grating 64A (FIGS. 3, 6, and 7), adversely affects the two second sub-light-receiving units 75*b* and 75*c* of the photodetector 73 (FIGS. 4 and 5). It is also avoided that one or both of the two second sub-beams, which are generated by splitting the second laser wavelength light with the diffraction surface portion 20*a* of the diffraction grating 64A (FIGS. 3, 6, and 7), adversely affect the one second main light-receiving unit 75*a* of the photodetector 73 (FIGS. 4 and 5).

For example, in the photodetector 73 (FIG. 5), if the distance Ys(cd) between the center points of the first main light-receiving unit 74*a* and the first sub-light-receiving units 74*b* and 74*c* is not changed and when the distance Ys(cd) between the center points of the first main light-receiving unit 74*a* and the first sub-light-receiving units 74*b* and 74*c* is set equal to the ordinary distance Yt(cd) between the center points of the first main light-receiving unit 200*a* and the first sub-light-receiving units 200*b* and 200*c* in the standardized photodetector 270 (FIG. 18), it becomes necessary to reduce the distance Ys(dvd) between the center points of the second main light-receiving unit 75*a* and the second sub-light-receiving units 75*b* and 75*c* of the photodetector 73 (FIG. 5).

For example, if the distance Ys(dvd) between the center points of the second main light-receiving unit 75*a* and the second sub-light-receiving units 75*b* and 75*c* in the photodetector 73 is set shorter than the ordinary distance Yt(dvd) between the center points of the second main light-receiving unit 200*a* and the second sub-light-receiving units 200*b* and 200*c* in the standardized photodetector 270 (FIG. 19), it is concerned that the one second main beam generated by splitting the second laser wavelength light with the diffraction surface portion 20*a* of the diffraction grating 64A (FIGS. 3, 6, and 7) interferes with the two second sub-light-receiving units 75*b* and 75*c* of the photodetector 73 (FIGS. 4 and 5).

For example, as shown in FIG. 5, it is concerned that when signals are reproduced from or signals are recorded on the first layer DL0 of the DVD standard optical disc D having a plurality of the layers DL0, DL1, i.e., the first layer DL0 and the second layer DL1, unnecessary reflected light from the second layer DL1 of the DVD standard optical disc D enters as noise into one or both of the one second sub-light-receiving unit 75*b* and the other second sub-light-receiving unit 75*c* of the DVD light-receiving area 75 in the photodetector 73.

As above, when signals are reproduced from or signals are recorded on either the layer DL0 or DL1, i.e., the first layer DL0 or the second layer DL1, using the DVD standard optical disc having a plurality of the layers DL0, DL1, occurrence of so-called crosstalk between layers is concerned, that is, a leakage signal enters into one or both of the one second sub-light-receiving unit 75*b* and the other second sub-light-receiving unit 75*c* of the DVD light-receiving area 75 in the photodetector 73.

For example, if the distance Ys(dvd) between the center points of the second main light-receiving unit 75*a* and the second sub-light-receiving units 75*b* and 75*c* in the photodetector 73 is set shorter than the ordinary distance Yt(dvd) between the center points of the second main light-receiving unit 200*a* and the second sub-light-receiving units 200*b* and 200*c* in the standardized photodetector 270 (FIG. 19), it is concerned that one or both of the two second sub-beams generated by splitting the second laser wavelength light with the diffraction surface portion 20*a* of the diffraction grating 64A (FIGS. 3, 6, and 7) interfere with the one second main light-receiving unit 75*a* of the photodetector 73 (FIGS. 4 and 5).

If the distance Ys(dvd) between the center points of the second main light-receiving unit 75*a* and the second sub-light-receiving units 75*b* and 75*c* in the photodetector 73 is set equal to the ordinary distance Yt(dvd) between the center points of the second main light-receiving unit 200*a* and the second sub-light-receiving units 200*b* and 200*c* in the standardized photodetector 270 (FIG. 19), it is avoided that the one second main beam interferes with one or both of the two second sub-light-receiving units 75*b* and 75*c* of the photodetector 73 (FIG. 5) or one or both of the two second sub-beams interferes with the one second main light-receiving unit 75*a* of the photodetector 73, for example.

When a value of the ordinary distance Yt(dvd) between the center points of the second main light-receiving unit 200*a* and the second sub-light-receiving units 200*b* and 200*c* of the standardized photodetector 270 (FIG. 19) is defined as a value of 100%, a value of the distance Ys(dvd) between the center points of the second main light-receiving unit 75*a* and the second sub-light-receiving units 75*b* and 75*c* in the photodetector 73 (FIG. 5) is set at a value of substantially 100% relative to the value of the ordinary distance Yt(dvd) between the center points of the second main light-receiving unit 200*a* and the second sub-light-receiving units 200*b* and 200*c* of the standardized photodetector 270 (FIG. 19), and therefore, it is avoided that when the one second main beam is applied to the one second main light-receiving unit 75*a* of the photodetector 73 (FIG. 5), the one second main beam interferes with one or both of the two second sub-light-receiving units 75*b* and 75*c*.

When a value of the ordinary distance Yt(dvd) between the center points of the second main light-receiving unit 200*a* and the second sub-light-receiving units 200*b* and 200*c* of the standardized photodetector 270 (FIG. 19) is defined as a value of 100%, a value of the distance Ys(dvd) between the center points of the second main light-receiving unit 75*a* and the second sub-light-receiving units 75*b* and 75*c* in the photodetector 73 (FIG. 5) is set at a value of substantially 100% relative to the value of the ordinary distance Yt(dvd) between the center points of the second main light-receiving unit 200*a* and the second sub-light-receiving units 200*b* and 200*c* of the standardized photodetector 270 (FIG. 19), and therefore, it is avoided that when the two front and back second sub-beams are applied to the two front and back second sub-light-receiving units 75*b* and 75*c* of the photodetector 73 (FIG. 5), one or both of the two second sub-beams interfere with the one second main light-receiving unit 75*a*.

When the first sub-light-receiving units 74*b* and 74*c* are repositioned to be disposed in a pairwise manner across the first main light-receiving unit 74*a* of the photodetector 73 (FIGS. 4 and 5) as a center, and the repositioned first sub-light-receiving unit 74*b* on the front side, the first main light-receiving unit 74*a* at the center, and the repositioned first sub-light-receiving unit 74*c* on the back side are provided side by side in a substantially straight line, a split light ratio among the repositioned first sub-light-receiving unit 74*b* on the front side, the first main light-receiving unit 74*a* at the center, and the repositioned first sub-light-receiving unit 74*c* on the back side is changed relative to a split light ratio among the first sub-light-receiving unit 200*b* on the front side, the first main light-receiving unit 200*a* at the center, and the first sub-light-receiving unit 200*c* on the back side of the standardized photodetector 270 (FIG. 18).

To be more specific, when the first sub-light-receiving units 74*b* and 74*c* are repositioned to be disposed in a pairwise manner across the first main light-receiving unit 74*a* of the photodetector 73 (FIGS. 4 and 5) as a center, and the repositioned first sub-light-receiving unit 74*b* on the front side, the first main light-receiving unit 74*a* at the center, and the repositioned first sub-light-receiving unit 74*c* on the back side are provided side by side in a substantially straight line, a split light ratio among the repositioned first sub-light-receiving unit 74*b* on the front side, the first main light-receiving unit 74*a* at the center, and the repositioned first sub-light-receiving unit 74*c* on the back side is substantially 1: (20 to 26):1. That is, a split light ratio among the repositioned first sub-light-receiving unit 74*b* on the front side, the first main light-receiving unit 74*a* at the center, and the repositioned first sub-light-receiving unit 74*c* on the back side is substantially 1:(23±3):1.

If the split light ratio of the first laser wavelength light in the photodetector 73 (FIGS. 4 and 5) changed in setting is changed relative to the split light ratio of the first laser wavelength light in the standardized photodetector 270 (FIG. 18), it becomes more easy to perform the detection of the one first main beam and the detection of the two first sub-beams in an accurate and favorable manner in the photodetector 73 changed in setting. In a case where the split light ratio of the first laser wavelength light in the photodetector 73 (FIGS. 4 and 5) changed in setting is set at substantially 1:(20 to 26):1, i.e., substantially 1:(23±3):1, while the split light ratio of the first laser wavelength light of the standardized photodetector 270 (FIG. 18) is set at substantially 1:16:1, the detection of the one first main beam and the detection of the two first sub-beams are accurately and favorably performed in the photodetector 73 changed in setting.

For example, when the first laser wavelength light passes through the diffraction grating 300A or 300B including two diffraction surface portions 302 and 304, which are the first diffraction surface portion 302 (FIGS. 20 and 21) corresponding to the first laser wavelength light and the second diffraction surface portion 304 corresponding to the second laser wavelength light, and when the first laser wavelength light is split into at least one first sub-beam on the front side, one first main beam at the center, and one first sub-beam on the back side, the detection of the one first main beam and the detection of the two first sub-beams are accurately performed in the standardized photodetector 270 by setting the split light ratio at substantially 1:16:1 among the first sub-light-receiving unit 200b (FIG. 18) on the front side applied with the one first sub-beam on the front side, the first main light-receiving unit 200a at the center applied with the one first main beam at the center, and the first sub-light-receiving unit 200c on the back side applied with the one first sub-beam on the back side.

However, it is concerned that the detection of the one first main beam and the detection of the two first sub-beams are not accurately performed in the standardized photodetector 270, for example, in a case where the first laser wavelength light passes through the diffraction grating 300A or 300B including the diffraction surface portion 304 corresponding to the second laser wavelength light and based on the second laser wavelength light and excluding, i.e., omitting, the diffraction grating 320 having the diffraction surface portion 302 (FIGS. 20 and 21) corresponding to the first laser wavelength light, and when the first laser wavelength light is split into at least one first sub-beam on the front side, one first main beam at the center, and one first sub-beam on the back side, if the split light ratio is set at, for example, an ordinary ratio of substantially 1:16:1 among the repositioned first sub-light-receiving unit 200b (FIG. 18) on the front side applied with the one first sub-beam on the front side, the first main light-receiving unit 200a at the center applied with the one first main beam at the center, and the repositioned first sub-light-receiving unit 200c on the back side applied with the one first sub-beam on the back side.

On the other hand, when the first laser wavelength light passes through the diffraction grating 64A including the diffraction surface portion 20a (FIGS. 3, 6, and 7) corresponding to the second laser wavelength light and based on the second laser wavelength light, and when the first laser wavelength light is split into at least one first sub-beam on the front side, one first main beam at the center, and one first sub-beam on the back side, the detection of the one first main beam and the detection of the two first sub-beams are accurately and favorably performed in the photodetector 73 (FIGS. 4 and 5) changed in setting, if the split light ratio among the repositioned first sub-light-receiving unit 74b (FIGS. 4 and 5) on the front side applied with the one first sub-beam on the front side, the first main light-receiving unit 74a at the center applied with the one first main beam at the center, and the repositioned first sub-light-receiving unit 74c on the back side applied with the one first sub-beam on the back side, is changed relative to the split light ratio among the first sub-light-receiving unit 200b on the front side, the first main light-receiving unit 200a at the center, and the first sub-light-receiving unit 200c on the back side in the standardized photodetector 270 (FIG. 18), so as to be set to substantially 1:(20 to 26):1, i.e., substantially 1:(23±3):1.

If the split light ratio among the repositioned first sub-light-receiving unit 74b on the front side applied with the one first sub-beam on the front side, the first main light-receiving unit 74a at the center applied with the one first main beam at the center, and the repositioned first sub-light-receiving unit 74c on the back side applied with the one first sub-beam on the back side is set at substantially 1: (less than 20):1, for example, or if this split light ratio is set at substantially 1:(more than 26):1, for example, it is concerned that the detection of the one first main beam and the detection of the two first sub-beams are not accurately performed, however, the detection of the one first main beam and the detection of the two first sub-beams are accurately and favorably performed by setting this split light ratio at substantially 1:(20 to 26):1, preferably substantially 1:(21 to 25):1.

when the second sub-light-receiving units 75b and 75c are disposed in a pairwise manner across the second main light-receiving unit 75a of the photodetector 73 as a center, and the second sub-light-receiving unit 75b on the front side, the second main light-receiving unit 75a at the center, and the second sub-light-receiving unit 75c on the backside are provided side by side in a substantially straight line, a split light ratio among the second sub-light-receiving unit 75b on the front side, the second main light-receiving unit 75a at the center, and the second sub-light-receiving unit 75c on the back side is substantially 1:(12 to 18):1. That is, a split light ratio of the second sub-light-receiving unit 75b on the front side, the second main light-receiving unit 75a at the center, and the second sub-light-receiving unit 75c on the back side is substantially 1:(15±3):1.

If the split light ratio is determined as above, the detection of the one second main beam and the detection of the two second sub-beams are accurately and favorably performed in the photodetector 73. When the second laser wavelength light passes through the diffraction grating 64A including the diffraction surface portion 20a (FIGS. 3, 6, and 7) corresponding to the second laser wavelength light and based on the second laser wavelength light, and the second laser wavelength light is split into at least one second sub-beam on the front side, one second main beam at the center, and one second sub-beam on the back side, the detection of the one second main beam and the detection of the two second sub-beams are accurately and favorably performed in the photodetector 73, if the split light ratio among the second sub-light-receiving unit 75b (FIGS. 4 and 5) on the front side applied with the one second sub-beam on the front side, the second main light-receiving unit 75a at the center applied with the one second main beam at the center, and the second sub-light-receiving unit 75c on the back side applied with the one second sub-beam on the back side, is set at substantially 1:(12 to 18):1, i.e., substantially 1:(15±3):1.

If the split light ratio among the second sub-light-receiving unit 75b on the front side applied with the one second sub-beam on the front side, the second main light-receiving unit 75a at the center applied with the one second main beam at the center, and the second sub-light-receiving unit 75c on the back side applied with the one second sub-beam on the back side is set at substantially 1: (less than 12):1, for example, or if this split light ratio is set at substantially 1:(more than 18):1, for example, it is concerned that the detection of the one second main beam and the detection of the two second sub-beams are not accurately performed, however, the detection of the one second main beam and the detection of the two second sub-beams are accurately and favorably performed by setting this split light ratio at substantially 1:(12 to 18):1, preferably substantially 1:(14 to 18):1.

A value of the light-receiving sensitivity in the one first main light-receiving unit 74a (FIGS. 4 and 5) is changed relative to or is equal to a value of the ordinary light-receiving sensitivity in the one standardized first main light-receiving unit 200*a* (FIG. 18). To be more specific, when a value of the ordinary light-receiving sensitivity in the one standardized first main light-receiving unit 200*a* (FIG. 18) is defined as a value of 100%, the changed or equal value of the light-receiving sensitivity in the one first main light-receiving unit 74*a* (FIGS. 4 and 5) is set at a lower value of substantially 100% or less relative to the value of the ordinary light-receiving sensitivity in the one standardized first main light-receiving unit 200*a*.

Values of the light-receiving sensitivity in the two first sub-light-receiving units 74*b* and 74*c* (FIGS. 4 and 5) are changed relative to values of the ordinary light-receiving sensitivity in the two standardized first sub-light-receiving units 200*b* and 200*c* (FIG. 18). To be more specific, when both the values of the ordinary light-receiving sensitivity in the two standardized first sub-light-receiving units 200*b* and 200*c* (FIG. 18) are set at a value of 100%, both the changed values of the light-receiving sensitivity in the two first sub-light-receiving units 74*b* and 74*c* (FIGS. 4 and 5) are set at higher values of substantially 100% or greater relative to the values of the ordinary light-receiving sensitivity in the two standardized first sub-light-receiving units 200*b* and 200*c*.

The values of the light-receiving sensitivity are changed relative to or set equal to the ordinary values, the detection of the one first main beam and the detection of the two first sub-beams are more easily performed in a relatively accurate manner in the photodetector 73 changed in setting. When the value of the light-receiving sensitivity in the one first main light-receiving unit 74*a* (FIGS. 4 and 5) is changed relative to or is equal to the ordinary light-receiving sensitivity in the one standardized first main light-receiving unit 200*a* (FIG. 18), and the values of the light-receiving sensitivity in the two first sub-light-receiving units 74*b* and 74*c* (FIGS. 4 and 5) are changed relative to the ordinary light-receiving sensitivity in the two standardized first sub-light-receiving units 200*b* and 200*c* (FIG. 18), and therefore, the detection of the one first main beam and the detection of the two first sub-beams are performed in a relatively accurate manner in the photodetector 73 changed in setting.

To be more specific, the changed or equal value of the light-receiving sensitivity in the one first main light-receiving unit 74*a* (FIGS. 4 and 5) is set at a lower value of substantially 100% or less while the value of the ordinary light-receiving sensitivity in the one standardized first main light-receiving unit 200*a* (FIG. 18) is set at 100%, and both the changed values of the light-receiving sensitivity in the two first sub-light-receiving units 74*b* and 74*c* (FIGS. 4 and 5) are set at higher values of substantially 100% or greater while both the values of the ordinary light-receiving sensitivity in the two standardized first sub-light-receiving units 200*b* and 200*c* (FIG. 18) are set at 100%, and therefore, the detection of the one first main beam and the detection of the two first sub-beams are performed in a relatively accurate manner in the photodetector 73 changed in setting.

when the value of the ordinary light-receiving sensitivity in the one standardized first main light-receiving unit 200*a* (FIG. 18) is set at a value of 100%, the changed or equal value of the light-receiving sensitivity in the one first main light-receiving unit 74*a* (FIGS. 4 and 5) is set at a value of substantially 95 to 100%, preferably, substantially 96 to 100% relative to the value of the ordinary light-receiving sensitivity in the one standardized first main light-receiving unit 200*a*. When both the values of the ordinary light-receiving sensitivity in the two standardized first sub-light-receiving units 200*b* and 200*c* (FIG. 18) are set at a value of 100%, both the changed values of the light-receiving sensitivity in the two first sub-light-receiving units 74*b* and 74*c* (FIGS. 4 and 5) are set at a value of substantially 120 to 160%, preferably, substantially 138 to 142% relative to the values of the ordinary light-receiving sensitivity in the two standardized first sub-light-receiving units 200*b* and 200*c*.

If the values of the light-receiving sensitivity are set as above, the detection of the one first main beam and the detection of the two first sub-beams are accurately and favorably performed in the photodetector 73 changed in setting. The changed or equal value of the light-receiving sensitivity in the one first main light-receiving unit 74*a* (FIGS. 4 and 5) is set at a value of substantially 95 to 100%, preferably, substantially 96 to 100%, while the value of the ordinary light-receiving sensitivity in the one standardized first main light-receiving unit 200*a* (FIG. 18) is set at a value of 100; and both the changed values of the light-receiving sensitivity in the two first sub-light-receiving units 74*b* and 74*c* (FIGS. 4 and 5) are set at substantially 120 to 160%, preferably, substantially 138 to 142%, while both the values of the ordinary light-receiving sensitivity in the two standardized first sub-light-receiving units 200*b* and 200*c* (FIG. 18) set at a value of 100%, and therefore, the detection of the one first main beam and the detection of the two first sub-beams are accurately and favorably performed in the photodetector 73 changed in setting.

A value of the light-receiving sensitivity in the one second main light-receiving unit 75*a* is a value of the ordinary light-receiving sensitivity in the one standardized second main light-receiving unit 200*a* (FIG. 19). When a value of the ordinary light-receiving sensitivity in the one standardized second main light-receiving unit 200*a* is defined as a value of 100%, the value of the light-receiving sensitivity in the one second main light-receiving unit 75*a* (FIGS. 4 and 5) is set at a value of substantially 100% relative to the value of the ordinary light-receiving sensitivity in the one standardized second main light-receiving unit 200*a*.

Values of the light-receiving sensitivity in the two second sub-light-receiving units 75*b* and 75*c* are values of the ordinary light-receiving sensitivity in the two standardized second sub-light-receiving units 200*b* and 200*c* (FIG. 19). When both the values of the ordinary light-receiving sensitivity in the two standardized second sub-light-receiving units 200*b* and 200*c* are set at a value of 100%, both the values of the light-receiving sensitivity in the two second sub-light-receiving units 75*b* and 75*c* (FIGS. 4 and 5) are set at a value of substantially 100% relative to the values of the ordinary light-receiving sensitivity in the two standardized second sub-light-receiving units 200*b* and 200*c*.

If the values of the light-receiving sensitivity are set as above, the detection of the one second main beam and the detection of the two second sub-beams are accurately performed in the photodetector 73. The value of the light-receiving sensitivity in the one second main light-receiving unit 75*a* is set at the value of the ordinary light-receiving sensitivity in the one standardized second main light-receiving unit 200*a* (FIG. 19), and the values of the light-receiving sensitivity in the two second sub-light-receiving units 75*b* and 75*c* (FIGS. 4 and 5) are set at the values of the ordinary light-receiving sensitivity in the two standardized second sub-light-receiving units 200*b* and 200*c* (FIG. 19), and therefore, the detection of the one second main beam and the detection of the two second sub-beams are accurately performed in the photodetector 73.

The value of the light-receiving sensitivity in the one second main light-receiving unit 75*a* (FIGS. 4 and 5) is set at a value of substantially 100% while the value of the ordinary light-receiving sensitivity in the one standardized second main light-receiving unit 200*a* (FIG. 19) is set at a value 100%, and both the values of the light-receiving sensitivity in the two second sub-light-receiving units 75b and 75c (FIGS. 4 and 5) are set at a value of substantially 100% while both the values of the ordinary light-receiving sensitivity in the two standardized second sub-light-receiving units 200b and 200c (FIG. 19) are set at a value of 100%, and therefore, the detection of the one second main beam and the detection of the two second sub-beams are accurately performed in the photodetector 73.

The diffraction surface portion 20a of the diffraction grating 64A (FIGS. 3, 6, and 7) is formed as the one surface portion 20a supporting diffraction of a plurality of types of laser wavelength light, to be used both as the diffraction surface portion 20a for splitting the first laser wavelength light into at least one first main beam and two first sub-beams and as the diffraction surface portion 20a for splitting the second laser wavelength light into at least one second main beam and two second sub-beams.

If the diffraction surface portion 20a of the diffraction grating 64A is formed as above, such an optical pickup apparatus is configured that generation of unnecessary diffracted light may be suppressed in the diffraction grating 64A, reduction in efficiency of a laser beam is prevented, and a price may be further reduced.

For example, when the first laser wavelength light passes through the first diffraction surface portion 302 of the diffraction grating 300A or 300B including the two diffraction surface portions 302 and 304, which are the first diffraction surface portion 302 (FIGS. 20 and 21) corresponding to the first laser wavelength light and the second diffraction surface portion 304 corresponding to the second laser wavelength light, and the first laser wavelength light is split into at least one first main beam and two first sub-beams, it is concerned that the second diffraction surface portion 304 of the diffraction grating 300A or 300B further unnecessarily diffracts the first main beam of the first laser wavelength light and further unnecessarily diffracts the first sub-beams, and that the optical efficiency is accordingly reduced in the first main beam and the first sub-beams of the first laser wavelength light.

For example, when the second laser wavelength light passes through the second diffraction surface portion 304 of the diffraction grating 300A or 300B including the two diffraction surface portions 302 and 304, which are the first diffraction surface portion 302 corresponding to the first laser wavelength light and the second diffraction surface portion 304 corresponding to the second laser wavelength light, and the second laser wavelength light is split into at least one second main beam and two second sub-beams, it is concerned that the first diffraction surface portion 302 of the diffraction grating 300A or 300B unnecessarily diffracts the second laser wavelength light, and that the optical efficiency is accordingly reduced in the second laser wavelength light.

However, if the diffraction surface portion 20a of the diffraction grating 64A (FIGS. 3, 6, and 7) is formed as the one surface portion 20a supporting the diffraction of a plurality of types of laser wavelength light, to be used both as the diffraction surface portion 20a for splitting the first laser wavelength light into at least one first main beam and two first sub-beams and as the diffraction surface portion 20a for splitting the second laser wavelength light into at least one second main beam and two second sub-beams, it is avoided that the optical efficiency of the first main beam and the first sub-beams of the first laser wavelength light is reduced due to the unnecessary diffraction of the first main beam and the first sub-beams of the first laser wavelength light, and the optical efficiency of the second laser wavelength light is reduced due to the unnecessary diffraction of the second laser wavelength light.

The diffraction surface portion 20a of the diffraction grating 64A is formed as the one surface portion 20a supporting the diffraction of a plurality of types of laser wavelength light, to be used both as the diffraction surface portion 20a for splitting the first laser wavelength light into at least one first main beam and two first sub-beams and as the diffraction surface portion 20a for splitting the second laser wavelength light into at least one second main beam and two second sub-beams, and therefore, the diffraction grating 64A is configured, in which portions to be processed, man-hours, etc., are reduced. Since the portions to be processed, man-hours, etc., in the diffraction grating 64A are reduced, the price of the diffraction grating 64A may be reduced. Therefore, the optical pickup apparatus may be configured that can be reduced in price.

As in FIGS. 3 and 7, the diffraction grating 64A is provided with phase shift area portions 21 and 22 (FIGS. 3 and 7) that generate a pi radian phase shift in a portion of the laser beam emitted from the laser unit 61 (FIGS. 1 and 2). The diffraction grating 64A is divided into at least the two area portions 21 and 22, which are the substantially rectangular first area portion 21 and the substantially rectangular second area portion 22 adjacent to the first area portion 21. The diffraction grating 64A is divided into a plurality of the area portions 21 and 22. A predetermined periodic structure is made up in each of the area portions 21 and 22.

In the diffraction grating 64A shown in FIGS. 3 and 7, each of the area portions 21 and 22 making up the diffraction grating 64A has a repetitive periodic structure in a minute convex-concave shape. The diffraction grating 64A is a glass plate whose dimensions are substantially 3 to 10 mm in height and width and substantially 0.3 to 3 mm in thickness, for example.

If the diffraction grating 64A is configured that is divided into a plurality of the area portions 21 and 22, detection of the error signals for the signal surface portion Da of the medium D (FIGS. 4 and 5) is more easily performed in a favorable manner by the optical pickup apparatus. For example, the tracking by the optical pickup apparatus is more easily performed for the signal surface portion Da of the medium D in a favorable manner. Since the diffraction grating 64A (FIGS. 3 and 7) is configured to be divided into a plurality of the area portions 21 and 22, at least three separate irradiation spots 80, 81, and 82 are applied to the signal surface portion Da of the medium D (FIG. 4). Since the at least three irradiation spots 80, 81, and 82 are separately applied to the signal surface portion Da of the medium D, it becomes easier to prevent detection accuracy of the error signals such as the tracking error signal from deteriorating when recording/reproduction is performed for two or more types of the media D having different track pitches Dtp. Therefore, the optical pickup apparatus may be provided in which the tracking control is more easily performed.

As in FIGS. 3 and 7, the diffraction grating 64A is divided into an even number of the area portions 21 and 22.

If the diffraction grating 64A is configured which is divided into an even number of the area portions 21 and 22, the irradiation spots 80, 81, and 82 formed on the signal surface portion Da of the medium D (FIG. 4) are formed as the accurate irradiation spots 80, 81, and 82. For example, the diffraction grating 64A is divided by a boundary line portion 26 of the diffraction grating 64A (FIGS. 3 and 7) into two equal parts that is even-numbered parts, which are the one area portion 21 and the other area portion 22, and therefore, it becomes easier to apply the light that is applied to the diffraction grating 64A substantially equally to the one area portion 21 of the diffraction grating 64A and the other area portion 22 of the diffraction grating 64A when the diffraction grating 64A is mounted on the optical pickup apparatus. Since it becomes easier to apply the light substantially equally to the one area portion 21 of the diffraction grating 64A and the other area portion 22 of the diffraction grating 64A, it becomes easier to precisely dispose the diffraction grating 64A on the optical pickup apparatus. Therefore, it becomes easier to accurately form the irradiation spots 80, 81, and 82 on the signal surface portion Da of the medium D (FIG. 4). Accordingly the detection accuracy of the error signals such as the tracking error signal is improved when recording/reproduction is performed for two or more types of the media D having different track pitches Dtp. It becomes easier to accurately perform the tracking in the optical pickup apparatus for the signal surface portion Da of the medium D.

As in FIGS. 3 and 7, the diffraction grating 64A is divided into the two area portions 21 and 22, which are the first area portion 21 and the second area portion 22 that is adjacent to the first area portion 21 and that has a periodic structure different from a periodic structure of the first area portion 21. The diffraction grating 64A is configured as a so-called two-divided in-line grating.

If the diffraction grating 64A divided into a plurality of the area portions 21 and 22 shown in FIGS. 3 and 7 is mounted on the optical pickup apparatus, the detection of the error signals is favorably performed for the signal surface portion Da of the medium D (FIGS. 2, 4, and 5) in the optical pickup apparatus. For example, the tracking in the optical pickup apparatus is favorably performed for the signal surface portion Da of the medium D. Since the diffraction grating 64A (FIGS. 3 and 7) is configured to be divided into the two area portions 21 and 22, the at least three separate irradiation spots 80, 81, and 82 are applied to the signal surface portion Da of the medium D (FIG. 4). The at least three irradiation spots 80, 81, and 82 are separately applied to the signal surface portion Da of the medium D, and therefore, when data recording is performed for two or more types of the media D having different track pitches Dtp or when data reproduction is performed for two or more types of the media D having different track pitches Dtp, it is avoided that detection accuracy of the error signals such as the tracking error signal deteriorates with displacement of the objective lens 70 (FIGS. 1 and 2), for example. Therefore, the optical pickup apparatus may be provided that can easily perform the tracking control.

As in FIG. 7, the diffraction grating 64A includes the one substantially rectangular area portion 21, which is the first area portion 21, and the other substantially rectangular area portion 22, which is the second area portion 22 adjacent to the first area portion 21. In the diffraction grating 64A, a width 21w of the first area portion 21 is substantially equal to a width 22w of the second area portion 22. The diffraction grating 64A is divided into two equal parts, which are the one area portion 21 making up the diffraction grating 64A and the other area portion 22 making up the diffraction grating 64A by the boundary line portion 26 between the first area portion 21 of the diffraction grating 64A and the second area portion 22 adjacent to the first area portion 21 of the diffraction grating 64A. The diffraction grating 64A is divided into even-numbered parts.

As a result, the irradiation spots 80, 81, and 82 formed on the signal surface portion Da of the medium D (FIG. 4) are formed as the accurate irradiation spots 80, 81, and 82. The diffraction grating 64A is divided into two equal parts, which are the one area portion 21 that is the first area portion 21 and the other area portion 22 that is the second area portion adjacent to the one area portion 21, by the boundary line portion 26 between the first area portion 21 and the second area portion 22 adjacent to the first area portion 21 of the diffraction grating 64A (FIGS. 3 and 7) divided into even-numbered parts, and therefore, the laser beam emitted from the laser unit 61 (FIGS. 1 and 2) and applied to the diffraction grating 64A is easily subjected to light axis by a light axis adjusting camera not shown, for example, when the diffraction grating 64A is mounted on a housing (not shown) of the optical pickup apparatus. After the laser beam is emitted from the laser unit 61 and applied to the diffraction grating 64A, the laser beam having passed through the objective lens 70 may be observed with the use of the light axis adjusting camera, for example.

The diffraction grating 64A includes the boundary line portion 26 that divides the diffraction grating 64A substantially at the center thereof into two equal parts to make up the one substantially rectangular area portion 21 and the other substantially rectangular area portion 22 in the two-divided diffraction grating 64A (FIGS. 3 and 7), and therefore, it becomes easier to apply the laser beam substantially equally to the one substantially rectangular area portion 21 making up the diffraction grating 64A and the other substantially rectangular area portion 22 making up the diffraction grating 64A when the light axis adjustment of the laser beam is performed with the use of the light axis adjusting camera, etc.

Since it becomes easier to apply the laser beam substantially equally to the one substantially rectangular area portion 21 making up the diffraction grating 64A and the other substantially rectangular area portion 22 making up the diffraction grating 64A, the diffraction grating 64A is more easily disposed on the housing of the optical pickup apparatus while being accurately positioned and adjusted. Therefore, it becomes easier to form the irradiation spots 80, 81, and 82 accurately on the signal surface portion Da of the medium D (FIG. 4). Accordingly, it becomes easier to perform the tracking in the optical pickup apparatus accurately for the signal surface portion Da of the medium D.

The substantially linear boundary line portion 26 making up the diffraction grating 64A (FIGS. 3 and 7) is located between the substantially strip-shaped first area portion 21 and the substantially strip-shaped second area portion 22 making up the diffraction grating 64A. The periodic structure of the second area portion 22 is a periodic structure having a phase difference relative to that of the periodic structure of the first area portion 21. The periodic structure of the second area portion 22 is a periodic structure having a phase difference of substantially 180 degrees relative to the periodic structure of the first area portion 21.

Therefore, the first area portion 21 is differentiated from the second area portion 22 in the diffraction grating 64A, and a phase difference is made clear between the first area portion 21 and the second area portion 22 of the diffraction grating 64A. Since the periodic structure of the second area portion 22 of the diffraction grating 64A is a periodic structure having a phase difference of substantially 180 degrees relative to the periodic structure of the first area portion 21 in the diffraction grating 64A, the at least three irradiation spots 80, 81, and 82 are formed in a favorable manner on the signal surface portion Da of the medium D (FIG. 4). Due to the at least three irradiation spots 80, 81, and 82 formed in a favorable manner on the signal surface portion Da of the medium D, it becomes easier to prevent the tracking error signal from deteriorating, for example, with displacement of the objective lens 70 (FIGS. 1 and 2), when data recording/reproduction is performed of a plurality of types of the media D having different track pitches Dtp.

The first area portion 21 (FIGS. 3 and 7) and the second area portion 22 are divided by the boundary line portion 26 sectioning the first area portion 21 and the second area portion 22.

Since the diffraction grating 64A is divided into two area portions and differentiated, the at least three separate irradiation spots 80, 81, and 82 are applied to the signal surface portion Da of the medium D (FIG. 4). The at least three irradiation spots 80, 81, and 82 are separately applied to the signal surface portion Da of the medium D, so that it becomes more easier to perform the tracking of the optical pickup apparatus for the signal surface portion Da of the medium D.

The diffraction grating 64A (FIGS. 3 and 7) is formed in a substantially rectangular plate shape. The diffraction grating 64A is visually recognized as a substantially rectangular plate-shaped object in plan view of the diffraction grating 64A.

In a state where the vertically long substantially rectangular first area portion 21 and the vertically long substantially rectangular second area portion 22 are arranged side by side, when a phase of the other area portion adjacent to the right side of one area portion is shifted relative to a phase of the one area portion of the diffraction grating 64A to form a substantially upward step-like shape in the plan view of the diffraction grating 64A, this is defined as the phase of the other area portion being shifted to a plus (+) side.

In a state where the vertically long substantially rectangular first area portion 21 and the vertically long substantially rectangular second area portion 22 are arranged side by side, when the phase of the other area portion adjacent to the right side of the one area portion is shifted relative to the phase of the one area portion of the diffraction grating 64A to form a substantially downward step-like shape in the plan view of the diffraction grating 64A, this is defined as the phase of the other area portion being shifted to a minus (−) side.

The definitions of the plus (+) phase and the minus (−) phase in an embodiment of the present invention are definitions for convenience of explanation of a phase difference state of the diffraction grating. The definitions of "vertically" and "side by side" in an embodiment of the present invention are also definitions for convenience of explanation of the diffraction grating.

In the plan view of the diffraction grating 64A, the periodic structure of the second area portion 22 adjacent to the right side of the first area portion 21 is a periodic structure having a phase shifted to the plus side relative to the periodic structure of the first area portion 21 (FIG. 8). The periodic structure of the second area portion 22 is a periodic structure having a phase difference of substantially +180 degrees relative to the periodic structure of the first area portion 21 (FIG. 7).

The optical pickup apparatus may be included and used in an optical disc apparatus for a desktop personal computer (PC), and may also be included and used in an optical disc apparatus for a notebook or laptop personal computer (PC).

The optical pickup apparatus (FIGS. 1 and 2) includes: the diffraction grating 64A (FIG. 7) in a rectangular shape in plan view; the objective lens 70 (FIGS. 1 and 2) that converges at least three light beams to be applied as the at least three separate irradiation spots 80, 81, and 82 to the signal surface portion Da (FIG. 4) of the medium D (FIGS. 1, 2, and 4); and the photodetector 73 (FIGS. 1, 2, 4, and 5) that receives the reflected light of the three irradiation spots 80, 81, and 82 (FIG. 4) from the medium D, for example.

If the optical pickup apparatus is configured as above, the tracking of the optical pickup apparatus is accurately performed for the signal surface portion Da of the medium D (FIG. 4). It becomes easier to prevent an amplitude of the tracking error signal from deteriorating and prevent an offset of the tracking error signal from remaining with displacement of the objective lens 70 (FIGS. 1 and 2), when data recording/reproduction is performed for a plurality of types of the media D having different track pitches Dtp.

Since the optical pickup apparatus including the phase-shifted two-divided diffraction grating 64A (FIGS. 3 and 7) is configured, the data reproduction operation or the data recording operation of the optical pickup apparatus is reliably performed for a DVD-RAM. The data reproduction operation or the data recording operation of the optical pickup apparatus is also reliably performed for a DVD±R and DVD±RW.

The photodetector 73 shown in FIGS. 1 and 2 is configured as the one photodetector 73 capable of receiving a plurality of types of laser wavelength light, for example, two types of laser wavelength light and three types of laser wavelength light.

If the one photodetector 73 capable of receiving a plurality of types of laser wavelength light is included in the optical pickup apparatus, the optical pickup apparatus capable of supporting various media D (FIGS. 1, 2, 4, and 5) is configured and is reduced in price, with reduction in the number of parts of the optical pickup apparatus. The photodetector 73 (FIGS. 1 and 2) is configured as such photodetector 73 as to support a plurality of types of wavelength light, which is capable of receiving two or more types of wavelength light, i.e., first wavelength light and second wavelength light that is a laser beam having a wavelength different from that of the first wavelength light and the wavelength shorter than the first laser wavelength light, and thus, the optical pickup apparatus may support various media D. Accordingly, since the photodetector capable of receiving the first wavelength light and the photodetector capable of receiving the second wavelength light are integrated into the one photodetector 73, the optical pickup apparatus may be reduced in the number of parts, miniaturized, and reduced in weight and thickness, etc. The optical pickup apparatus is reduced in price at a lower level with the reduction in the number of parts of the optical pickup apparatus. Thus, there may be provided the optical pickup apparatus that is able to support various media D and that is reduced in the number of parts, reduced in price, miniaturized, and reduced in weight and thickness.

The optical pickup apparatus includes the one light-emitting element 61 (FIGS. 1 and 2) capable of emitting a plurality of types of laser wavelength light such as two types of laser wavelength light and three types of laser wavelength light.

If the light-emitting element 61 capable of emitting a plurality of types of laser wavelength light is included in the optical pickup apparatus, the optical pickup apparatus capable of supporting various media D (FIGS. 1, 2, 4, and 5) is configured and it is reduced in price with the reduction in the number of parts of the optical pickup apparatus. The light-emitting element 61 (FIGS. 1 and 2) is configured as such light-emitting element 61 as to emit a plurality of types of wavelength light, which is capable of emitting two or more types of wavelength light, i.e., first wavelength light and second wavelength light that is a laser beam having a wavelength different from that of the first wavelength light and the wavelength shorter than the first laser wavelength light, and thus, the optical pickup apparatus may support various media D. Accordingly, since the light-emitting element capable of emitting the first wavelength light and the light-emitting element capable of emitting the second wavelength light are integrated into the one light-emitting element 61, the optical pickup apparatus may be reduced in the number of parts, miniaturized, and reduced in weight and thickness, etc. The optical pickup apparatus is reduced in price at a lower level with the reduction in the number of parts of the optical pickup apparatus. Thus, there may be provided the optical pickup apparatus may be provided that is able to support various media D and that is reduced in the number of parts, reduced in price, miniaturized, and reduced in weight and thickness.

Due to the reduction in the number of parts of the optical pickup apparatus, the performance/quality of the optical pickup apparatus is stabilized. For example, in a case where a first light-emitting element capable of emitting first wavelength light and second light-emitting element capable of emitting second wavelength light are individually provided in housings, etc., it is concerned that "variations" are generated in the light axis of the first wavelength light, the light axis of the second wavelength light, etc., due to mounting errors of the first light-emitting element and/or the second light-emitting element, for example. However, if the first light-emitting element capable of emitting the first wavelength light and the second light-emitting element capable of emitting the second wavelength light are integrated into one light-emitting element, there are reduced the "variations" in the light axes, etc., caused from the mounting errors, etc. Therefore, the performance/quality of the optical pickup apparatus is stabilized.

The first laser wavelength light is wavelength light compatible with the CD standard. The first laser wavelength light is an infrared laser beam compatible with the CD standard. To be more specific, the first laser wavelength light has a wavelength of substantially 765 to 830 nm corresponding to the CD-standard optical disc D and a reference wavelength of substantially 780 to 782 nm. For example, the first laser wavelength light is wavelength light having a reference wavelength within a range of substantially 765 to 830 nm. The first laser wavelength light emitted from the first light source 62 of the two-wavelength light-emitting element 61 may fluctuate due to the thermal storage temperature of the light-emitting element 61, for example.

The second laser wavelength light is wavelength light compatible with the DVD standard. The second laser wavelength light is a red laser beam compatible with the DVD standard. To be more specific, the second laser wavelength light has a wavelength of substantially 630 to 685 nm corresponding to the DVD-standard optical disc D and a reference wavelength of substantially 635 to 660 nm. For example, the second laser wavelength light is wavelength light having a reference wavelength within a range of substantially 630 to 685 nm. The second laser wavelength light emitted from the second light source 63 of the two-wavelength light-emitting element 61 may fluctuate due to the thermal storage temperature of the light-emitting element 61, for example.

If the diffraction grating 64A having the diffraction surface portion 20a (FIGS. 3, 6, and 7) only on one side thereof is used, it is substantially avoided that the unnecessary diffracted light is generated when the first laser wavelength light compatible with the CD standard having the wavelength of substantially 765 to 830 nm corresponding to the CD-standard optical disc D (FIGS. 1 and 2) and the reference wavelength of substantially 780 to 782 nm passes through the diffraction grating 64A.

If the diffraction grating 64A having the diffraction surface portion 20a (FIGS. 3, 6, and 7) only on one side thereof is used, it is substantially avoided that the unnecessary diffracted light is generated when the second laser wavelength light compatible with the DVD standard having the substantially 630 to 685 nm corresponding to the DVD-standard optical disc D (FIGS. 1 and 2) and the reference wavelength of substantially 635 to 660 nm passes through the diffraction grating 64A.

The first laser wavelength light, which is predetermined wavelength light compatible with the CD standard, passes through the diffraction surface portion 20a of the diffraction grating 64A (FIGS. 3, 6, and 7) based on the second laser wavelength light and corresponding to the second laser wavelength light compatible with the DVD standard, and thus, the two first sub-beams of the first laser wavelength light compatible with the CD standard, which are obtained by splitting substantially without the unnecessary diffracted light being generated, are reliably applied to the two first sub-light-receiving units 74b and 74c with the distance Ys(cd) between the center points changed relative to the one first main light-receiving unit 74a of the first light-receiving area 74 included in the photodetector 73 (FIG. 5). The first laser wavelength light, which is the predetermined wavelength light compatible with the CD standard, passes through the diffraction surface portion 20a of the diffraction grating 64A (FIGS. 3, 6, and 7) based on the second laser wavelength light and compatible with corresponding to the second laser wavelength light compatible with the DVD standard, and thus, the one first main beam of the first laser wavelength light compatible with the CD standard, which is obtained by splitting substantially without the unnecessary diffracted light being generated, is reliably applied to the one first main light-receiving unit 74a of the first light-receiving area 74 included in the photodetector 73 (FIG. 5).

When the second laser wavelength light, which is predetermined wavelength light compatible with the DVD standard passes through the diffraction surface portion 20a of the diffraction grating 64A (FIGS. 3, 6, and 7) based on the second laser wavelength light and corresponding to the second laser wavelength light conforming to the DVD standard, the second laser wavelength light, which is the predetermined wavelength light conforming to the DVD standard, is split into at least one second main beam and two second sub-beams substantially without the unnecessary diffracted light being generated. The two second sub-beams of the second laser wavelength light compatible with the DVD standard are reliably applied to the two second sub-light-receiving units 75b and 75c of the second light-receiving area 75 having the same specifications as the existing one included in the photodetector 73 (FIG. 5), and the one second main beam of the second laser wavelength light compatible with the DVD standard is reliably applied to the one second main light-receiving unit 75a of the second light-receiving area 75 having the same specification as the existing one included in the photodetector 73.

For example, the first laser wavelength light may be the wavelength light compatible with the "DVD" standard depending on the design/specification, etc., of the optical pickup apparatus. For example, the first laser wavelength light may be a red laser beam compatible with the "DVD" standard. To be more specific, the first laser wavelength light has a wavelength of substantially 630 to 685 nm corresponding to the DVD-standard optical disc (D), and the reference wavelength of substantially 635 to 660 nm. For example, the first laser wavelength light is the wavelength light having the reference wavelength within a range of substantially 630 to 685 nm. The first laser wavelength light emitted from the first light source (62) of the two-wavelength light-emitting element (61) may fluctuate due to the thermal storage temperature of the light-emitting element (61), for example.

For example, the second laser wavelength light may be wavelength light compatible with the "Blu-ray Disc" standard or the "HD DVD" standard depending on the design/specification, etc., of the optical pickup apparatus. For example, the second laser wavelength light may be a blue-violet laser beam compatible with the "Blu-ray Disc" standard or the "HD DVD" standard. To be more specific, the second laser wavelength light has a wavelength of substantially 340 to 450 nm corresponding to the optical disc (D) of the "Blu-ray Disc" standard or "HD DVD" standard and a reference wavelength of substantially 405 nm. For example, the second laser wavelength light is wavelength light having a reference wavelength within a range of substantially 340 to 450 nm. The second laser wavelength light emitted from the second light source (63) of the two-wavelength light-emitting element (61) may fluctuate due to the thermal storage temperature of the light-emitting element (61), for example.

If the diffraction grating (64A) having the diffraction surface portion (20a) (FIGS. 3, 6, and 7) only on one side thereof is used, it is substantially avoided that the unnecessary diffracted light is generated when the first laser wavelength light, which is wavelength light having the wavelength of substantially 630 to 685 nm corresponding to the "DVD" standard optical disc (D) (FIGS. 1 and 2) and the reference wavelength of substantially 635 to 660 nm, passes through the diffraction grating (64A).

If the diffraction grating (64A) having the diffraction surface portion (20a) (FIGS. 3, 6, and 7) only on one side thereof is used, it is substantially avoided that the unnecessary diffracted light is generated when the second laser wavelength light compatible with the "Blu-ray Disc" standard or "HD DVD" standard, which has the wavelength of substantially 340 to 450 nm corresponding to the optical disc (D) of the "Blu-ray Disc" standard or "HD DVD" standard (FIGS. 1 and 2) and the reference wavelength of substantially 405 nm, passes through the diffraction grating (64A).

The first laser wavelength light, which is the predetermined wavelength light compatible with the "DVD" standard, passes through the diffraction surface portion 20a of the diffraction grating 64A (FIGS. 3, 6, and 7) based on the second laser wavelength light and corresponding to the second laser wavelength light compatible with the "Blu-ray Disc" standard or "HD DVD" standard, and thus, the two first sub-beams of the first laser wavelength light compatible with the "DVD" standard, which are obtained by splitting substantially without the unnecessary diffracted light being generated, are reliably applied to the two first sub-light-receiving units (74b and 74c) with the distance (Ys(cd)) between the center points changed relative to the one first main light-receiving unit (74a) of the first light-receiving area (74) included in the photodetector (73) (FIG. 5). The first laser wavelength light, which is predetermined wavelength light compatible with the "DVD" standard, passes through the diffraction surface portion (20a) of the diffraction grating (64A) (FIGS. 3, 6, and 7), based on the second laser wavelength light and corresponding to the second laser wavelength light compatible with the "Blu-ray Disc" standard or "HD DVD" standard, and thus, the one first main beam of the first laser wavelength light compatible with the "DVD" standard is which are obtained by splitting substantially without the unnecessary diffracted light being generated, is reliably applied to the one first main light-receiving unit (74a) of the first light-receiving area (74) included in the photodetector (73) (FIG. 5).

When the second laser wavelength light, which is predetermined wavelength light compatible with the "Blu-ray Disc" standard or "HD DVD" standard, passes through the diffraction surface portion (20a) of the diffraction grating (64A) (FIGS. 3, 6, and 7) based on the second laser wavelength light and corresponding to the second laser wavelength light compatible with the "Blu-ray Disc" standard or "HD DVD" standard, the second laser wavelength light, which is the predetermined wavelength light compatible with the "Blu-ray Disc" standard or "HD DVD" standard, is split into at least one second main beam and two second sub-beams substantially without the unnecessary diffracted light being generated. The two second sub-beams of the second laser wavelength light compatible with the "Blu-ray Disc" standard or "HD DVD" standard are reliably applied to the two second sub-light-receiving units (75b and 75c) of the second light-receiving area (75) having the same specifications as the existing one included in the photodetector (73) (FIG. 5); and the one second main beam of the second laser wavelength light compatible with the "Blu-ray Disc" standard or "HD DVD" standard is reliably applied to the one second main light-receiving unit (75a) of the second light-receiving area (75) having the same specification as the existing one included in the photodetector (73).

The optical pickup apparatus shown in FIGS. 1, 2, etc., is capable of supporting the medium D having a plurality of the signal surface portions Da such as the first layer DL0 (FIG. 5) and the second layer DL1.

The above optical pickup apparatus is configured, to preferably perform an operation of reading signals and information by the optical pickup apparatus from the medium D having a plurality of the signal surface portions Da such as the first layer DL0 (FIG. 5) and the second layer DL1, and/or an operation of writing signals and information by the optical pickup apparatus to the medium D having a plurality of the signal surface portions Da such as the first layer DL0 and the second layer DL1. The optical pickup apparatus (FIGS. 1 and 2) is configured in which the generation of the unnecessary light by the diffraction grating 64A (FIGS. 1 to 3, 6, and 7) is suppressed, and thus, it is avoided that a problem caused by the generation of the unnecessary light occurs, for example, when an operation is performed of reading data, signals, information, etc., from the medium D having a plurality of the signal surface portions Da or writing data, signals, information, etc., to the medium D having a plurality of the signal surface portions Da, with the optical pickup apparatus.

For example, it is avoided that when the reproduction of signals or the recoding of signals is performed for the first layer DL0 of the DVD-standard medium D having a plurality of the layers DL0, DL1, i.e., the first layer DL0 (FIG. 5) and the second layer DL1, the unnecessary light by the diffraction grating 64A (FIGS. 1 to 3, 6, and 7) is applied to the second layer DL1 of the DVD-standard medium D, as a result the unnecessary reflected light of the second layer DL1 of the DVD-standard medium D enters as noise into one or both of the one second sub-light-receiving unit 75b and the other second sub-light-receiving unit 75c of the DVD light-receiving area 75 in the photodetector 73, and consequently so-called inter-layer cross talk occurs in the photodetector 73.

For example, it is avoided that when the reproduction of signals or the recoding of signals is performed for the first layer (DL0) of the "Blu-ray Disc" standard or "HD DVD" standard medium (D) having a plurality of the layers (DL0), (DL1), i.e., the first layer (DL0) (FIG. 5) and the second layer (DL1), the unnecessary light by the diffraction grating (64A) (FIGS. 1 to 3, 6, and 7) is applied to the second layer (DL1) of the "Blu-ray Disc" standard or "HD DVD" standard medium (D), as a result the unnecessary reflected light of the second layer (DL1) of the "Blu-ray Disc" standard or "HD DVD" standard medium D enters as noise into one or both of the one second sub-light-receiving unit (75b) and the other second sub-light-receiving unit (75c) of the DVD light-receiving area 75 in the photodetector (73), and consequently so-called inter-layer cross talk occurs in the photodetector 73.

Second Embodiment

Figure 9:
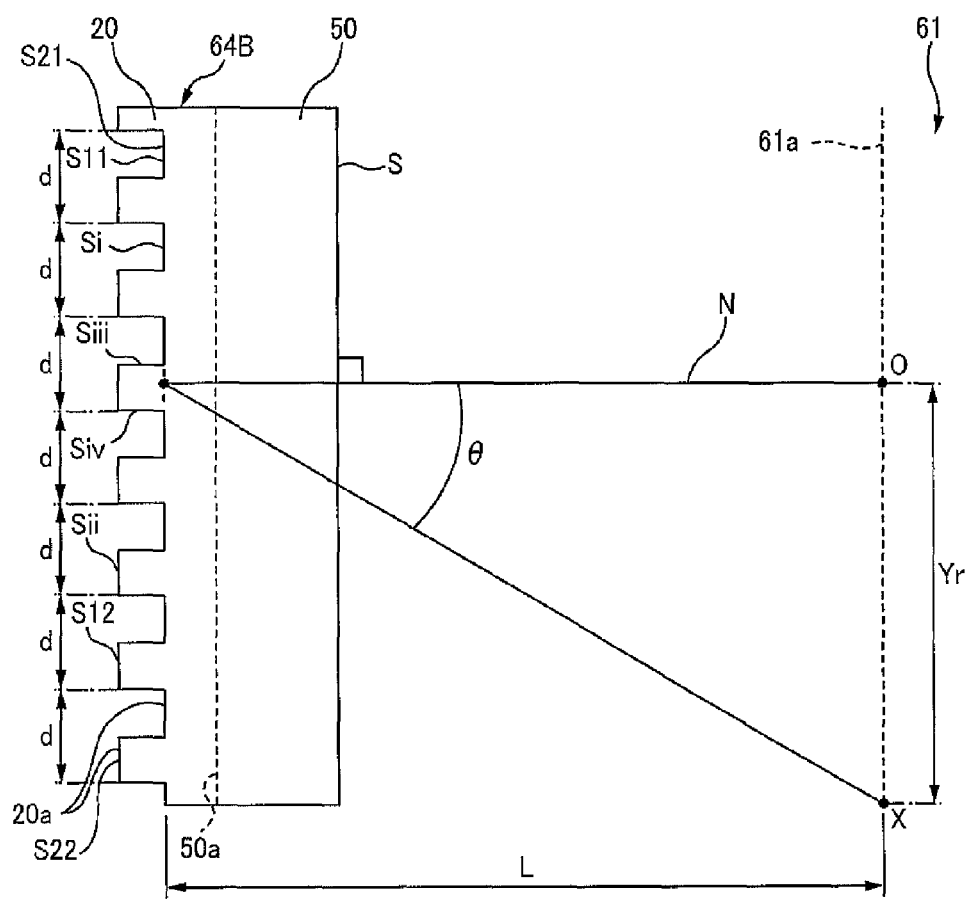
FIG. 9 is a schematic diagram of a second embodiment of a diffraction grating included in an optical pickup apparatus.

FIG. 9 is a schematic diagram of a second embodiment of a diffraction grating included in an optical pickup apparatus.

Instead of the diffraction grating 64A shown in FIGS. 1, 2, and 6, the diffraction grating 64B shown in the right side of FIG. 3 and FIG. 9 is include in the optical pickup apparatus (FIGS. 1 and 2). The optical pickup apparatus and an optical disc apparatus are not changed except that the diffraction grating 64A shown in FIGS. 1, 2, and 6 is replaced with the diffraction grating 64B shown in the right side of FIG. 3 and FIG. 9. Although a first embodiment and a second embodiment are different in that the diffraction grating 64A shown in FIGS. 1, 2, and 6 is replaced with the diffraction grating 64B shown in the right side of FIG. 3 and FIG. 9, portions other than the diffraction gratings 64A and 64B are common to a first embodiment and a second embodiment. A second embodiment will also be described with reference to FIGS. 1 to 8 for convenience. In a second embodiment, those described in a first embodiment are given the same reference numerals and will not be described.

As shown in FIG. 3, the diffraction grating 64B is configured by fixing to one plane surface portion 50a of an optical glass plate 50 the DVD diffraction grating member 20 including a periodic structure of the grating grooves formed on the one half plane surface 21 having a phase displaced by about 180 degrees relative to a phase of a periodic structure of the grating grooves formed on the other half plane surface 22. Since the optical glass plate 50 is equipped, the diffraction grating 64B has mechanical strength higher than that of the diffraction grating 64A (the left side of FIG. 3, FIG. 6).

First, a diffraction angle θ is obtained from an approximate expression on the basis of the Bragg's condition, which is expressed by the above equation (1), based on a wavelength λ of the first or second laser beam emitted from the first or second light source 62, 63 of the laser unit 61 and a grating spacing d of one period from a concave portion S11 to a convex portion S12 or from the convex portion S12 to the concave portion S11 continuous in the diffraction grating 64B (see FIG. 9). The explanatory diagram of FIG. 9 is a diagram drawn for convenience to facilitate description, and in reality a pair or so of virtual light-emitting points X is set substantially symmetrically relative to the normal line N as a center axis.

Next, a second light-emitting point X indicative of the apparent position of the first or second light source 62, 63 with respect to the sub-beams on the light-emitting surface 61a of the laser unit 61 may be set based on: a normal line distance L from a first light-emitting point O indicative of the actual position of the first light source 62 or second light source 63 included in the light-emitting surface 61a of the laser unit 61 to the bottom surface Si making up the concave surface S21 or the external surface Sii making up the convex surface S22 on the backside of the substantially smooth surface S of the diffraction grating 64B; and the diffraction angle θ obtained by the above equation (1). The light-emitting surface 61a of the laser unit 61 is perpendicular to the normal line N of the substantially smooth surface S of the diffraction grating 64B, and is a plane surface located away, by about the normal line distance L, from the bottom surface Si making up the concave surface S21 or the external surface Sii making up the convex surface S22 on the backside of the surface S. A distance Yr from the first light-emitting point O to the second light-emitting point X on the light-emitting surface 61a of the laser unit 61 may be obtained from the above equation (2) (see FIG. 9).

The above equation (5) is obtained based on the above equations (1) and (2). The light-receiving interval Ys(dvd) in the DVD light-receiving area 75 of the photodetector 73 is obtained from the above equations (6), (7), and (8). The light-receiving interval Ys(cd) in the CD light-receiving area 74 of the photodetector 73 is obtained from the above equations (9), (10), and (11).

Third Embodiment

Figure 10:
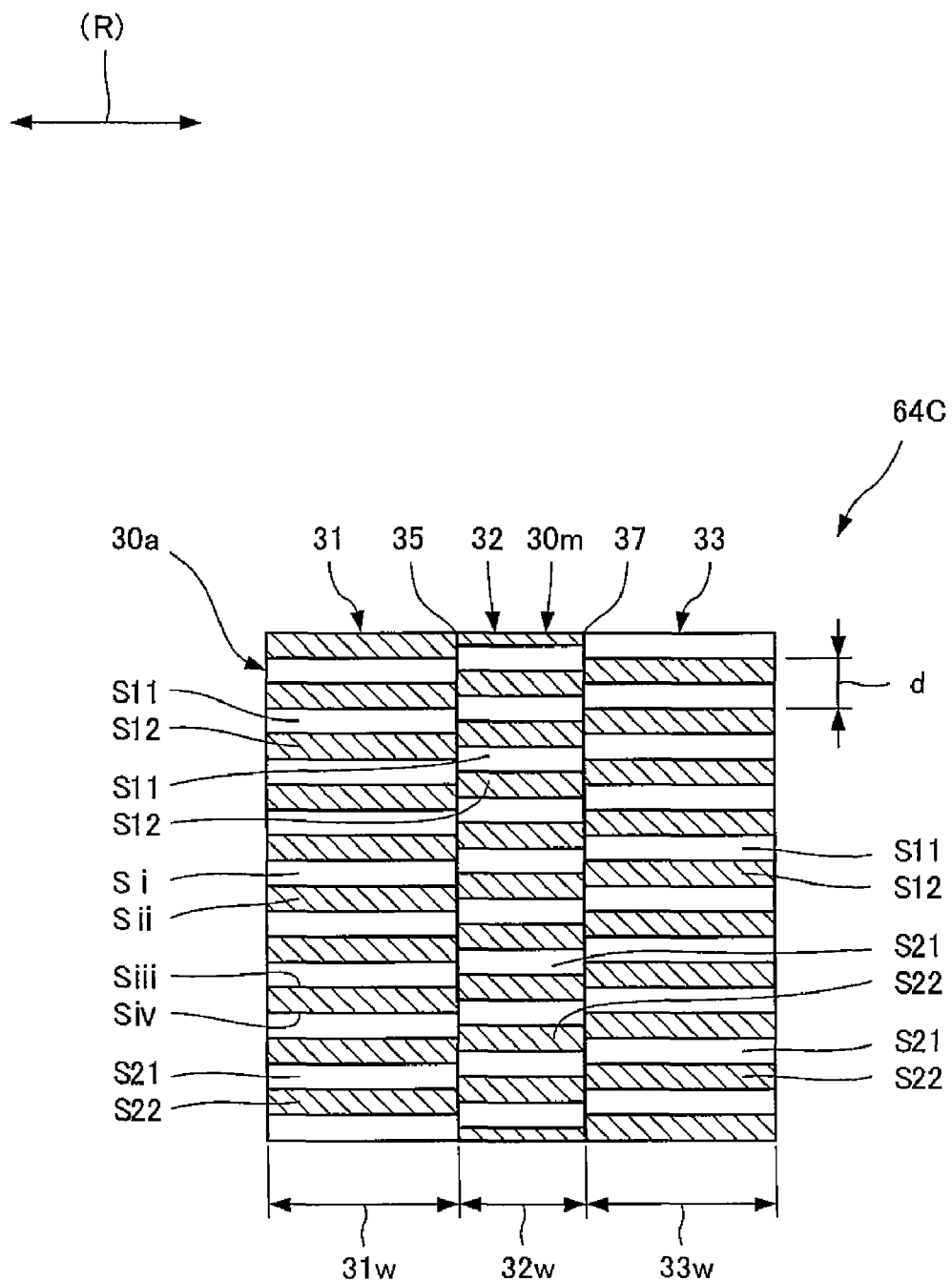
FIG. 10 is a schematic plan view of a third embodiment of a diffraction grating included in an the optical pickup apparatus.
Figure 11:
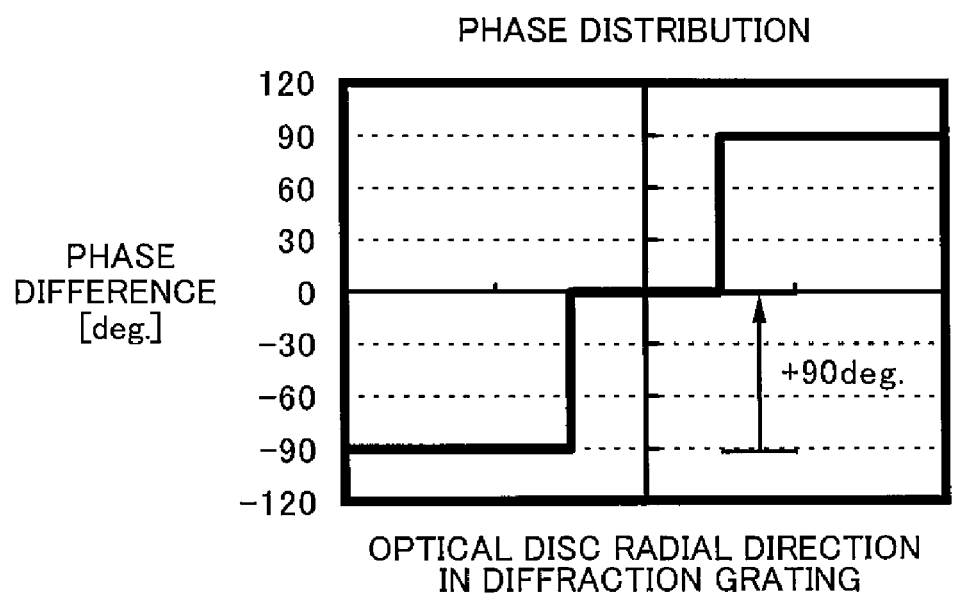
FIG. 11 is a diagram of a relationship between an optical disc radial direction and a phase difference in a diffraction grating of FIG. 10.

FIG. 10 is a schematic plan view of a third embodiment of a diffraction grating included in an optical pickup apparatus, and FIG. 11 is a diagram of a relationship between an optical disc radial direction and a phase difference in the diffraction grating of FIG. 10.

Instead of the diffraction grating 64A shown in FIGS. 1, 2, and 6, a diffraction grating 64C shown in FIG. 10 is included in the optical pickup apparatus (FIGS. 1 and 2). The optical pickup apparatus and an optical disc apparatus are not changed except that the diffraction grating 64A shown in FIGS. 1, 2, and 6 is replaced with the diffraction grating 64C shown in FIG. 10. Although a first embodiment and a third embodiment are different in that the diffraction grating 64A shown in FIGS. 1, 2, and 6 is replaced with the diffraction grating 64C shown in FIG. 10, portions other than the diffraction gratings 64A and 64C are common to a first embodiment and a third embodiment. A third embodiment will also be described with reference to FIGS. 1 to 6 and 14 to 16 for convenience. In a third embodiment, those described in a first embodiment are given the same reference numerals and will not be described.

Figure 14:
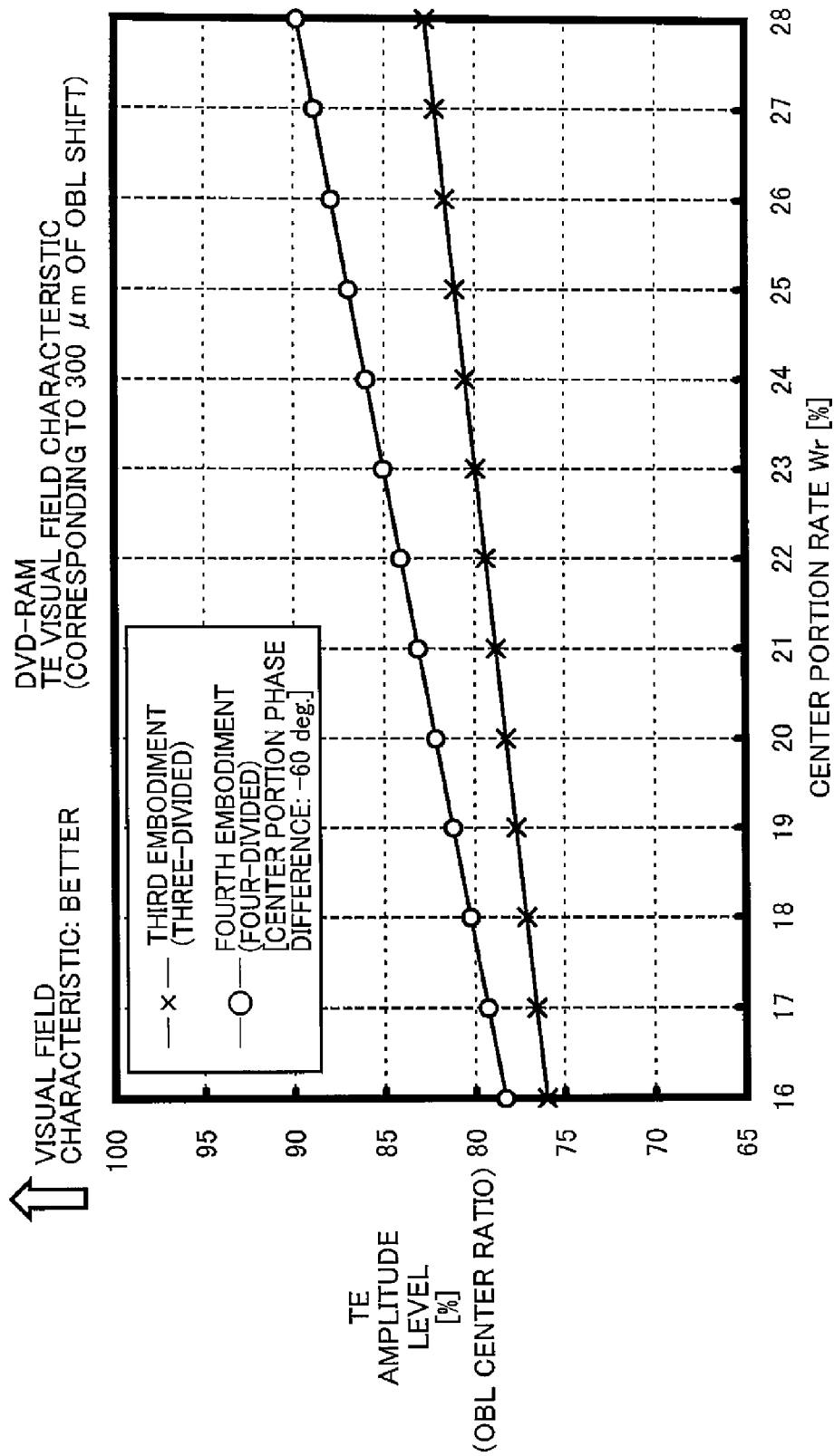
FIG. 14 is an explanatory diagram of the visual field characteristics of an optical pickup apparatus.
Figure 15:
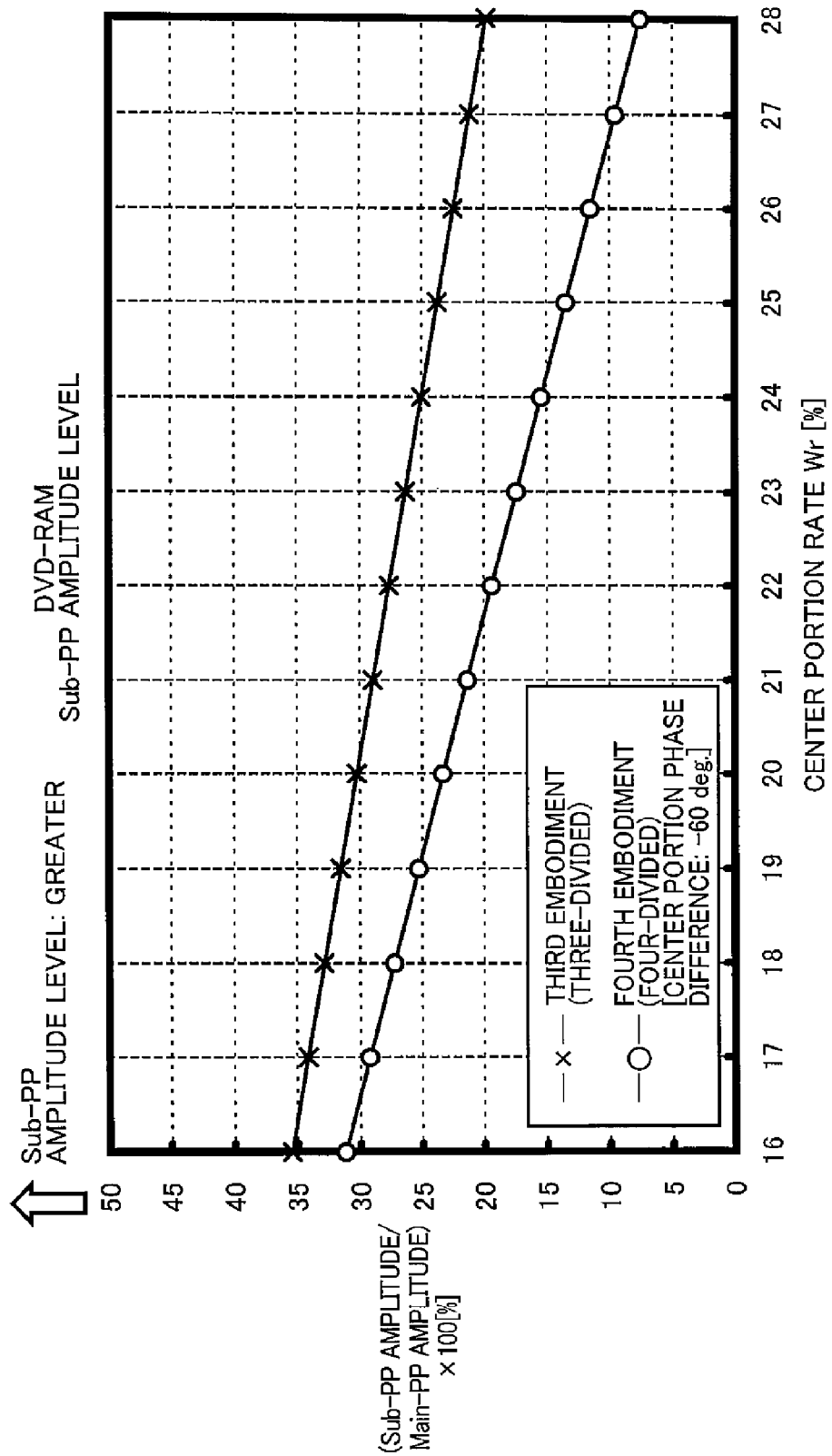
FIG. 15 is an explanatory diagram of sub-push-pull signal amplitude level characteristics of an optical pickup apparatus.
Figure 16:
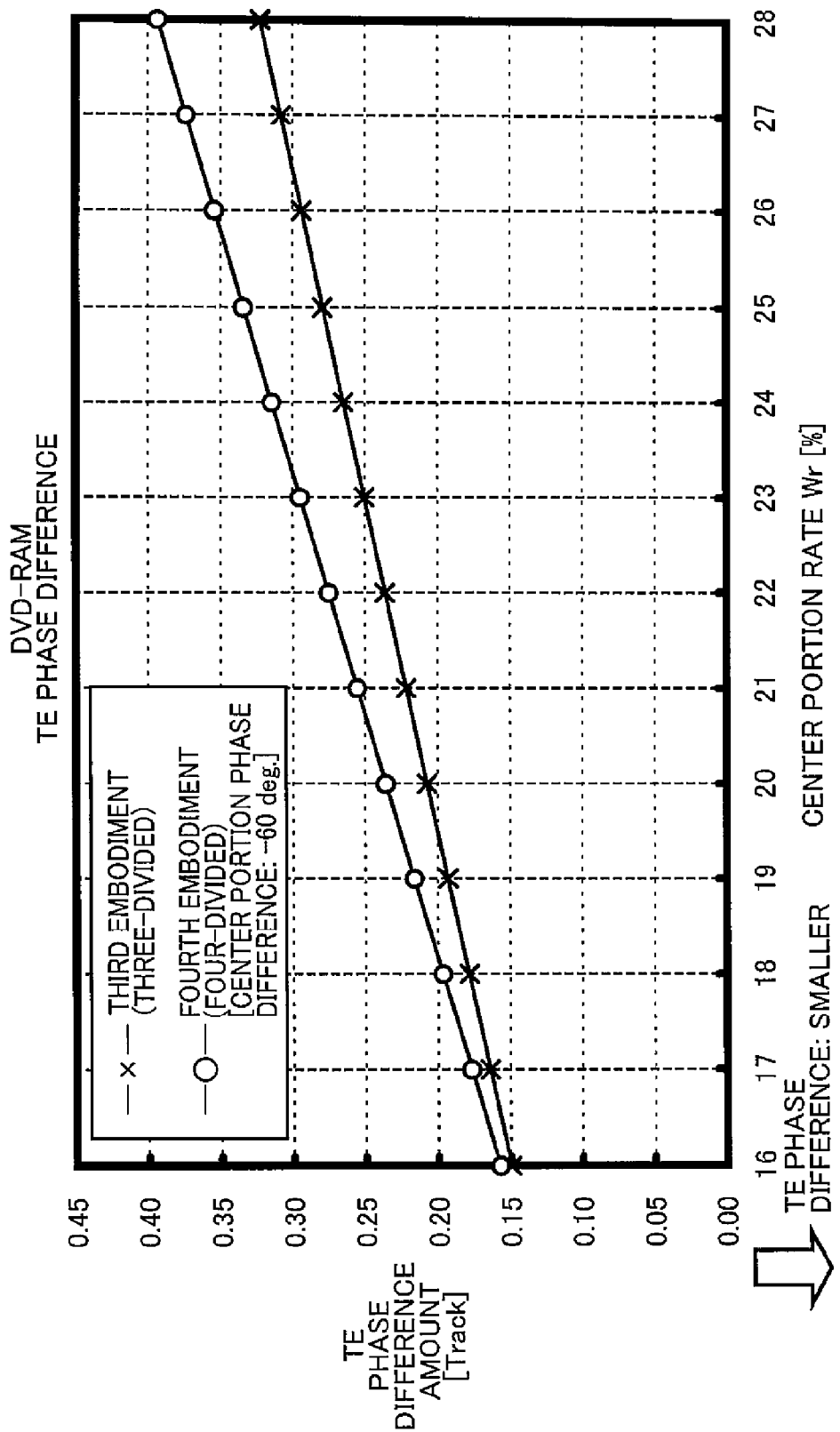
FIG. 16 is an explanatory diagram of tracking error phase difference characteristics of an optical pickup apparatus.
Figure 17:
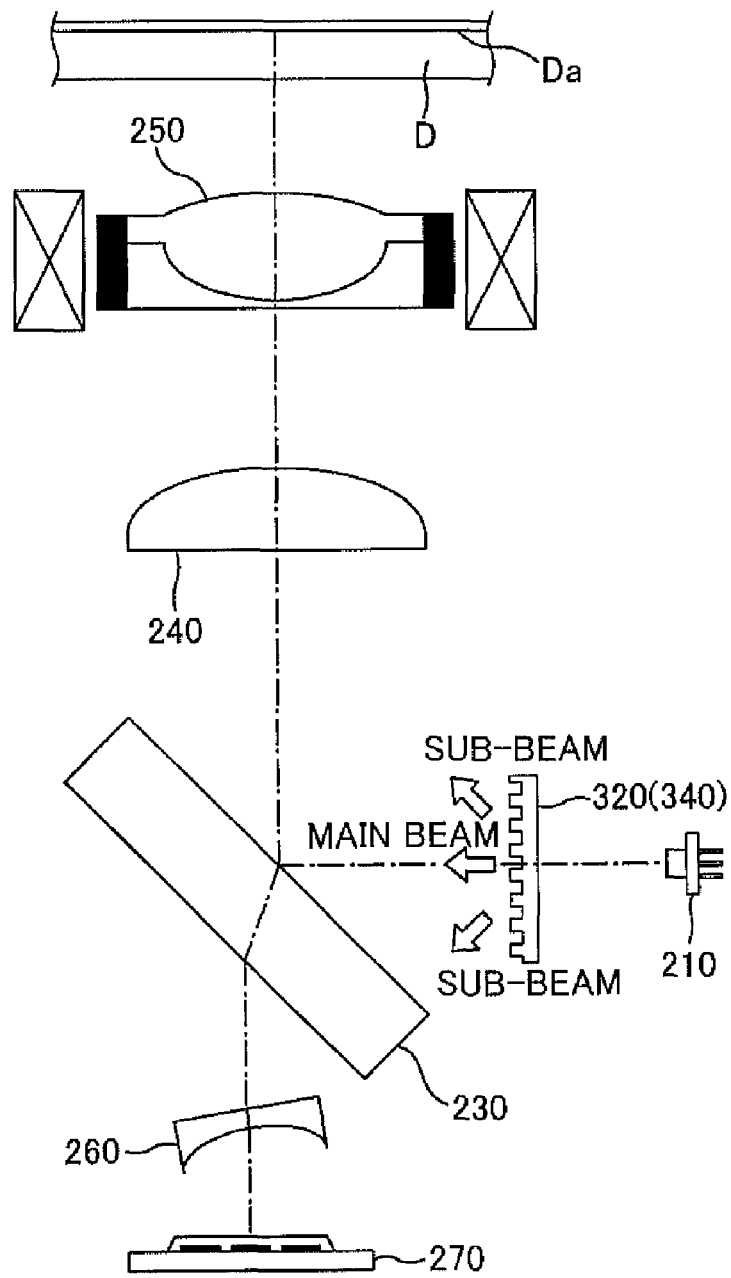
FIG. 17 is a diagram of an optical system of an optical pickup apparatus.

FIG. 14 is an explanatory diagram of the visual field characteristics of the optical pickup apparatus; FIG. 15 is an explanatory diagram of sub-push-pull signal amplitude level characteristics of the optical pickup apparatus; and FIG. 16 is an explanatory diagram of tracking error phase difference characteristics of the optical pickup apparatus.

A diffraction surface portion 30a of the diffraction grating 64C (FIG. 10) is formed as the one surface portion 30a supporting diffraction of a plurality of types of laser wavelength light, to be used both as the diffraction surface portion 30a for splitting the first laser wavelength light into at least one first main beam and two first sub-beams and as the diffraction surface portion 30a for splitting the second laser wavelength light into at least one second main beam and two second sub-beams.

If the diffraction surface portion 30a of the diffraction grating 64C is formed as above, such an optical pickup apparatus is configured that generation of unnecessary diffracted light may be suppressed in the diffraction grating 64C, reduction in efficiency of a laser beam is prevented, and a price may be further reduced.

For example, when the first laser wavelength light passes through the first diffraction surface portion 302 of the diffraction grating 300A or 300B including the two diffraction surface portions 302 and 304, which are the first diffraction surface portion 302 (FIGS. 20 and 21) corresponding to the first laser wavelength light and the second diffraction surface portion 304 corresponding to the second laser wavelength light, and the first laser wavelength light is split into at least one first main beam and two first sub-beams, it is concerned that the second diffraction surface portion 304 of the diffraction grating 300A or 300B further unnecessarily diffracts the first main beam of the first laser wavelength light and further unnecessarily diffracts the first sub-beams, and that the optical efficiency is accordingly reduced in the first main beam and the first sub-beams of the first laser wavelength light.

For example, when the second laser wavelength light passes through the second diffraction surface portion 304 of the diffraction grating 300A or 300B including the two diffraction surface portions 302 and 304, which are the first diffraction surface portion 302 corresponding to the first laser wavelength light and the second diffraction surface portion 304 corresponding to the second laser wavelength light, and the second laser wavelength light is split into at least one second main beam and two second sub-beams, it is concerned that the first diffraction surface portion 302 of the diffraction grating 300A or 300B unnecessarily diffracts the second laser wavelength light, and that the optical efficiency is accordingly reduced in the second laser wavelength light.

However, if the diffraction surface portion 30a of the diffraction grating 64C (FIG. 10) is formed as the one surface portion 30a supporting the diffraction of a plurality of types of laser wavelength light, to be used both as the diffraction surface portion 30a for splitting the first laser wavelength light into at least one first main beam and two first sub-beams and as the diffraction surface portion 30a for splitting the second laser wavelength light into at least one second main beam and two second sub-beams; reduction in optical efficiency is prevented in the first main beam and the first sub-beams of the first laser wavelength light which is caused by the unnecessary diffraction of the first main beam and the first sub-beams of the first laser wavelength light, and reduction in optical efficiency is prevented in the second laser wavelength light which is caused by the unnecessary diffraction of the second laser wavelength light.

The diffraction surface portion 30a of the diffraction grating 64C is formed as the one surface portion 30a supporting the diffraction of a plurality of types of laser wavelength light, to be used both as the diffraction surface portion 30a for splitting the first laser wavelength light into at least one first main beam and two first sub-beams and as the diffraction surface portion 30a for splitting the second laser wavelength light into at least one second main beam and two second sub-beams, and therefore, the diffraction grating 64C is configured, in which portions to be processed, man-hours, etc., are reduced. Since the portions to be processed, man-hour, etc., of the diffraction grating 64C are reduced, the price of the diffraction grating 64C may be reduced. Therefore, the optical pickup apparatus may be configured that can be reduced in price.

As in FIG. 10, the diffraction grating 64C is provided with phase shift area portions 31, 33 (FIG. 10) that generate a pi radian phase shift in a portion of the laser beam emitted from the laser unit 61 (FIGS. 1 and 2). The diffraction grating 64C is divided into at least the three area portions 31, 32, and 33, which are the substantially rectangular first area portion 31, the substantially linear second area portion 32 adjacent to the first area portion 31, and the substantially rectangular third area portion 33 adjacent to the second area portion 32. The diffraction grating 64C is divided into a plurality of the area portions 31, 32, and 33. A predetermined periodic structure is made up in each of the area portions 31, 32, and 33.

In the diffraction grating 64C shown in FIG. 10, the second area portion 32 is drawn with a certain amount of width to facilitate the understanding of a phase state of the second area portion 32 for convenience. In reality, the second area portion 32 of the diffraction grating 64C has a narrow linear shape with a width 32w of the order of 20 to 200 μm, for example. Each of the area portions 31, 32, and 33 making up the diffraction grating 64C has a repetitive periodic structure in a minute convex-concave shape. The diffraction grating 64C is a glass plate whose dimensions are substantially 3 to 10 mm in height and width and substantially 0.3 to 3 mm in thickness, for example. In a perspective view of the diffraction grating 64C of FIG. 10, the diffraction grating 64C is viewed as in a case with the diffraction grating 64A shown in FIG. 1, for example.

If the diffraction grating 64C divided into a plurality of the area portions 31, 32, and 33 (FIG. 10) is configured, detection of the error signals for the signal surface portion Da of the medium D (FIGS. 4 and 5) is more easily performed in a favorable manner by the optical pickup apparatus. For example, the tracking by the optical pickup apparatus is more easily performed for the signal surface portion Da of the medium D in a favorable manner. Since the diffraction grating 64C (FIG. 10) is configured to be divided into a plurality of the area portions 31, 32, and 33, at least three separate irradiation spots 80, 81, and 82 are applied to the signal surface portion Da of the medium D (FIG. 4). Since the at least three irradiation spots 80, 81, and 82 are separately applied to the signal surface portion Da of the medium D, it becomes easier to prevent detection accuracy of the error signals such as the tracking error signal from deteriorating when recording/reproduction is performed for two or more types of the media D having different track pitches Dtp. Therefore, the optical pickup apparatus may be provided in which the tracking control is more easily performed.

As in FIG. 10, the diffraction grating 64C is divided into the three area portions 31, 32, and 33, which are the first area portion 31, the second area portion 32 that is adjacent to the first area portion 31 and that has a periodic structure different from a periodic structure of the first area portion 31, and the third area portion 33 that is adjacent to the second area portion 32 and that has a periodic structure different from the periodic structure of the second area portion 32. The diffraction grating 64C is configured as a so-called three-divided in-line grating.

If the diffraction grating 64C divided into a plurality of the area portions 31, 32, and 33 shown in FIG. 10 is mounted on the optical pickup apparatus, the detection of the error signals is favorably performed for the signal surface portion Da of the medium D (FIGS. 2, 4, and 5) in the optical pickup apparatus. For example, the tracking in the optical pickup apparatus is favorably performed for the signal surface portion Da of the medium D. Since the diffraction grating 64C (FIG. 10) is configured to be divided into the three area portions 31, 32, and 33, the at least three separate irradiation spots 80, 81, and 82 are applied to the signal surface portion Da of the medium D (FIG. 4). The at least three irradiation spots 80, 81, and 82 are separately applied to the signal surface portion Da of the medium D, and therefore, when data recording is performed for two or more types of the media D having different track pitches Dtp or when data reproduction is performed for two or more types of the media D having different track pitches Dtp, it is avoided that the detection accuracy of the error signals such as the tracking error signal deteriorates with displacement of the objective lens 70 (FIGS. 1 and 2), for example. Therefore, the optical pickup apparatus may be provided that can easily perform the tracking control.

As in FIG. 10, the diffraction grating 64C includes the one substantially rectangular area portion 31, which is the first area portion 31, and the other substantially rectangular area portion 32, which is the third area portion 32. In the diffraction grating 64C, a width 31w of the first area portion 31 is substantially equal to a width 33w of the third area portion 33. The diffraction grating 64C is divided into the one area portion 31 making up the diffraction grating 64C and the other area portion 32 making up the diffraction grating 64C by the second area portion 32 of the diffraction grating 64C. The diffraction grating 64C is divided into odd-numbered parts.

The substantially linear second area portion 32 making up the diffraction grating 64C is located between the substantially strip-shaped first area portion 31 and the substantially strip-shaped third area portion 33 making up the diffraction grating 64C. The periodic structure of the second area portion 32 is a periodic structure having a phase difference relative to that of the periodic structure of the first area portion 31. The periodic structure of the third area portion 33 is a periodic structure having a phase difference relative to that of the periodic structure of the second area portion 32. The periodic structure of the third area portion 33 is a periodic structure having a phase difference of substantially 180 degrees relative to the periodic structure of the first area portion 31.

Therefore, the first area portion 31, the second area portion 32, and the third area portion 33 are differentiated in the diffraction grating 64C, and a phase difference is made clear between the first area portion 31 and the third area portion 33 in the diffraction grating 64C. Since the periodic structure of the third area portion 33 of the diffraction grating 64C is a periodic structure having a phase difference of substantially 180 degrees relative to the periodic structure of the first area portion 31 in the diffraction grating 64C, the at least three irradiation spots 80, 81, and 82 are formed in a favorable manner on the signal surface portion Da of the medium D (FIG. 4). Due to the at least three irradiation spots 80, 81, and 82 formed in a favorable manner on the signal surface portion Da of the medium D, it becomes easier to prevent the tracking error signal from deteriorating, for example, with displacement of the objective lens 70 (FIGS. 1 and 2), when data recording/reproduction is performed for a plurality of types of the media D having different track pitches Dtp.

The first area portion 31 and the second area portion 32 are divided by the boundary line portion 35 for dividing into the first area portion 31 (FIG. 10) and the second area portion 32. The second area portion 32 and the third area portion 33 are divided by the boundary line portion 37 for dividing into the second area portion 32 and the third area portion 33.

Since the diffraction grating 64C is divided into three area portions and differentiated, the at least three separate irradiation spots 80, 81, and 82 are applied to the signal surface portion Da of the medium D (FIG. 4). The at least three irradiation spots 80, 81, and 82 are separately applied to the signal surface portion Da of the medium D, so that it becomes more easier to perform the tracking of the optical pickup apparatus for the signal surface portion Da of the medium D.

The diffraction grating 64C (FIG. 10) is formed in a substantially rectangular plate shape. The diffraction grating 64C is visually recognized as a substantially rectangular plate-shaped object in plan view of the diffraction grating 64C.

In a state where the vertically long substantially rectangular first area portion 31, the vertically long substantially rectangular second area portion 32, and the vertically long substantially rectangular third area portion 33 are arranged side by side, when a phase of the other area portion adjacent to the right side of one area portion is shifted relative to a phase of the one area portion of the diffraction grating 64C to form a substantially upward step-like shape in the plan view of the diffraction grating 64C, this is defined as the phase of the other area portion being shifted to a plus (+) side.

In a state where the vertically long substantially rectangular first area portion 31, the vertically long substantially rectangular second area portion 32, and the vertically long substantially rectangular third area portion 33 are arranged side by side, when the phase of the other area portion adjacent to the right side of the one area portion is shifted relative to the phase of the one area portion of the diffraction grating 64C to form a substantially downward step-like shape in the plan view of the diffraction grating 64C, this is defined as the phase of the other area portion being shifted to a minus (−) side.

In the plan view of the diffraction grating 64C, the periodic structure of the second area portion 32 adjacent to the right side of the first area portion 31 is a periodic structure having a phase shifted to the plus side relative to the periodic structure of the first area portion 31. In the plan view of the diffraction grating 64C, the periodic structure of the third area portion 33 adjacent to the right side of the second area portion 32 is a periodic structure having a phase shifted to the plus side relative to the periodic structure of the second area portion 32.

The diffraction grating 64C is configured by sequentially stepwise shifting the phases of the periodic structures of the area portions 31, 32, and 33 (FIG. 11). The diffraction grating 64C (FIG. 10) is the diffraction grating 64C including a so-called regular phase periodic structure.

Depending on the design/specification, etc., of the optical pickup apparatus, for example, the diffraction grating 64C shown in FIG. 10 may be a diffraction grating (64C) in which only contour lines are mirror reversed and reference numerals, lead lines, dimension lines, etc., remain substantially the same. To be more specific about such a case, for example, in the plan view of the diffraction grating (64C), the periodic structure of the second area portion (32) adjacent to the right side of the first area portion (31) may be a periodic structure having a phase shifted to the minus side relative to the periodic structure of the first area portion (31). For example, in the plan view of the diffraction grating (64C), the periodic structure of the third area portion (33) adjacent to the right side of the second area portion (32) may be a periodic structure having a phase shifted to the minus side relative to the periodic structure of the second area portion (32).

Parentheses ( ) added to reference numerals in an embodiment of the present invention are used for describing things slightly different from those shown in the drawings for convenience.

The diffraction grating (64C) is configured by sequentially stepwise shifting the phases of the periodic structures of the area portions (31, 32, and 33). The diffraction grating (64C) is the diffraction grating (64C) including a so-called regular phase periodic structure.

If the optical pickup apparatus is provided with the diffraction grating including the regular phase periodic structure, a sub-push-pull signal amplitude level (Sub-PP amplitude level) is increased and the sub-push-pull signal amplitude level characteristic (Sub-PP amplitude level characteristic) is more easily improved (FIG. 15). It is avoided that the Sub-PP amplitude level (%) is reduced and the Sub-PP amplitude level characteristic deteriorates.

The at least three irradiation spots 80, 81, and 82 applied to the signal surface portion Da (FIG. 4) of the medium D (FIGS. 1, 2, and 4) include the main spot 80 and a pair of the sub-spots 81 and 82 between which the main spot 80 is located. The Sub-PP amplitude level, which is a signal amplitude level in relation to the main spot 80 and the sub-spots 81 and 82, is determined based on the following equation (20).

$$\text{The Sub-PP amplitude level (\%)} = (\text{sub-push-pull signal amplitude value/main push-pull signal amplitude value}) \times 100 \quad (20)$$

The tracking error phase difference amount (TE phase difference amount) is reduced and the tracking error phase difference characteristic (TE phase difference characteristic)

is more easily improved (FIG. 16). It is avoided that the TE phase difference amount is increased and the TE phase difference characteristic is deteriorates.

Since the Sub-PP amplitude level characteristic is improved and the TE phase difference characteristic is improved, the optical pickup apparatus may be included to be used in an optical disc apparatus for a desktop PC and may also be included to be used inn an optical disc apparatus for a notebook or laptop PC. For example, since the optical pickup apparatus used in the optical disc apparatus for the desktop PC is able to use an objective lens of a greater size, the Sub-PP amplitude level characteristic and the TE phase difference characteristic may be considered more important in terms of design than the visual field characteristic, while consideration is given to the visual field characteristic.

Since deterioration of the tracking error visual field characteristic (TE visual field characteristic) is suppressed, the optical pickup apparatus may be included to be used in the optical disc apparatus for the desktop PC and may also be included to be used in an optical disc apparatus for the notebook or laptop PC.

As in FIGS. 10 and 11, the periodic structure of the second area portion 32 is a periodic structure having a phase difference of substantially +90 degrees relative to the periodic structure of the first area portion 31.

The periodic structure of the third area portion 33 is a periodic structure having a phase difference of substantially +90 degrees relative to the periodic structure of the second area portion 32. The periodic structure of the third area portion 33 is a periodic structure having a phase difference of substantially 180 degrees relative to the periodic structure of the first area portion 31.

If the diffraction grating 64C configured as above is included in the optical pickup apparatus, the Sub-PP amplitude level (%) is increased and the Sub-PP amplitude level characteristic is improved (FIG. 15). It is avoided that the Sub-PP amplitude level (%) is reduced and the Sub-PP amplitude level characteristic deteriorates. The TE phase difference amount is reduced and the TE phase difference characteristic is improved (FIG. 16). It is avoided that the TE phase difference amount is increased and the TE phase difference characteristic deteriorates.

In the optical pickup apparatus (FIGS. 1 and 2), which employs the phase-shifted three-divided diffraction grating 64C (FIG. 10) and performs a tracking error detection method by an in-line DPP method, the TE phase difference amount can be reduced to a smaller amount (FIG. 16). Therefore, in the optical disc apparatus provided with the optical pickup apparatus (FIGS. 1 and 2) including the phase-shifted three-divided diffraction grating 64C (FIG. 10), the reading/writing of data/information for media D is performed in a stable manner for any of media D having different track pitches Dtp (FIG. 4), for example.

Since the amplitude level characteristic of Sub-PP applied to the signal surface portion Da of the medium D is improved as well as the TE phase difference characteristic is improved, the optical pickup apparatus may be included to be used in the optical disc apparatus for the desktop PC and may also included to be used in the optical disc apparatus for the notebook or laptop PC.

If the diffraction grating 64C configured as above is included in the optical pickup apparatus, it is avoided that the tracking error amplitude level (TE amplitude level) (%) is considerably reduced and the TE visual field characteristic significantly deteriorates (FIG. 14). Since significant deterioration of the TE visual field characteristic is suppressed, the optical pickup apparatus may be included to be used in the optical disc apparatus for the notebook or laptop PC and may also be included to be used in the optical disc apparatus for a desktop PC. Since the significant deterioration of the TE visual field characteristic is suppressed, the optical pickup apparatus may also be used as an optical pickup apparatus including a plurality of the smaller objective lenses 70, for example.

The width 32w of a center portion 30m (FIG. 10) of the diffraction grating 64C is set 16 to 28%, preferably, 18 to 26% relative to a diameter 70b of light passing through a pupil surface portion 70a (FIG. 2) of the objective lens 70 (FIGS. 1 and 2). That is, a center portion ratio Wr of the diffraction grating 64C is 16 to 28%, preferably, 18 to 26% (FIGS. 14, 15, and 16).

If the diffraction grating 64C configured as above is included in the optical pickup apparatus, it becomes easier to prevent the tracking error signal from deteriorating with displacement of the objective lens 70 when recording/reproduction of data is performed for a plurality of types of the media D having different track pitches Dtp.

If the width 32w of the center portion 30m of the diffraction grating 64C is set less than 16% relative to the diameter 70b of the light passing through the pupil surface portion 70a of the objective lens 70, the TE amplitude level (%) is reduced and the TE visual field characteristic deteriorates more easily (FIG. 14). That is, if the center portion rate Wr of the diffraction grating 64C is set less than 16%, an OBL center ratio (%) is reduced and the TE visual field characteristic deteriorates more easily. The width 32w of the center portion 30m of the diffraction grating 64C is set equal to 18% or more relative to the diameter 70b of the light passing through the pupil surface portion 70a of the objective lens 70, and thus, the reduction of the TE amplitude level (%) is suppressed and the deterioration of the TE visual field characteristic is suppressed. That is, since the center portion ratio Wr of the diffraction grating 64C is set equal to 18% or more, reduction of the OBL center ratio (%) is suppressed and the deterioration of the TE visual field characteristic is suppressed. OBL (objective lens) stands for an objective lens.

If the width 32w of the center portion 30m of the diffraction grating 64C is set greater than 28% relative to the diameter 70b of the light passing through the pupil surface portion 70a of the objective lens 70, the sub-push-pull signal amplitude level (Sub-PP amplitude level) (%) is reduced and the Sub-PP amplitude level characteristic deteriorates more easily (FIG. 15). The width 32w of the center portion 30m of the diffraction grating 64C is set equal to 26% or less relative to the diameter 70b of the light passing through the pupil surface portion 70a of the objective lens 70, and thus, the reduction of the Sub-PP amplitude level (%) is suppressed and the deterioration of the Sub-PP amplitude level characteristic is suppressed.

If the width 32w of the center portion 30m of the diffraction grating 64C (FIG. 10) is set greater than 28% relative to the diameter 70b of the light passing through the pupil surface portion 70a of the objective lens 70 (FIG. 2), the tracking error phase difference amount (TE phase difference amount) is increased and the tracking error phase difference characteristic (TE phase difference characteristic) deteriorates more easily (FIG. 16). The width 32w of the center portion 30m of the diffraction grating 64C is set equal to 26% or less relative to the diameter 70b of the light passing through the pupil surface portion 70a of the objective lens 70, and thus, the increase in the TE phase difference amount is suppressed and the deterioration of the TE phase difference characteristic is suppressed.

The width 32w of the center portion 30m of the diffraction grating 64C is set 16 to 28%, preferably 18 to 26% relative to the diameter 70b of the light passing through the pupil surface portion 70a of the objective lens 70, and thus, it becomes easier to set the TE amplitude level (FIG. 14), the Sub-PP amplitude level (FIG. 15), and the TE phase difference amount (FIG. 16) at suitable values.

For example, the width 32w of the center portion 30m of the diffraction grating 64C is set substantially 20% relative to the diameter 70b of the light passing through the pupil surface portion 70a of the objective lens 70, and thus, it becomes easier to set TE amplitude level (FIG. 14), the Sub-PP amplitude level (FIG. 15), and the TE phase difference amount (FIG. 16) are more easily set at suitable values. Since the TE amplitude level, the Sub-PP amplitude level, and the TE phase difference amount are set at suitable well-balanced values, the tracking control is more easily performed in the optical pickup apparatus.

The width 32w of the second area portion 32 of the diffraction grating 64C (FIG. 10) is set at 20 to 200 μm, preferably 60 to 160 μm, more preferably 96 to 144 μm. That is, the divided portion width 32w of the diffraction grating 64C is set at 20 to 200 μm, preferably 60 to 160 μm, more preferably 96 to 144 μm.

As a result, it becomes easier to perform the tracking in the optical pickup apparatus in a favorable manner for the signal surface portion Da of the medium D. It becomes easier to prevent the tracking error signal from deteriorating, for example, with displacement of the objective lens 70 when recording/reproduction is performed for a plurality of types of the media D having different track pitches Dtp.

If the width 32w of the second area portion 32 of the diffraction grating 64C is set at a narrow width less than 20 μm or if the width 32w of the second area portion 32 of the diffraction grating 64C is set at a wide width greater than 200 μm, the TE visual field characteristic, the Sub-PP amplitude level characteristic, and the TE phase difference characteristic get out of balance. If the characteristics are out of balance, the tracking error signal deteriorates and it becomes difficult to perform the tracking accurately for the signal surface portion Da of the medium D in the optical pickup apparatus.

For example, the width 32w of the second area portion 32 of the diffraction grating 64C is set at about 60 to 160 μm, and thus, it becomes easier to keep the TE visual field characteristic, the Sub-PP amplitude level characteristic, and the TE phase difference characteristic substantially in balance. Accordingly, it becomes easier to perform the tracking accurately for the signal surface portion Da of the medium D in the optical pickup apparatus.

Preferably, the width 32w of the second area portion 32 of the diffraction grating 64C is set within a range of 96 to 144 μm, and thus, the TE visual field characteristic, the Sub-PP amplitude level characteristic, and the TE phase difference characteristic is kept in balance. As a result, it is avoided that the tracking error signal deteriorates. Therefore, the tracking is accurately performed for the signal surface portion Da of the medium D in the optical pickup apparatus.

The optical pickup apparatus (FIGS. 1 and 2) includes: the diffraction grating 64C (FIG. 10) in a substantially rectangular shape in plan view; the objective lens 70 (FIGS. 1 and 2) that converges at least three light beams to be applied as the at least three separate irradiation spots 80, 81, and 82 to the signal surface portion Da (FIG. 4) of the medium D (FIGS. 1, 2, and 4); and the photodetector 73 (FIGS. 1, 2, 4, and 5) that receives the reflected light of the three irradiation spots 80, 81, and 82 (FIG. 4) from the medium D, for example.

If the optical pickup apparatus is configured as above, the tracking of the optical pickup apparatus is accurately performed for the signal surface portion Da of the medium D (FIG. 4). It becomes easier to prevent an amplitude of the tracking error signal from deteriorating and prevent an offset of the tracking error signal from remaining with displacement of the objective lens 70 (FIGS. 1 and 2), when recording/reproduction of data is performed for a plurality of types of the media D having different track pitches Dtp.

Since the optical pickup apparatus including the phase-shifted three-divided diffraction grating 64C (FIG. 10) is configured, the data reproduction operation or the data recording operation of the optical pickup apparatus is reliably performed for a DVD-RAM. The data reproduction operation or the data recording operation of the optical pickup apparatus is also reliably performed for a DVD±R and DVD±RW.

Fourth Embodiment

Figure 12:
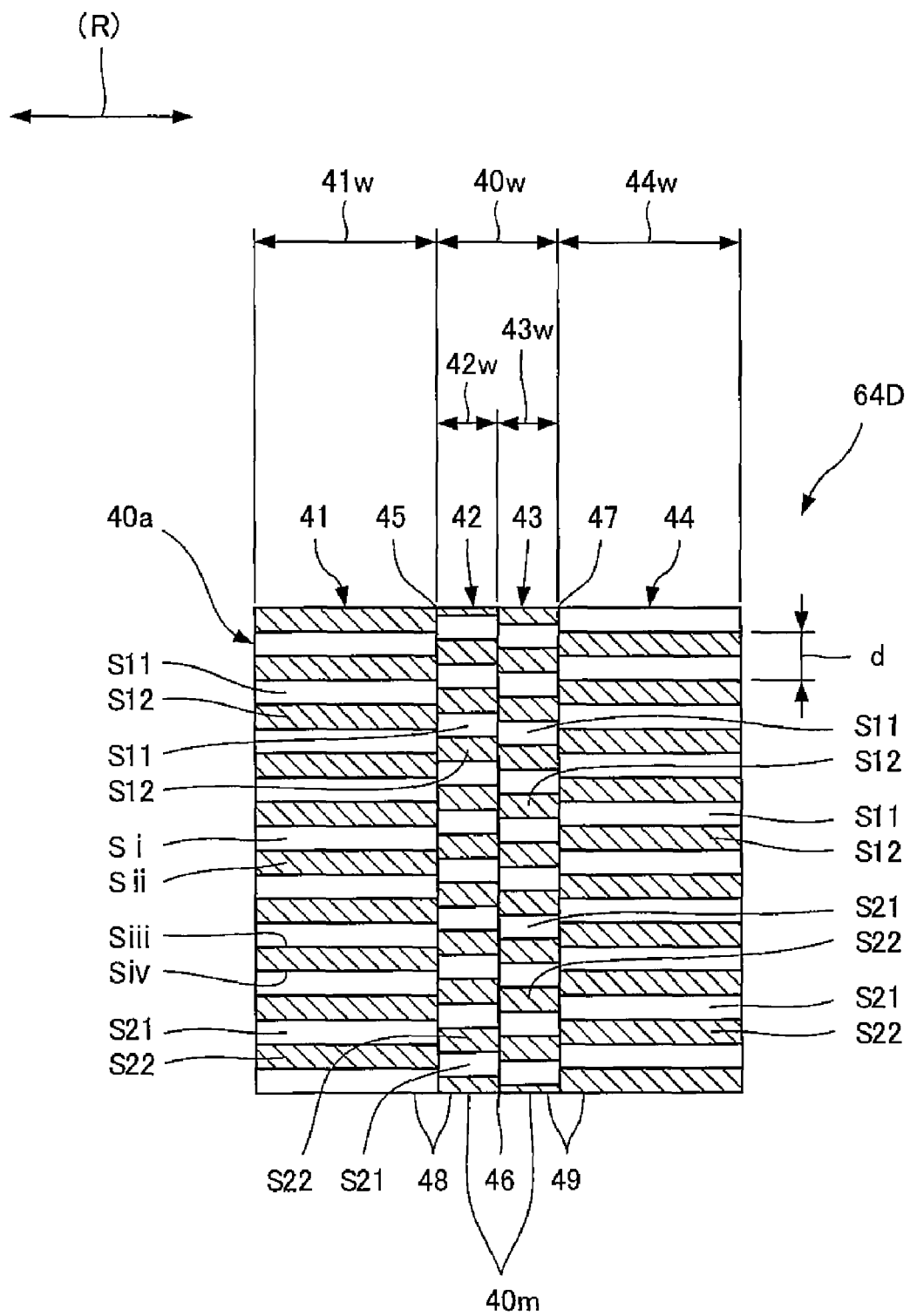
FIG. 12 is a schematic plan view of a fourth embodiment of a diffraction grating included in an optical pickup apparatus.
Figure 13:
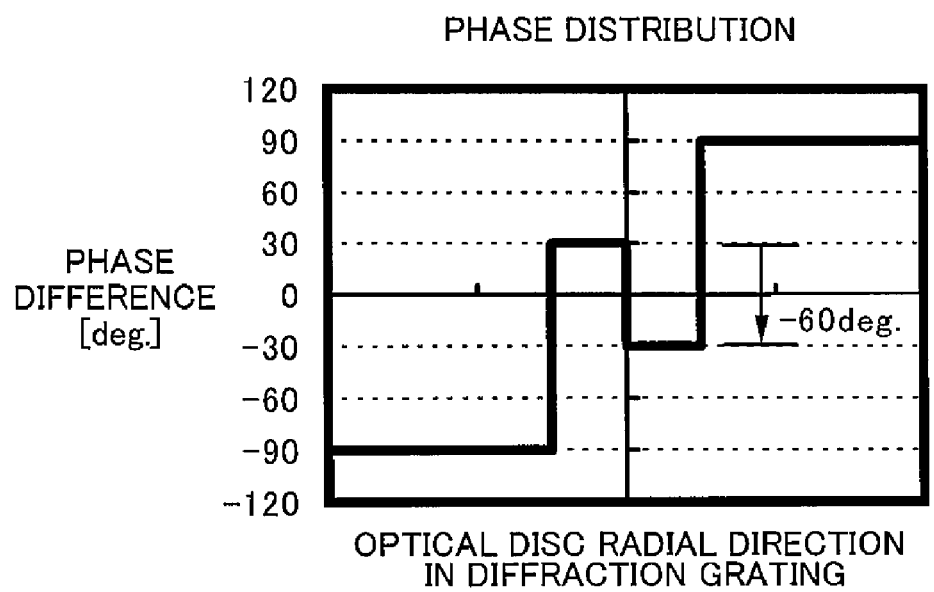
FIG. 13 is a diagram of a relationship between an optical disc radial direction and a phase difference in a diffraction grating of FIG. 12.

FIG. 12 is a schematic plan view of a fourth embodiment of a diffraction grating included in an optical pickup apparatus and FIG. 13 is a diagram of a relationship between an optical disc radial direction and a phase difference in the diffraction grating of FIG. 12.

Instead of the diffraction grating 64A shown in FIGS. 1, 2, and 6, a diffraction grating 64D shown in FIG. 12 is included in the optical pickup apparatus (FIGS. 1 and 2). The optical pickup apparatus and an optical disc apparatus are not changed except that the diffraction grating 64A shown in FIGS. 1, 2, and 6 is replaced with the diffraction grating 64D shown in FIG. 12. Although a first embodiment and a fourth embodiment are different in that the diffraction grating 64A shown in FIGS. 1, 2, and 6 is replaced with the diffraction grating 64D shown in FIG. 12, portions other than the diffraction gratings 64A and 64D are common to a first embodiment and a fourth embodiment. A fourth embodiment will also be described with reference to FIGS. 1 to 6 and 14 to 16 for convenience. In a fourth embodiment, those described in a first embodiment are given the same reference numerals and will not be described.

A diffraction surface portion 40a of the diffraction grating 64D (FIG. 12) is formed as the one surface portion 40a supporting diffraction of a plurality of types of laser wavelength light, to be used both as the diffraction surface portion 40a for splitting the first laser wavelength light into at least one first main beam and two first sub-beams and as the diffraction surface portion 40a for splitting the second laser wavelength light into at least one second main beam and two second sub-beams.

If the diffraction surface portion 40a of the diffraction grating 64D is formed as above, such an optical pickup apparatus is configured that generation of unnecessary diffracted light may be suppressed in the diffraction grating 64D, reduction in efficiency is prevented in a laser beam, and a price may be further reduced.

For example, when the first laser wavelength light passes through the first diffraction surface portion 302 of the diffraction grating 300A or 300B including the two diffraction surface portions 302 and 304, which are the first diffraction surface portion 302 (FIGS. 20 and 21) corresponding to the first laser wavelength light and the second diffraction surface portion 304 corresponding to the second laser wavelength light, and the first laser wavelength light is split into at least one first main beam and two first sub-beams, it is concerned that the second diffraction surface portion 304 of the diffraction grating 300A or 300B further unnecessarily diffracts the first main beam of the first laser wavelength light and further unnecessarily diffracts the first sub-beams, and that the optical efficiency is accordingly reduced in the first main beam and the first sub-beams of the first laser wavelength light.

For example, when the second laser wavelength light passes through the second diffraction surface portion 304 of the diffraction grating 300A or 300B including the two diffraction surface portions 302 and 304, which are the first diffraction surface portion 302 corresponding to the first laser wavelength light and the second diffraction surface portion 304 corresponding to the second laser wavelength light, and the second laser wavelength light is split into at least one second main beam and two second sub-beams, it is concerned that the first diffraction surface portion 302 of the diffraction grating 300A or 300B unnecessarily diffracts the second laser wavelength light, and that the optical efficiency is accordingly reduced in the second laser wavelength light.

However, if the diffraction surface portion 40a of the diffraction grating 64D (FIG. 12) is formed as the one surface portion 40a supporting the diffraction of a plurality of types of laser wavelength light, to be used both as the diffraction surface portion 40a for splitting the first laser wavelength light into at least one first main beam and two first sub-beams and the diffraction surface portion 40a for splitting the second laser wavelength light into at least one second main beam and two second sub-beams; reduction in optical efficiency is prevented in the first main beam and the first sub-beams of the first laser wavelength light which is caused by the unnecessary diffraction of the first main beam and the first sub-beams of the first laser wavelength light, and reduction in optical efficiency is prevented in the second laser wavelength light which is caused by the unnecessary diffraction of the second laser wavelength light.

The diffraction surface portion 40a of the diffraction grating 64D is formed as the one surface portion 40a supporting the diffraction of a plurality of types of laser wavelength light, to be used both as the diffraction surface portion 40a for splitting the first laser wavelength light into at least one first main beam and two first sub-beams and the diffraction surface portion 40a for splitting the second laser wavelength light into at least one second main beam and two second sub-beams, and therefore, the diffraction grating 64D is configured, in which portions to be processed, man-hours, etc., are reduced. Since the portions to be processed, man-hour, etc., of the diffraction grating 64D are reduced, the price of the diffraction grating 64D may be reduced. Therefore, the optical pickup apparatus may be configured that can be reduced in price.

As in FIG. 12, the diffraction grating 64D is provided with phase shift area portions 41, 44 (FIG. 12) that generate a pi radian phase shift in a portion of the laser beam emitted from the laser unit 61 (FIGS. 1 and 2). The diffraction grating 64D is divided into at least the four area portions 41, 42, 43, and 44, which are the substantially rectangular first area portion 41, the substantially linear second area portion 42 adjacent to the first area portion 41, the substantially linear third area portion 43 adjacent to the second area portion 42, and the substantially rectangular fourth area portion 44 adjacent to the third area portion 43. The diffraction grating 64D is divided into a plurality of the area portions 41, 42, 43, and 44. A predetermined periodic structure is made up in each of the area portions 41, 42, 43, and 44.

In the diffraction grating 64D shown in FIG. 12, the second area portion 42 and the third area portion 43 are drawn with certain amounts of widths to facilitate the understanding of a phase state of the second area portion 42 and a phase state of the second area portion 43 for convenience. In reality, each of the second area portion 42 of the diffraction grating 64D and the third area portion 43 of the diffraction grating 64D has a narrow linear shape with a width 40w of the order of 20 to 200 μm, for example. Each of the area portions 41, 42, 43, and 44 making up the diffraction grating 64D has a repetitive periodic structure in a minute convex-concave shape. The diffraction grating 64D is a glass plate whose dimensions are substantially 3 to 10 mm in height and width and substantially 0.3 to 3 mm in thickness, for example. In a perspective view of the diffraction grating 64D of FIG. 12, the diffraction grating 64D is viewed as in a case with the diffraction grating 64A shown in FIG. 1, for example.

If the diffraction grating 64D divided into a plurality of the area portions 41, 42, 43, and 44 (FIG. 12) is configured, detection of the error signals for the signal surface portion Da of the medium D (FIGS. 4 and 5) is more easily performed in a favorable manner by the optical pickup apparatus. For example, the tracking by the optical pickup apparatus is more easily performed for the signal surface portion Da of the medium D in a favorable manner. Since the diffraction grating 64D (FIG. 12) is configured to be divided into a plurality of the area portions 41, 42, 43, and 44, at least three separate irradiation spots 80, 81, and 82 are applied to the signal surface portion Da of the medium D (FIG. 4). Since the at least three irradiation spots 80, 81, and 82 are separately applied to the signal surface portion Da of the medium D, it becomes easier to prevent detection accuracy of the error signals such as the tracking error signal from deteriorating when recording/reproduction is performed for two or more types of the media D having different track pitches Dtp. Therefore, the optical pickup apparatus may be provided in which the tracking control is more easily performed.

As in FIG. 12, the diffraction grating 64D is divided into an even number of the area portions 41, 42, 43, and 44.

If the diffraction grating 64A is configured which is divided into an even number of the area portions 41, 42, 43, and 44 is configured, the irradiation spots 80, 81, and 82 formed on the signal surface portion Da of the medium D (FIG. 4) are formed as the accurate irradiation spots 80, 81, and 82. For example, since the diffraction grating 64D is divided by a boundary line portion 46 between the second area portion 42 and the third area portion 43 adjacent to the second area portion 42 of the diffraction grating 64D (FIG. 12) into at least two equal parts that is even-numbered parts, which are one area portion 48 including the first area portion 41 and the second area portion 42 adjacent to the first area portion 41 and the other area portion 49 including the third area portion 43 and the fourth area portion 44 adjacent to the third area portion 43, and therefore, it becomes easier to apply the light that is applied to the diffraction grating 64D substantially equally to the one area portion 48 of the diffraction grating 64D and the other area portion 49 of the diffraction grating 64D when the diffraction grating 64D is mounted on the optical pickup apparatus. Since it becomes easier to apply the light substantially equally to the one area portion 48 of the diffraction grating 64D and the other area portion 49 of the diffraction grating 64D, it becomes easier to precisely dispose the diffraction grating 64D on the optical pickup apparatus. Therefore, it becomes easier to accurately form the irradiation spots 80, 81, and 82 on the signal surface portion Da of the medium D (FIG. 4). Accordingly, the detection accuracy of the error signals such as the tracking error signal is improved when recording/reproduction is performed for two or more types of the media D having different track pitches Dtp. It becomes easier to accurately perform the tracking in the optical pickup apparatus for the signal surface portion Da of the medium D.

As in FIG. 12, the diffraction grating 64D is divided into the at least four area portions 41, 42, 43, and 44, which are the first area portion 41, the second area portion 42 that is adjacent to the first area portion 41 and that has a periodic structure different from a periodic structure of the first area portion 41, the third area portion 43 that is adjacent to the second area portion 42 and that has a periodic structure different from the periodic structure of the second area portion 42, and the fourth area portion 44 that is adjacent to the third area portion 43 and that has a periodic structure different from the periodic structure of the third area portion 43. The diffraction grating 64D is configured as a so-called four-divided in-line grating.

If the diffraction grating 64D divided into a plurality of the area portions 41, 42, 43, and 44 shown in FIG. 12 is mounted on the optical pickup apparatus, the detection of the error signals is favorably performed for the signal surface portion Da of the medium D (FIGS. 2, 4, and 5) in the optical pickup apparatus. For example, the tracking in the optical pickup apparatus is favorably performed for the signal surface portion Da of the medium D. Since the diffraction grating 64D (FIG. 12) is configured to be divided into the four area portions 41, 42, 43, and 44, the at least three separate irradiation spots 80, 81, and 82 are applied to the signal surface portion Da of the medium D (FIG. 4). The at least three irradiation spots 80, 81, and 82 are separately applied to the signal surface portion Da of the medium D, and therefore, when data recording is performed for two or more types of the media D having different track pitches Dtp or when data reproduction is performed for two or more types of the media D having different track pitches Dtp, it is avoided that the detection accuracy of the error signals such as the tracking error signal deteriorates with displacement of the objective lens 70 (FIGS. 1 and 2), for example. Therefore, the optical pickup apparatus may be provided that can easily perform the tracking control.

As in FIG. 12, the diffraction grating 64D includes the one substantially rectangular area portion 48 including the first area portion 41 and the second area portion 42 adjacent to the first area portion 41 and the other substantially rectangular area portion 49 including the third area portion 43 and the fourth area portion 44 adjacent to the third area portion 43. In the diffraction grating 64D, a width 41w of the first area portion 41 is substantially equal to a width 44w of the fourth area portion 44. In the diffraction grating 64D, a width 42w of the second area portion 42 is substantially equal to a width 43w of the third area portion 43. The diffraction grating 64D is divided into two equal parts, which are the one area portion 48 making up the diffraction grating 64D and the other area portion 49 making up the diffraction grating 64D by the boundary line portion 46 between the second area portion 42 of the diffraction grating 64D and the third area portion 43 of the diffraction grating 64D adjacent to the second area portion 42. The diffraction grating 64D is divided into even-numbered parts.

As a result, the irradiation spots 80, 81, and 82 formed on the signal surface portion Da of the medium D (FIG. 4) are formed as the accurate irradiation spots 80, 81, and 82. The diffraction grating 64D is divided into two equal parts, which are the one area portion 48 including: the first area portion 41 and the second area portion 42 adjacent to the first area portion 41; and the other area portion 49 including the third area portion 43 and the fourth area portion 44 adjacent to the third area portion 43, by the boundary line portion 46 between the second area portion 42 and the third area portion 43 adjacent to the second area portion 42 of the diffraction grating 64D (FIG. 12) divided into even-numbered parts, and therefore, the laser beam emitted from the laser unit 61 (FIGS. 1 and 2) and applied to the diffraction grating 64D is easily subjected to light axis adjustment by a light axis adjusting camera not shown, for example, when the diffraction grating 64D is mounted on a housing (not shown) of the optical pickup apparatus. After the laser beam is emitted from the laser unit 61 and applied to the diffraction grating 64D, the laser beam having passed through the objective lens 70 may be observed with the use of the light axis adjusting camera, for example.

The diffraction grating 64D includes the boundary line portion 46 that divides the diffraction grating 64D substantially at the center thereof into two equal parts to make up the one substantially rectangular area portion 48 and the other substantially rectangular area portion 49 in the four-divided diffraction grating 64D shown in FIG. 12, and therefore, it becomes easier to apply the laser beam substantially equally to the one substantially rectangular area portion 48 making up the diffraction grating 64D and the other substantially rectangular area portion 49 making up the diffraction grating 64D when the light axis adjustment of the laser beam is performed with the use of the light axis adjusting camera, etc.

Since it becomes easier to apply the laser beam substantially equally to the one substantially rectangular area portion 48 making up the diffraction grating 64D and the other substantially rectangular area portion 49 making up the diffraction grating 64D, the diffraction grating 64D is more easily disposed on the housing of the optical pickup apparatus while being accurately positioned and adjusted. Therefore, it becomes easier to form the irradiation spots 80, 81, and 82 accurately on the signal surface portion Da of the medium D (FIG. 4). Accordingly, it becomes easier to perform the tracking in the optical pickup apparatus accurately for the signal surface portion Da of the medium D.

The periodic structure of the third area portion 43 of the diffraction grating 64D is a periodic structure having a phase difference within a range of 3 to 180 degrees relative to the periodic structure of the second area portion 42 of the diffraction grating 64D.

Therefore, it becomes easier to form the irradiation spots 80, 81, and 82 formed on the signal surface portion Da of the medium D as the more accurate irradiation spots 80, 81, and 82. Since the periodic structure of the third area portion 43 making up the diffraction grating 64D is a periodic structure having a phase difference within a range of 3 to 180 degrees relative to the periodic structure of the second area portion 42 making up the diffraction grating 64D, the boundary line portion 46 is made substantially clear between the second area portion 42 of the diffraction grating 64D and the third area portion 43 of the diffraction grating 64D adjacent to the second area portion 42.

When the periodic structure of the third area portion 43 is a periodic structure having a phase different by less than 3 degrees relative to the periodic structure of the second area portion 42, the boundary line portion 46 between the second area portion 42 and the third area portion 43 is not made clear. When the periodic structure of the third area portion 43 is a periodic structure having a phase different by 180 degrees relative to the periodic structure of the second area portion 42, the boundary line portion 46 between the second area portion 42 and the third area portion 43 is the clearest. When the periodic structure of the third area portion 43 is a periodic structure having a phase difference within a range of 3 to 90 degrees, for example, relative to the periodic structure of the second area portion 42, the diffraction grating 64D having appropriate characteristics is formed with the boundary line portion 46 between the second area portion 42 and the third area portion 43 being made clear.

Since the boundary line portion 46 between the second area portion 42 of the diffraction grating 64D and the third area portion 43 of the diffraction grating 64D is substantially made clear, the boundary line portion 46 is made clear between the one area portion 48 of the diffraction grating 64D including the first area portion 41 and the second area portion 42 adjacent to the first area portion 41 and the other area portion 49 of the diffraction grating 64D including the third area portion 43 and the fourth area portion 44 adjacent to the third area portion 43. Therefore, the laser beam is applied substantially equally to the one area portion 48 of the diffraction grating 64D and the other area portion 49 of the diffraction grating 64D. When the laser beam is applied substantially equally to the one area portion 48 of the diffraction grating 64D and the other area portion 49 of the diffraction grating 64D, the diffraction grating 64D is accurately mounted on the housing of the optical pickup apparatus.

The substantially linear second area portion 42 and the substantially linear third area portion 43 making up the diffraction grating 64D are located between the substantially strip-shaped first area portion 41 and the substantially strip-shaped fourth area portion 44 making up the diffraction grating 64D. The periodic structure of the second area portion 42 is a periodic structure having a phase different to that of the periodic structure of the first area portion 41. The periodic structure of the third area portion 43 is a periodic structure having a phase different to that of the periodic structure of the second area portion 42. The periodic structure of the fourth area portion 44 is a periodic structure having a phase different to that of the periodic structure of the third area portion 43. The periodic structure of the fourth area portion 44 is a periodic structure having a phase different by substantially 180 degrees relative to the periodic structure of the first area portion 41.

Therefore, the first area portion 41, the second area portion 42, the third area portion 43, and the fourth area portion 44 are differentiated in the diffraction grating 64D, and a phase difference is made clear between the first area portion 41 and the fourth area portion 44 in the diffraction grating 64D. Since the periodic structure of the fourth area portion 44 of the diffraction grating 64D is a periodic structure having a phase different by substantially 180 degrees relative to the periodic structure of the first area portion 41 of the diffraction grating 64D, the at least three irradiation spots 80, 81, and 82 are formed on the signal surface portion Da of the medium D (FIG. 4). Due to the at least three irradiation spots 80, 81, and 82 favorably formed in a favorable manner on the signal surface portion Da of the medium D, it becomes easier to prevent the tracking error signal from deteriorating, for example, with displacement of the objective lens 70 (FIGS. 1 and 2), when data recording/reproduction is performed for a plurality of types of the media D having different track pitches Dtp.

The first area portion 41 (FIG. 10) and the second area portion 42 are divided by a boundary line portion 45 for dividing into the first area portion 41 and the second area portion 42. The second area portion 42 and the third area portion 43 are divided by the boundary line portion 46 for dividing into the second area portion 42 and the third area portion 43. The third area portion 43 and the fourth area portion 44 are divided by a boundary line portion 47 for dividing into the third area portion 43 and the fourth area portion 44.

The periodic structure of the second area portion 42 is a periodic structure having a phase difference within a range of 30 to 180 degrees relative to the periodic structure of the first area portion 41. The periodic structure of the third area portion 43 is a periodic structure having a phase difference within a range of 3 to 180 degrees relative to the periodic structure of the second area portion 42. The periodic structure of the fourth area portion 44 is a periodic structure having a phase difference within a range of 30 to 180 degrees relative to the periodic structure of the third area portion 43.

Therefore, the first area portion 41, the second area portion 42, the third area portion 43, and the fourth area portion 44 are substantially clearly differentiated in the diffraction grating 64D. The periodic structure of the second area portion 42 making up the diffraction grating 64D is a periodic structure having a phase difference within a range of 30 to 180 degrees relative to the periodic structure of the first area portion 41 making up the diffraction grating 64D, and thus, the first area portion 41 of the diffraction grating 64D and the second area portion 42 of the diffraction grating 64D are clearly differentiated. The periodic structure of the third area portion 43 making up the diffraction grating 64D is a periodic structure having a phase difference within a range of 3 to 180 degrees relative to the periodic structure of the second area portion 42 making up the diffraction grating 64D, and thus, the second area portion 42 of the diffraction grating 64D and the third area portion 43 of the diffraction grating 64D are substantially differentiated. The periodic structure of the fourth area portion 44 making up the diffraction grating 64D is a periodic structure having a phase difference within a range of 30 to 180 degrees relative to the periodic structure of the third area portion 43 making up the diffraction grating 64D, and thus, the third area portion 43 of the diffraction grating 64D and the fourth area portion 44 of the diffraction grating 64D are clearly differentiated.

Since the diffraction grating 64D is divided into four area portions and differentiated, the at least three separate irradiation spots 80, 81, and 82 are applied to the signal surface portion Da of the medium D (FIG. 4). The at least three irradiation spots 80, 81, and 82 are separately applied to the signal surface portion Da of the medium D, so that it becomes more easier to perform the tracking of the optical pickup apparatus for the signal surface portion Da of the medium D. Since the phases of the periodic structures of the area portions are appropriately set within ranges of predetermined numeric values, a degree of design freedom of the diffraction grating 64D (FIG. 12) is increased as well as a degree of design freedom of the optical pickup apparatus is increased. Therefore, the optical pickup apparatus is configured in which the optimum characteristic is more easily exhibited corresponding to a part to be used.

The diffraction grating 64D is formed in a substantially rectangular plate shape. The diffraction grating 64D is visually recognized as a substantially rectangular plate-shaped object in plan view of the diffraction grating 64D.

In a state where the vertically long substantially rectangular first area portion 41, the vertically long substantially rectangular second area portion 42, the vertically long substantially rectangular third area portion 43, and the vertically long substantially rectangular fourth area portion 44 are arranged side by side, when a phase of the other area portion adjacent to the right side of one area portion is shifted relative to a phase of the one area portion of the diffraction grating 64D to form a substantially upward step-like shape in the plan view of the diffraction grating 64D, this is defined as the phase of the other area portion being shifted to the plus (+) side.

In a state where the vertically long substantially rectangular first area portion 41, the vertically long substantially rectangular second area portion 42, the vertically long substantially rectangular third area portion 43, and the vertically long substantially rectangular fourth area portion 44 are arranged side by side, when the phase of the other area portion adjacent to the right side of the one area portion is shifted relative to the phase of the one area portion of the diffraction grating 64D to form a substantially downward step-like shape in the plan view of the diffraction grating 64D, this is defined as the phase of the other area portion being shifted to the minus (−) side.

In the plan view of the diffraction grating 64D, the periodic structure of the second area portion 42 adjacent to the right side of the first area portion 41 is a periodic structure having a phase shifted to the plus side relative to the periodic structure of the first area portion 41. In the plan view of the diffraction grating 64D, the periodic structure of the third area portion 43 adjacent to the right side of the second area portion 42 is a periodic structure having a phase shifted to the minus side relative to the periodic structure of the second area portion 42. In the plan view of the diffraction grating 64D, the periodic structure of the fourth area portion 44 adjacent to the right side of the third area portion 43 is a periodic structure having a phase shifted to the plus side relative to the periodic structure of the third area portion 43.

The diffraction grating 64D is configured such that only the phase of the periodic structure of the third area portion 43 is shifted in an opposite phase direction relative to the first area portion 41, the second area portion 42, and the fourth area portion 44 (FIG. 13). The diffraction grating 64D (FIG. 12) is the diffraction grating 64D including a so-called opposite phase periodic structure.

Depending on the design/specification, etc., of the optical pickup apparatus, for example, the diffraction grating 64D shown in FIG. 12 may be a diffraction grating (64D) in which only contour lines are mirror reversed with boundary line portion 46 as a center and reference numerals, lead lines, dimension lines, etc., remain substantially the same. To be more specific about such a case, for example, in the plan view of the diffraction grating (64D), the periodic structure of the second area portion (42) adjacent to the right side of the first area portion (41) may be a periodic structure having a phase shifted to the minus side relative to the periodic structure of the first area portion (41). For example, in the plan view of the diffraction grating (64D), the periodic structure of the third area portion (43) adjacent to the right side of the second area portion (42) may be a periodic structure having a phase shifted to the plus side relative to the periodic structure of the second area portion (42). For example, in the plan view of the diffraction grating (64D), the periodic structure of the fourth area portion (44) adjacent to the right side of the third area portion (43) may be a periodic structure having a phase shifted to the minus side relative to the periodic structure of the third area portion (43).

The diffraction grating (64D) is configured such that only the phase of the periodic structure of the third area portion (43) is shifted in the opposite phase direction relative to the first area portion (41), the second area portion (42), and the fourth area portion (44). The diffraction grating (64D) is the diffraction grating (64D) including a so-called opposite phase periodic structure.

If the optical pickup apparatus is provided with the diffraction grating including the opposite phase periodic structure, the TE amplitude level (%) is increased and the TE visual field characteristic is more easily improved (FIG. 14). It is avoided that the TE amplitude level (%) is reduced and the TE visual field characteristic deteriorates. Since the TE visual field characteristic is improved, it is preferable that the optical pickup apparatus is mounted on an optical disc apparatus for a notebook or laptop PC. Since the TE visual field characteristic is improved, it is preferable that the optical pickup apparatus is used as an optical pickup apparatus including a plurality of the smaller objective lenses 70, for example. In the optical pickup apparatus included in an optical disc apparatus for a notebook or laptop PC and the optical pickup apparatus including a plurality of the smaller objective lenses 70, an objective lens of a smaller size is used, and thus, primarily the visual field characteristic is important.

Depending on the design/specification, etc., of the optical pickup apparatus, the optical pickup apparatus may be provided with a four-divided diffraction grating (not shown) including a regular phase periodic structure. Depending on the design/specification, etc., of the optical pickup apparatus, the optical pickup apparatus may be included to be used in the optical disc apparatus for a desktop PC.

As in FIGS. 12 and 13, the periodic structure of the second area portion 42 is a periodic structure having a phase difference of substantially +120 degrees relative to the periodic structure of the first area portion 41. The periodic structure of the third area portion 43 is a periodic structure having a phase difference of substantially −60 degrees relative to the periodic structure of the second area portion 42. The periodic structure of the third area portion 43 is a periodic structure having a phase difference of substantially +60 degrees relative to the periodic structure of the first area portion 41. The periodic structure of the fourth area portion 44 is a periodic structure having a phase difference of substantially +120 degrees relative to the periodic structure of the third area portion 43. The periodic structure of the fourth area portion 44 is a periodic structure having a phase difference of substantially +180 degrees relative to the periodic structure of the first area portion 41.

If the diffraction grating 64D configured as above is included in the optical pickup apparatus, the TE amplitude level (%) is increased and the TE visual field characteristic is significantly improved (FIG. 14). It is avoided that the TE amplitude level (%) is reduced and the TE visual field characteristic deteriorates. The TE visual field characteristic of the optical pickup apparatus is improved more significantly than the TE visual characteristic of the optical pickup apparatus including the diffraction grating 64C divided into the three phase area portions 31, 32, and 33 (FIG. 3) (FIG. 14). Since the TE visual field characteristic is significantly improved, it is preferable that the optical pickup apparatus is mounted on an optical disc apparatus for a notebook or laptop PC. Since the TE visual field characteristic is significantly improved, it is preferable that the optical pickup apparatus is used as an optical pickup apparatus including a plurality of the smaller objective lenses 70, for example.

An area portion 42, 43 formed by combining the second area portion 42 and the third area portion 43 of the diffraction grating 64D (FIG. 12) is defined as a vertically long center portion 40m of the diffraction grating 64D. The width 40w of the center portion 40m (FIG. 12) of the diffraction grating 64D is set 16 to 28%, preferably, 18 to 26% relative to the diameter 70b of the light passing through the pupil surface portion 70a (FIG. 2) of the objective lens 70 (FIGS. 1 and 2). That is a center portion rate Wr of the diffraction grating 64D is 16 to 28%, preferably, 18 to 26% (FIGS. 14, 15, and 16).

If the diffraction grating 64D configured as above is included in the optical pickup apparatus, it becomes easier to prevent the tracking error signal from deteriorating with displacement of the objective lens 70 when recording/reproduction of data is performed for a plurality of types of the media D having different track pitches Dtp.

If the width 40w of the center portion 40m of the diffraction grating 64D is set less than 16% relative to the diameter 70b of the light passing through the pupil surface portion 70a of the objective lens 70, the TE amplitude level (%) is reduced and the TE visual field characteristic deteriorates more easily (FIG. 14). That is, if the center portion rate Wr of the diffraction grating 64D is set less than 16%, an OBL center ratio (%) is reduced and the TE visual field characteristic deteriorates more easily. The width 40w of the center portion 40m of the diffraction grating 64D is set equal to 18% or more relative to the diameter 70b of the light passing through the pupil surface portion 70a of the objective lens 70, and thus, the reduction of the TE amplitude level (%) is suppressed and the deterioration of the TE visual field characteristic is suppressed. That is, since the center portion ratio Wr of the diffraction grating 64D is set equal to 18% or more, the reduction of the OBL center ratio (%) is suppressed and the deterioration of the TE visual field characteristic is suppressed.

If the width 40w of the center portion 40m of the diffraction grating 64D is set greater than 28% relative to the diameter 70b of the light passing through the pupil surface portion 70a of the objective lens 70, the sub-push-pull signal amplitude level (Sub-PP amplitude level) (%) is reduced and the Sub-PP amplitude level characteristic deteriorates more easily (FIG. 15). The width 40w of the center portion 40m of the diffraction grating 64D is set equal to 26% or less relative to the diameter 70b of the light passing through the pupil surface portion 70a of the objective lens 70, and thus, the reduction of the Sub-PP amplitude level (%) is suppressed and the deterioration of the Sub-PP amplitude level characteristic is suppressed.

If the width 40w of the center portion 40m of the diffraction grating 64D (FIG. 12) is set greater than 28% relative to the diameter 70b of the light passing through the pupil surface portion 70a of the objective lens 70 (FIG. 2), the tracking error phase difference amount (TE phase difference amount) is increased and the tracking error phase difference characteristic (TE phase difference characteristic) deteriorates more easily (FIG. 16). The width 40w of the center portion 40m of the diffraction grating 64D is set equal to 26% or less relative to the diameter 70b of the light passing through the pupil surface portion 70a of the objective lens 70, and thus, the increase in the TE phase difference amount is suppressed and the deterioration of the TE phase difference characteristic is suppressed.

The width 40w of the center portion 40m of the diffraction grating 64D is set 16 to 28%, preferably 18 to 26% relative to the diameter 70b of the light passing through the pupil surface portion 70a of the objective lens 70, and thus, it becomes easier to set the TE amplitude level (FIG. 14), the Sub-PP amplitude level (FIG. 15), and the TE phase difference amount (FIG. 16) at suitable values.

For example, the width 40w of the center portion 40m of the diffraction grating 64D is set substantially 20% relative to the diameter 70b of the light passing through the pupil surface portion 70a of the objective lens 70, and thus, it becomes easier to set the TE amplitude level (FIG. 14), the Sub-PP amplitude level (FIG. 15), and the TE phase difference amount (FIG. 16) at suitable values. Since the TE amplitude level, the Sub-PP amplitude level, and the TE phase difference amount are set at suitable well-balanced values, the tracking control is more easily performed in the optical pickup apparatus.

Both of the width 42w of the second area portion 42 of the diffraction grating 64D (FIG. 12) and the width 43w of the third area portion 43 of the diffraction grating 64D are set at 10 to 100 µm, preferably 30 to 80 µm, more preferably 48 to 72 µm. That is, the divided portion widths 42w and 43w of the diffraction grating 64D are set at 10 to 100 µm, preferably 30 to 80 µm, more preferably 48 to 72 µm.

As a result, it becomes easier to perform the tracking in the optical pickup apparatus in a favorable manner for the signal surface portion Da of the medium D. It becomes easier to prevent the tracking error signal from deteriorating, for example, with displacement of the objective lens 70 when recording/reproduction is performed for a plurality of types of the media D having different track pitches Dtp.

If both of the width 42w of the second area portion 42 of the diffraction grating 64D and the width 43w of the third area portion 43 of the diffraction grating 64D are set at narrow widths each less than 10 µm, or if both of the width 42w of the second area portion 42 of the diffraction grating 64D and the width 43w of the third area portion 43 of the diffraction grating 64D are set at wide widths each greater than 100 µm, the TE visual field characteristic, the Sub-PP amplitude level characteristic, and the TE phase difference characteristic get out of balance. If the characteristics are out of balance, the tracking error signal deteriorates and it becomes difficult to perform the tracking accurately for the signal surface portion Da of the medium D in the optical pickup apparatus.

For example, both of the width 42w of the second area portion 42 of the diffraction grating 64D and the width 43w of the third area portion 43 of the diffraction grating 64D are set at about 30 to 80 µm, and thus, it becomes easier to keep the TE visual field characteristic, the Sub-PP amplitude level characteristic, and the TE phase difference characteristic in balance. Accordingly, it becomes easier to perform the tracking accurately for the signal surface portion Da of the medium D in the optical pickup apparatus.

Preferably, both of the width 42w of the second area portion 42 of the diffraction grating 64D and the width 43w of the third area portion 43 of the diffraction grating 64D are set within a range of 48 to 72 µm, and thus, the TE visual field characteristic, the Sub-PP amplitude level characteristic, and the TE phase difference characteristic is kept in balance. As a result, it is avoided that the tracking error signal deteriorates. Therefore, the tracking is accurately performed for the signal surface portion Da of the medium D in the optical pickup apparatus.

For example, in the optical pickup apparatus including the three-divided diffraction grating 64C (FIG. 10), the TE visual field characteristic or the TE phase difference characteristic is changed only by changing the width 32w of the center portion 30m of the three-divided diffraction grating 64C.

On the other hand, in the optical pickup apparatus (FIGS. 1 and 2) including the four-divided diffraction grating 64D (FIG. 12), when the TE visual field characteristic, the TE phase difference characteristic, etc., are changed the phase differences of the grating pitches making up the area portions 42 and 43 of the center portion 40m of the four-divided diffraction grating 64D are changed in addition to the width 40w of the center portion 40m of the four-divided diffraction grating 64D (FIG. 12) is changed, so that various characteristics may be adjusted and changed.

The width 40w of the center portion 40m of the four-divided diffraction grating 64D and the phase differences among the grating pitches making up the area portions 42 and 43 of the center portion 40m of the four-divided diffraction grating 64D are adjusted to be set, and thus, it becomes possible to design an optical pickup apparatus in which desired performances are exhibited as well as various characteristics are kept in balance. Therefore, a degree of design freedom is increased when the optical pickup apparatus is designed.

The optical pickup apparatus (FIGS. 1 and 2) includes: the diffraction grating 64D (FIG. 12) in a substantially rectangular shape in plan view; the objective lens 70 (FIGS. 1 and 2)

that converges at least three light beams to be applied as the at least three separate irradiation spots 80, 81, and 82 to the signal surface portion Da (FIG. 4) of the medium D (FIGS. 1, 2, and 4); and the photodetector 73 (FIGS. 1, 2, 4, and 5) that receives the reflected light of the three irradiation spots 80, 81, and 82 (FIG. 4) from the medium D, for example.

If the optical pickup apparatus is configured as above, the tracking of the optical pickup apparatus is accurately performed for the signal surface portion Da of the medium D (FIG. 4). It becomes easier to prevent an amplitude of the tracking error signal from deteriorating and prevent an offset of the tracking error signal from remaining with displacement of the objective lens 70 (FIGS. 1 and 2), when data recording/reproduction of data is performed for a plurality of types of the media D having different track pitches Dtp.

Since the optical pickup apparatus including the phase-shifted four-divided diffraction grating 64D (FIG. 12) is configured, the data reproduction operation or the data recording operation of the optical pickup apparatus is reliably performed for a DVD-RAM. The data reproduction operation or the data recording operation of the optical pickup apparatus is also reliably performed for a DVD±R and DVD±RW.

<Description of Optical Disc Apparatus>

An optical disc apparatus (not shown) includes at least one optical pickup apparatus out of the optical pickup apparatuses (FIGS. 1 and 2) shown in first, second, third, and fourth embodiments described above. Specifically, the optical disc apparatus includes any single optical pickup apparatus of the optical pickup apparatuses shown in first, second, third, and fourth embodiments described above. The optical pickup apparatus is included in the optical disc apparatus not shown.

Since the optical pickup apparatus shown in first, second, third, or fourth embodiment described above is included in the optical disc apparatus, the optical disc apparatus is configured including at least the optical pickup apparatus in which the generation of the unnecessary light by the diffraction gratings 64A, 64B, 64C, and 64D is suppressed and the reduction in efficiency is prevented in the laser beam.

There may be provided the optical disc apparatus including the single optical pickup apparatus in which the accurate control such as tracking control is easily performed. Reading data from the media D and writing data to the media D are properly performed in the optical disc apparatus including the optical pickup apparatus. When each of the media D is inserted into the optical disc apparatus to read data from a plurality of types of the media D having different track pitches Dtp or to write data to a plurality of types of the media D having different track pitches Dtp, it becomes easier to prevent the tracking error signal from deteriorating with displacement of the objective lens 70, for example. Therefore, there may be provided the optical disc apparatus including the single optical pickup apparatus in which the tracking control is more easily performed.

If the optical disc apparatus includes one optical pickup apparatus capable of supporting a plurality of types of the media D having different track pitches Dtp, the price of the optical disc apparatus may be reduced. It is avoided that the optical disc apparatus includes a plurality of optical pickup apparatuses corresponding to a plurality of types of the media D having different track pitches Dtp and that the price of the optical disc apparatus is increased by a large amount accordingly.

The optical pickup apparatus and the optical disc apparatus including the optical pickup apparatus may be used in recording/reproducing apparatuses for recording data/information/signals, etc., in the various optical discs and reproducing data/information/signals, etc., from the various optical discs.

The optical pickup apparatus and the optical disc apparatus including the optical pickup apparatus may be used in reproducing-only apparatuses for reproducing data/information/signals, etc., from the various optical discs.

The optical pickup apparatus and the optical disc apparatus including the optical pickup apparatus are provided in optical disc apparatuses mounted on computers, audio/visual equipment, game machines, and vehicle-mounted apparatuses (all not shown), for example. The optical pickup apparatus and the optical disc apparatus including the optical pickup apparatus may be mounted on computers such as notebook PCs, laptop PCs, desktop PCs, and vehicle-mounted computers, game machines such as computer game machines, and audio and/or visual equipment such as CD players/CD recorders and DVD players/DVD recorders (all not shown), for example. The optical pickup apparatus may support a plurality of discs such as CD optical discs, DVD optical discs, "HD DVD" optical discs, and "Blu-ray Disc" optical discs. The optical pickup apparatus may support one optical disc having a plurality of layers of signal surface portions. The optical pickup apparatus may be mounted on computers, audio and/or visual equipment, game machines, and vehicle-mounted apparatuses (all not shown) supporting various optical discs such as a "CD", "DVD", "HD DVD", and "Blu-ray Disc", for example.

The above embodiments of the present invention are simply for facilitating the understanding of the present invention and are not in any way to be construed as limiting the present invention. The present invention may variously be changed or altered without departing from its spirit and encompass equivalents thereof.

Instead of the two-divided type diffraction grating 64A, 64B including the two area portions 21 and 22 shown in FIGS. 3 and 7, a two-divided type diffraction grating (not shown) including two area portions in another form may be used, for example. Instead of the three-divided type diffraction grating 64C including the three area portions 31, 32, and 33 shown in FIG. 10, a three-divided type diffraction grating (not shown) including three area portions in another form may be used, for example. Instead of the four-divided type diffraction grating 64D including the four area portions 41, 42, 43, and 44 shown in FIG. 12, a four-divided type diffraction grating (not shown) including four area portions in another form may be used, for example. A multi-divided type diffraction grating including a plurality of various area portions may be used as above.

The optical glass plate (50) (FIGS. 3 and 9) may be mounted on the three-divided type diffraction grating (64C) including the three area portions (31, 32, and 33) shown in FIG. 10, for example. The optical glass plate (50) (FIGS. 3 and 9) may be mounted on the four-divided type diffraction grating (64D) including the four area portions (41, 42, 43, and 44) shown in FIG. 12, for example.

The first laser beam may be the red laser beam having a wavelength of substantially 660 nm (the first wavelength) compatible with the DVD standard and the second laser beam may be the blue-violet laser beam having a wavelength of substantially 405 nm (the second wavelength) compatible with the "HD DVD" standard or the "Blu-ray Disc" standard, for example. In this case, the diffraction gratings 64A, 64B, 64C, and 64D are made up of only the diffraction grating members including the grating spacing corresponding to an "HD DVD" or "Blu-ray Disc".

The above optical pickup apparatus is configured to be able to provide an inexpensive and highly efficient optical pickup apparatus conforming to the two, first and second, laser beams having wavelengths different from each other, in which unnecessary diffracted light is suppressed to improve detection accuracy of the error signal, with the optical systems being simplified.

What is claimed is:

1. An optical pickup apparatus comprising at least:
a diffraction grating configured to split first wavelength light into at least a first main beam and first sub-beam, and to split second wavelength light into at least a second main beam and second sub-beam, the diffraction grating including a diffraction surface portion corresponding to the second wavelength light; and
a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam,
a distance between the first main light-receiving unit and first sub-light-receiving unit being changed relative to a standardized distance between the first main light-receiving unit and first sub-light-receiving unit.

2. The optical pickup apparatus of claim 1, wherein a changed distance between the first main light-receiving unit and first sub-light-receiving unit is set longer than the standardized distance between the first main light-receiving unit and first sub-light-receiving unit.

3. The optical pickup apparatus of claim 1, wherein when a value of the standardized distance between the first main light-receiving unit and first sub-light-receiving unit is defined as a value of 100%, a value of the changed distance between the first main light-receiving unit and first sub-light-receiving unit is set at a value of substantially 111% relative to the value of the standardized distance between the first main light-receiving unit and first sub-light-receiving unit.

4. The optical pickup apparatus of claim 1, wherein when a value of a standardized distance between the second main light-receiving unit and second sub-light-receiving unit is defined as a value of 100%, a value of a distance between the second main light-receiving unit and the second sub-light-receiving unit is set at a value of substantially 100% relative to the value of the standardized distance between the second main light-receiving unit and second sub-light-receiving unit.

5. The optical pickup apparatus of claim 1, wherein the diffraction surface portion combines
a diffraction surface portion configured to split the first wavelength light into at least the first main beam and first sub-beam and
a diffraction surface portion configured to split the second wavelength light into at least the second main beam and second sub-beam.

6. The optical pickup apparatus of claim 1, wherein the diffraction grating is divided into a plurality of area portions.

7. The optical pickup apparatus of claim 1, wherein the diffraction grating is divided into an even number of area portions.

8. The optical pickup apparatus of claim 1, wherein the diffraction grating is divided into at least four parts of a first area portion, second area portion, third area portion, and fourth area portion.

9. The optical pickup apparatus of claim 1, further comprising
a light-emitting element capable of emitting lights having a plurality of wavelengths.

10. The optical pickup apparatus of claim 1, wherein the first wavelength light has a wavelength of substantially 765 to 830 nm, and wherein
the second wavelength light has a wavelength of substantially 630 to 685 nm.

11. The optical pickup apparatus of claim 1, wherein the first wavelength light has a wavelength of substantially 630 to 685 nm, and wherein
the second wavelength light has a wavelength of substantially 340 to 450 nm.

12. The optical pickup apparatus of claim 1, wherein the optical pickup apparatus is capable of supporting a medium having a plurality of signal surface portions.

13. An optical disc apparatus comprising at least: the optical pickup apparatus of claim 1.

14. An optical pickup apparatus comprising at least:
a diffraction grating configured to split first wavelength light into at least a first main beam and first sub-beam, and to split second wavelength light into at least a second main beam and second sub-beam, the diffraction grating including a diffraction surface portion corresponding to the second wavelength light; and
a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam,
a split light ratio among the first sub-light-receiving unit on a front side, the first main light-receiving unit at a center, and the first sub-light-receiving unit on a back side being changed relative to a standardized split light ratio among the first sub-light-receiving unit on a front side, first main light-receiving unit at a center, and first sub-light-receiving unit on a back side, when the repositioned first sub-light-receiving units are disposed in a pairwise manner across the first main light-receiving unit as a center, and the first sub-light-receiving unit on the front side, first main light-receiving unit at the center, and first sub-light-receiving unit on the back side are provided side by side.

15. The optical pickup apparatus of claim 14, wherein when the repositioned first sub-light-receiving units are disposed in the pairwise manner across the first main light-receiving unit as the center, and the first sub-light-receiving unit on the front side, first main light-receiving unit at the center, and first sub-light-receiving unit on the back side are disposed side by side,
a split light ratio among the first sub-light-receiving unit on the front side, first main light-receiving unit at the center, and first sub-light-receiving unit on the back side is set substantially at 1:(20 to 26):1.

16. The optical pickup apparatus of claim 14, wherein when the second sub-light-receiving units are disposed in a pairwise manner across the second main light-receiving unit as a center, and the second sub-light-receiving unit on a front side, second main light-receiving unit at a center, and second sub-light-receiving unit on a back side are provided side by side,
a split light ratio among the second sub-light-receiving unit on the front side, the second main light-receiving unit at the center, and the second sub-light-receiving unit on the back side is set substantially at 1:(12 to 18):1.

17. An optical pickup apparatus comprising at least:
a diffraction grating configured to split first wavelength light into at least a first main beam and first sub-beam, and to split second wavelength light into at least a second main beam and second sub-beam, the diffraction grating including a diffraction surface portion corresponding to the second wavelength light; and a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam, a value of light-receiving sensitivity in the first main light-receiving unit being changed relative to or being equal to a value of standardized light-receiving sensitivity in the first main light-receiving unit, a value of light-receiving sensitivity in the first sub-light-receiving unit being changed relative to a value of standardized light-receiving sensitivity in the first sub-light-receiving unit.

18. The optical pickup apparatus of claim 17, wherein
when the value of the standardized light-receiving sensitivity in the first main light-receiving unit is defined as a value of 100%, a changed or equal value of the light-receiving sensitivity in the first main light-receiving unit is set at a lower value of substantially 100% or less relative to the value of the standardized light-receiving sensitivity in the first main light-receiving unit, and wherein when the value of the standardized light-receiving sensitivity in the first sub-light-receiving unit is defined as a value of 100%, a changed value of the light-receiving sensitivity in the first sub-light-receiving unit is set at a higher value of substantially 100% or greater relative to the value of the standardized light-receiving sensitivity in the first sub-light-receiving unit.

19. The optical pickup apparatus of claim 17, wherein
when the value of the standardized light-receiving sensitivity in the first main light-receiving unit is defined as a value of 100%, a changed or equal value of the light-receiving sensitivity in the first main light-receiving unit is set at a value of substantially 95 to 100% relative to the value of the standardized light-receiving sensitivity in the first main light-receiving unit, and wherein when the value of the standardized light-receiving sensitivity in the first sub-light-receiving unit is defined as a value of 100%, a changed value of the light-receiving sensitivity in the first sub-light-receiving unit is set at a value of substantially 120 to 160% relative to the value of the standardized light-receiving sensitivity in the first sub-light-receiving unit.

20. The optical pickup apparatus of claim 17, wherein
when a value of standardized light-receiving sensitivity in the second main light-receiving unit is defined as a value of 100%, a value of light-receiving sensitivity in the second main light-receiving unit is set at a value of substantially 100% relative to the value of the standardized light-receiving sensitivity in the second main light-receiving unit, and wherein when a value of standardized light-receiving sensitivity in the second sub-light-receiving unit is defined as a value of 100%, a value of light-receiving sensitivity in the second sub-light-receiving unit is set at a value of substantially 100% relative to the value of the standardized light-receiving sensitivity in the second sub-light-receiving unit.

21. An optical pickup apparatus comprising at least:
a diffraction grating configured to split first wavelength light into at least a first main beam and first sub-beam, and to split second wavelength light into at least a second main beam and second sub-beam, the diffraction grating including a diffraction surface portion corresponding to the second wavelength light; and a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam, wherein a distance between the first main light-receiving unit and first sub-light-receiving unit being changed relative to a standardized distance between the first main light-receiving unit and first sub-light-receiving unit, and wherein a split light ratio among the first sub-light-receiving unit on a front side, the first main light-receiving unit at a center, and the first sub-light-receiving unit on a back side being changed relative to a standardized split light ratio among the first sub-light-receiving unit on a front side, first main light-receiving unit at a center, and first sub-light-receiving unit on a back side, when the repositioned first sub-light-receiving units are disposed in a pairwise manner across the first main light-receiving unit as a center, and the first sub-light-receiving unit on the front side, first main light-receiving unit at the center, and first sub-light-receiving unit on the back side are provided side by side.

22. An optical pickup apparatus comprising at least:
a diffraction grating configured to split first wavelength light into at least a first main beam and first sub-beam, and to split second wavelength light into at least a second main beam and second sub-beam, the diffraction grating including a diffraction surface portion corresponding to the second wavelength light; and a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam, wherein a distance between the first main light-receiving unit and first sub-light-receiving unit being changed relative to a standardized distance between the first main light-receiving unit and first sub-light-receiving unit, wherein a value of light-receiving sensitivity in the first main light-receiving unit being changed relative to or being equal to a value of standardized light-receiving sensitivity in the first main light-receiving unit, and wherein a value of light-receiving sensitivity in the first sub-light-receiving unit being changed relative to a value of standardized light-receiving sensitivity in the first sub-light-receiving unit.

23. An optical pickup apparatus comprising at least:
a diffraction grating configured to split first wavelength light into at least a first main beam and first sub-beam, and to split second wavelength light into at least a second main beam and second sub-beam, the diffraction grating including a diffraction surface portion corresponding to the second wavelength light; and a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam, wherein a split light ratio among the first sub-light-receiving unit on a front side, the first main light-receiving unit at a center, and the first sub-light-receiving unit on a back side being changed relative to a standardized split light ratio among the first sub-light-receiving unit on a front side, first main light-receiving unit at a center, and first sub-light-receiving unit on a back side, when the repositioned first sub-light-receiving units are disposed in a pairwise manner across the first main light-receiving unit as a center, and the first sub-light-receiving unit on the front side, first main light-receiving unit at the center, and first sub-light-receiving unit on the back side are provided side by side wherein a value of light-receiving sensitivity in the first main light-receiving unit being changed relative to or being equal to a value of standardized light-receiving sensitivity in the first main light-receiving unit, and wherein a value of light-receiving sensitivity in the first sub-light-receiving unit being changed relative to a value of standardized light-receiving sensitivity in the first sub-light-receiving unit.

24. An optical pickup apparatus comprising at least:
a diffraction grating configured to split first wavelength light into at least a first main beam and first sub-beam, and to split second wavelength light into at least a second main beam and second sub-beam, the diffraction grating including a diffraction surface portion corresponding to the second wavelength light; and
a photodetector including a first main light-receiving unit configured to be applied with the first main beam, a first sub-light-receiving unit configured to be applied with the first sub-beam, a second main light-receiving unit configured to be applied with the second main beam, and a second sub-light-receiving unit configured to be applied with the second sub-beam,
wherein a distance between the first main light-receiving unit and first sub-light-receiving unit being changed relative to a standardized distance between the first main light-receiving unit and first sub-light-receiving unit,
wherein a split light ratio among the first sub-light-receiving unit on a front side, the first main light-receiving unit at a center, and the first sub-light-receiving unit on a back side being changed relative to a standardized split light ratio among the first sub-light-receiving unit on a front side, first main light-receiving unit at a center, and first sub-light-receiving unit on a back side, when the repositioned first sub-light-receiving units are disposed in a pairwise manner across the first main light-receiving unit as a center, and the first sub-light-receiving unit on the front side, first main light-receiving unit at the center, and first sub-light-receiving unit on the back side are provided side by side,
wherein a value of light-receiving sensitivity in the first main light-receiving unit being changed relative to or being equal to a value of standardized light-receiving sensitivity in the first main light-receiving unit, and wherein a value of light-receiving sensitivity in the first sub-light-receiving unit being changed relative to a value of standardized light-receiving sensitivity in the first sub-light-receiving unit.

25. An optical pickup apparatus comprising:
a laser unit including a first light source and second light source disposed on the same surface, the first light source configured to emit a first laser beam, the second light source configured to emit a second laser beam having a wavelength shorter than a wavelength of the first laser beam;
a diffraction grating including a grating spacing corresponding to the wavelength of the second laser beam, the diffraction grating configured to diffract the first laser beam or second laser beam to generate a main beam and two sub-beams;
a light converging optical system configured to converge the main beam and two sub-beams to apply a main spot corresponding to the main beam and two sub-spots corresponding to the two sub-beams in such a manner that the main spot and two sub-spots are arranged substantially in a line on a track of an optical disc; and
a photodetector including
a first main light-receiving unit and two first sub-light-receiving units, the first main light-receiving unit being applied with a reflected spot corresponding to the main spot reflected from the optical disc, and the two first sub-light-receiving units being applied with reflected spots corresponding respectively to the two sub-spots reflected from the optical disc, after the main spot and two sub-spots corresponding to the first laser beam are applied to the optical disc, and
a second main light-receiving unit and second sub-light-receiving units, the second main light-receiving unit being applied with a reflected spot corresponding to the main spot reflected from the optical disc, and the second sub-light-receiving units being applied with two reflected spots corresponding respectively to the two sub-spots reflected from the optical disc, after the main spot and two sub-spots corresponding to the second laser beam are applied to the optical disc,
a distance between the first main light-receiving unit and first sub-light-receiving unit and a distance between the second main light-receiving unit and second sub-light-receiving unit being set based on a distance between
a first irradiation point of the main spot corresponding to a first light-emitting point, which irradiation point is indicative of a position of the first or second light source on a surface of the laser unit facing a surface of the diffraction grating, and
a second irradiation point of the sub-spot corresponding to a second light-emitting point, which irradiation point is indicative of an apparent position of the first or second light source on the surface of the laser unit, the position being set based on a normal line distance between the first light-emitting point and the surface of the diffraction grating and on a diffraction angle of the diffraction grating.

* * * * *

UNITED STATES PATENT AND TRADEMARK OFFICE
CERTIFICATE OF CORRECTION

| | | |
|---|---|---|
| PATENT NO. | : 8,000,188 B2 | Page 1 of 1 |
| APPLICATION NO. | : 12/639871 | |
| DATED | : August 16, 2011 | |
| INVENTOR(S) | : Minoru Sato | |

It is certified that error appears in the above-identified patent and that said Letters Patent is hereby corrected as shown below:

Column 29, line 5: replace "Ys(cd)" with --Ys(dvd)--; and

Column 29, line 8: replace "Ys(cd)" with --Ys(dvd)--.

Signed and Sealed this
Fifteenth Day of November, 2011

David J. Kappos
*Director of the United States Patent and Trademark Office*